United States Patent [19]
Takahashi et al.

[11] Patent Number: 5,841,096
[45] Date of Patent: Nov. 24, 1998

[54] LASER MACHINING APPARATUS AND METHOD OF CONTROLLING SAME

[75] Inventors: Teiji Takahashi; Yoshihito Imai; Atsushi Morita, all of Hyogo; Masato Matsubara, Nagoya; Osamu Nagano, Nagoya; Tsukasa Fukushima, Nagoya, all of Japan

[73] Assignee: Mitsubishi Denki Kabushiki Kaisha, Tokyo, Japan

[21] Appl. No.: 928,226

[22] Filed: Sep. 12, 1997

Related U.S. Application Data

[62] Division of Ser. No. 429,208, Apr. 26, 1995, abandoned.

[30] Foreign Application Priority Data

| Apr. 27, 1994 | [JP] | Japan | 6-089919 |
| Apr. 30, 1994 | [JP] | Japan | 6-114558 |
| Oct. 19, 1994 | [JP] | Japan | 6-253624 |
| Apr. 18, 1995 | [JP] | Japan | 7-92137 |

[51] Int. Cl.$^6$ ........................................ B23K 26/00
[52] U.S. Cl. .......................... 219/121.62; 219/121.6; 219/121.67; 364/474.08
[58] Field of Search .................. 219/121.6, 121.61, 219/121.62, 121.67, 121.83; 364/474.08; 372/25, 29, 31, 38

[56] References Cited

U.S. PATENT DOCUMENTS

| 3,806,829 | 4/1974 | Duston et al. ............... 219/121.61 |
| 4,545,018 | 10/1985 | Clements et al. ........... 219/121.61 |
| 4,780,590 | 10/1988 | Griner et al. ............... 219/121.61 |
| 4,856,012 | 8/1989 | Takenaka ......................... 372/38 |
| 5,059,760 | 10/1991 | Iehisa et al. ............... 219/121.62 |
| 5,065,329 | 11/1991 | Yamazaki et al. ............ 364/474.08 |
| 5,081,635 | 1/1992 | Wakabayashi et al. . |
| 5,091,914 | 2/1992 | Maeda et al. .................. 372/34 |
| 5,142,543 | 8/1992 | Wakabayashi et al. . |
| 5,408,482 | 4/1995 | Nagano et al. ................ 372/31 |
| 5,499,257 | 3/1996 | Nagano et al. ................ 372/31 |

FOREIGN PATENT DOCUMENTS

| 0328656 | 8/1989 | European Pat. Off. . |
| 61-209790 | 9/1986 | Japan . |
| 62-104087 | 5/1987 | Japan . |
| 62-104088 | 5/1987 | Japan . |
| 2-143481 | 6/1990 | Japan . |
| 3-124086 | 5/1991 | Japan . |

OTHER PUBLICATIONS

Patent Abstract of Japan, JPA No. 63–239502, Oct. 5, 1988.
Patent Abstract of Japan, JPA No. 64–48101, Feb. 22, 1989.
Patent Abstract of Japan, JPA No. 64–44501, Feb. 16, 1989.
Patent Abstract of Japan, JPA No. 63–101902, May 6, 1988.
Patent Abstract of Japan, JPA No. 61–21505, Jan. 30, 1986.
Patent Abstract of Japan, JPA No. 2–22702, Jan. 25, 1990.

*Primary Examiner*—Gregory L. Mills
*Attorney, Agent, or Firm*—Sughrue, Mion, Zinn, Macpeak & Seas, PLLC

[57] ABSTRACT

A laser machining apparatus according to the present invention describes characteristics of a laser oscillator with a function including laser power, pulse frequency and duty ratio, computes a command for a power supply unit in a feed forward control section according to a command based on the function and on the power, duty ratio and frequency, computes a command for a power supply unit in the feedback control section from a power command value and a power measurement value from the power sensor, and inputs these command to the power supply unit. Also the laser machining apparatus detects changes in characteristics in the laser oscillator and corrects the function for characteristics of the laser oscillator.

4 Claims, 69 Drawing Sheets

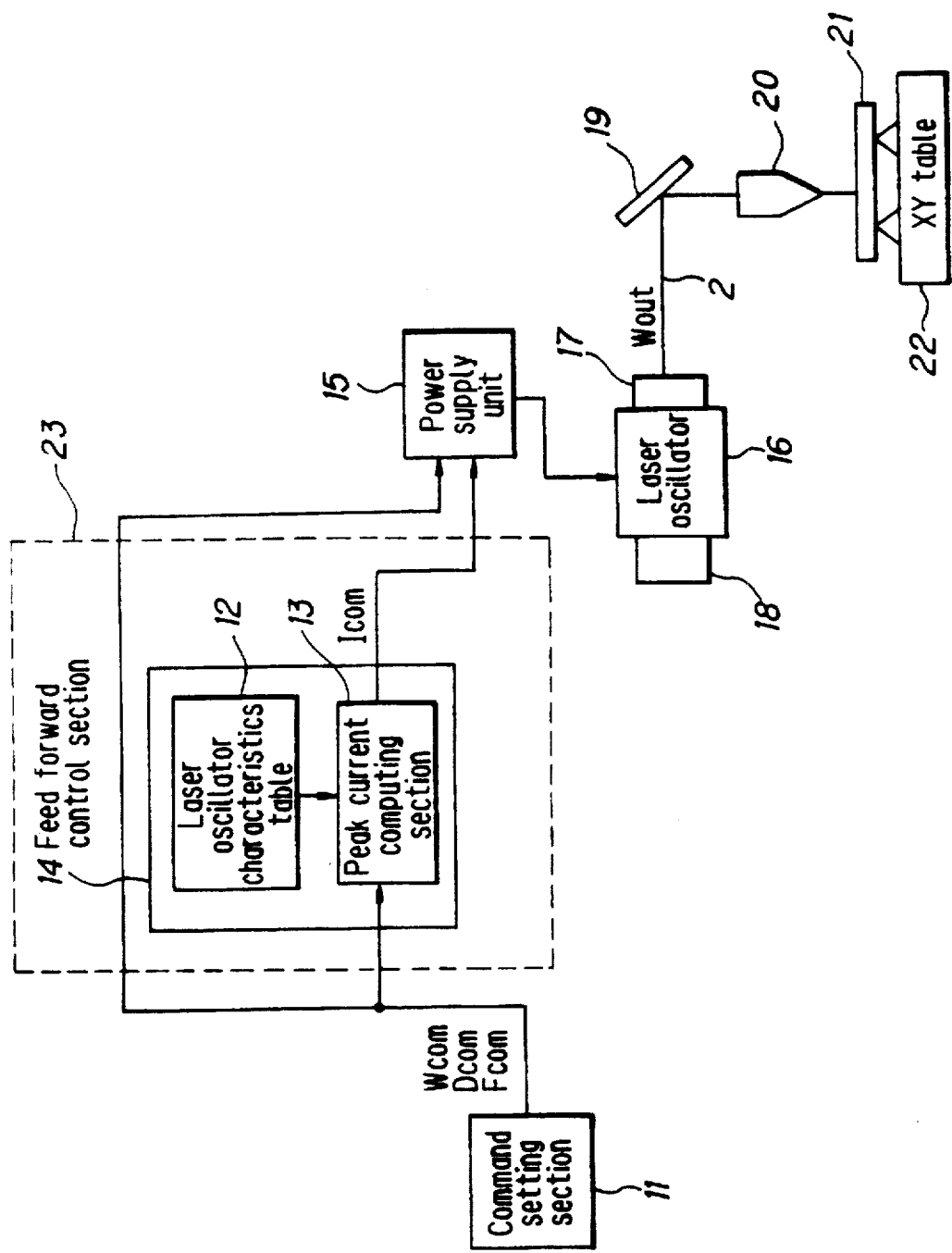

FIG. 3

| POWER (W) | DUTY RATIO (%) | FREQU-ENCY (Hz) | PEAK CURRENT (A) | POWER (W) | DUTY RATIO (%) | FREQU-ENCY (Hz) | PEAK CURRENT (A) | POWER (W) | DUTY RATIO (%) | FREQU-ENCY (Hz) | PEAK CURRENT (A) | POWER (W) | DUTY RATIO (%) | FREQU-ENCY (Hz) | PEAK CURRENT (A) |
|---|---|---|---|---|---|---|---|---|---|---|---|---|---|---|---|
| w1 | d1 | f1 | I1 | w1 | d1 | f2 | 117 | w1 | d1 | f3 | 133 | w1 | d1 | f4 | 149 |
| w2 | d1 | f1 | I2 | w2 | d1 | f2 | 118 | w2 | d1 | f3 | 134 | w2 | d1 | f4 | 150 |
| w3 | d1 | f1 | I3 | w3 | d1 | f2 | 119 | w3 | d1 | f3 | 135 | w3 | d1 | f4 | 151 |
| w4 | d1 | f1 | I4 | w4 | d2 | f2 | 120 | w4 | d1 | f3 | 136 | w4 | d2 | f4 | 152 |
| w1 | d2 | f1 | I5 | w1 | d2 | f2 | 121 | w1 | d2 | f3 | 137 | w1 | d2 | f4 | 153 |
| w2 | d2 | f1 | I6 | w2 | d2 | f2 | 122 | w2 | d2 | f3 | 138 | w2 | d2 | f4 | 154 |
| w3 | d2 | f1 | I6 | w3 | d2 | f2 | 123 | w3 | d2 | f3 | 139 | w3 | d3 | f4 | 155 |
| w4 | d2 | f1 | I8 | w4 | d3 | f2 | 124 | w4 | d3 | f3 | 140 | w4 | d3 | f4 | 156 |
| w1 | d3 | f1 | I9 | w1 | d3 | f2 | 125 | w1 | d3 | f3 | 141 | w1 | d3 | f4 | 157 |
| w2 | d3 | f1 | I10 | w2 | d3 | f2 | 126 | w2 | d3 | f3 | 142 | w2 | d3 | f4 | 158 |
| w3 | d3 | f1 | I11 | w3 | d3 | f2 | 127 | w3 | d3 | f3 | 143 | w3 | d3 | f4 | 159 |
| w4 | d4 | f1 | I12 | w4 | d4 | f2 | 128 | w4 | d4 | f3 | 144 | w4 | d4 | f4 | 160 |
| w1 | d4 | f1 | I13 | w1 | d4 | f2 | 129 | w1 | d4 | f3 | 145 | w1 | d4 | f4 | 161 |
| w2 | d4 | f1 | I14 | w2 | d4 | f2 | 130 | w2 | d4 | f3 | 146 | w2 | d4 | f4 | 162 |
| w3 | d4 | f1 | I15 | w3 | d4 | f2 | 131 | w3 | d4 | f3 | 147 | w3 | d4 | f4 | 163 |
| w4 | d4 | f1 | I16 | w4 | d4 | f2 | 132 | w4 | d4 | f3 | 148 | w4 | d4 | f4 | 164 |

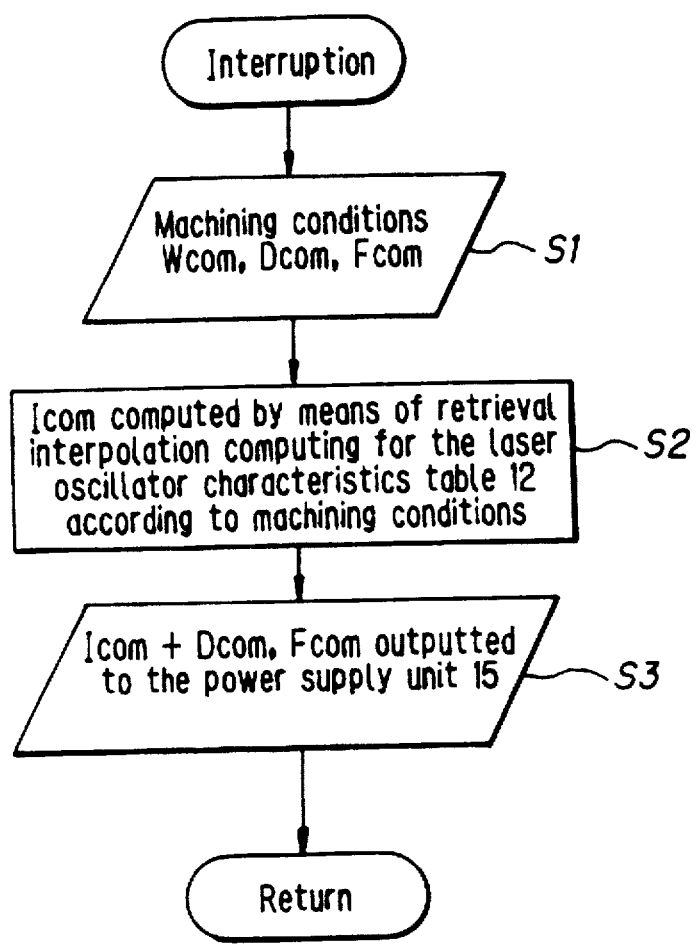

FIG.6

| POWER (W) | PEAK CURRENT (A) | FREQU-ENCY (Hz) | DUTY RATIO (%) | POWER (W) | PEAK CURRENT (A) | FREQU-ENCY (Hz) | DUTY RATIO (%) | POWER (W) | PEAK CURRENT (A) | FREQU-ENCY (Hz) | DUTY RATIO (%) | POWER (W) | PEAK CURRENT (A) | FREQU-ENCY (Hz) | DUTY RATIO (%) |
|---|---|---|---|---|---|---|---|---|---|---|---|---|---|---|---|
| w1 | I1 | f1 | d1 | w1 | I1 | f2 | d17 | w1 | I1 | f3 | d33 | w1 | I1 | f4 | d49 |
| w2 | I1 | f1 | d2 | w2 | I1 | f2 | d18 | w2 | I1 | f3 | d34 | w2 | I1 | f4 | d50 |
| w3 | I1 | f1 | d3 | w3 | I1 | f2 | d19 | w3 | I1 | f3 | d35 | w3 | I1 | f4 | d51 |
| w4 | I1 | f1 | d4 | w4 | I1 | f2 | d20 | w4 | I1 | f3 | d36 | w4 | I1 | f4 | d52 |
| w1 | I2 | f1 | d5 | w1 | I2 | f2 | d21 | w1 | I2 | f3 | d37 | w1 | I2 | f4 | d53 |
| w2 | I2 | f1 | d6 | w2 | I2 | f2 | d22 | w2 | I2 | f3 | d38 | w2 | I2 | f4 | d54 |
| w3 | I2 | f1 | d7 | w3 | I2 | f2 | d23 | w3 | I2 | f3 | d39 | w3 | I2 | f4 | d55 |
| w4 | I2 | f1 | d8 | w4 | I2 | f2 | d24 | w4 | I2 | f3 | d40 | w4 | I2 | f4 | d56 |
| w1 | I3 | f1 | d9 | w1 | I3 | f2 | d25 | w1 | I3 | f3 | d41 | w1 | I3 | f4 | d57 |
| w2 | I3 | f1 | d10 | w2 | I3 | f2 | d26 | w2 | I3 | f3 | d42 | w2 | I3 | f4 | d58 |
| w3 | I3 | f1 | d11 | w3 | I3 | f2 | d27 | w3 | I3 | f3 | d43 | w3 | I3 | f4 | d59 |
| w4 | I3 | f1 | d12 | w4 | I3 | f2 | d28 | w4 | I3 | f3 | d44 | w4 | I3 | f4 | d60 |
| w1 | I4 | f1 | d13 | w1 | I4 | f2 | d29 | w1 | I4 | f3 | d45 | w1 | I4 | f4 | d61 |
| w2 | I4 | f1 | d14 | w2 | I4 | f2 | d30 | w2 | I4 | f3 | d46 | w2 | I4 | f4 | d62 |
| w3 | I4 | f1 | d15 | w3 | I4 | f2 | d31 | w3 | I4 | f3 | d47 | w3 | I4 | f4 | d63 |
| w4 | I4 | f1 | d16 | w4 | I4 | f2 | d32 | w4 | I4 | f3 | d48 | w4 | I4 | f4 | d64 |

FIG. 13

| Frequency (Hz) | Duty ratio (%) | Correction percentage α |
|---|---|---|
| f 1 | d 1 | α 1 |
| f 1 | d 2 | α 2 |
| f 1 | d 3 | α 3 |
| f 1 | d 4 | α 4 |
| f 2 | d 1 | α 5 |
| f 2 | d 2 | α 6 |
| f 2 | d 3 | α 7 |
| f 2 | d 4 | α 8 |
| f 3 | d 1 | α 9 |
| f 3 | d 2 | α 10 |
| f 3 | d 3 | α 11 |
| f 3 | d 4 | α 12 |
| f 4 | d 1 | α 13 |
| f 4 | d 2 | α 14 |
| f 4 | d 3 | α 15 |
| f 4 | d 4 | α 16 |

FIG. 19

| Frequency (Hz) | Duty ratio (%) | Correction percentage $\beta$ |
|---|---|---|
| f 1 | d 1 | $\beta$ 1 |
| f 1 | d 2 | $\beta$ 2 |
| f 1 | d 3 | $\beta$ 3 |
| f 1 | d 4 | $\beta$ 4 |
| f 2 | d 1 | $\beta$ 5 |
| f 2 | d 2 | $\beta$ 6 |
| f 2 | d 3 | $\beta$ 7 |
| f 2 | d 4 | $\beta$ 8 |
| f 3 | d 1 | $\beta$ 9 |
| f 3 | d 2 | $\beta$ 10 |
| f 3 | d 3 | $\beta$ 11 |
| f 3 | d 4 | $\beta$ 12 |
| f 4 | d 1 | $\beta$ 13 |
| f 4 | d 2 | $\beta$ 14 |
| f 4 | d 3 | $\beta$ 15 |
| f 4 | d 4 | $\beta$ 16 |

FIG. 27
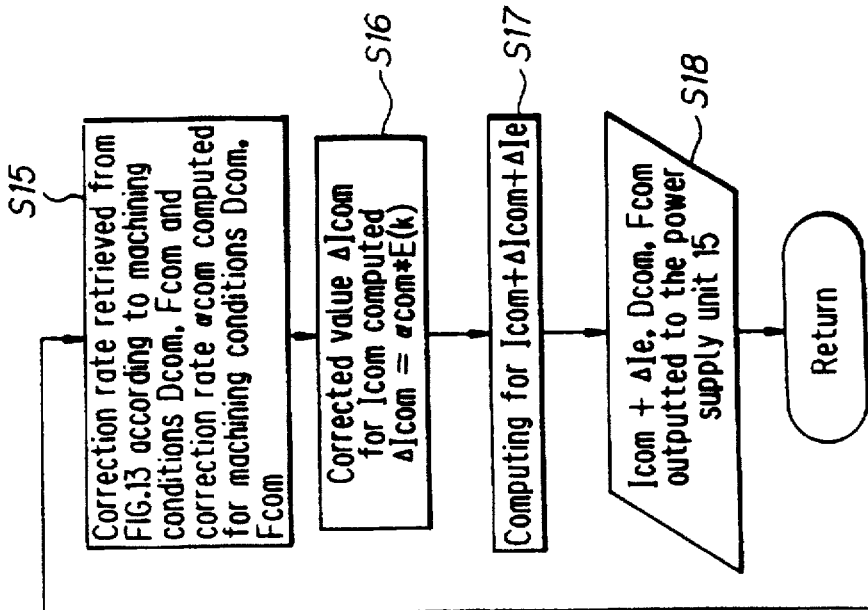
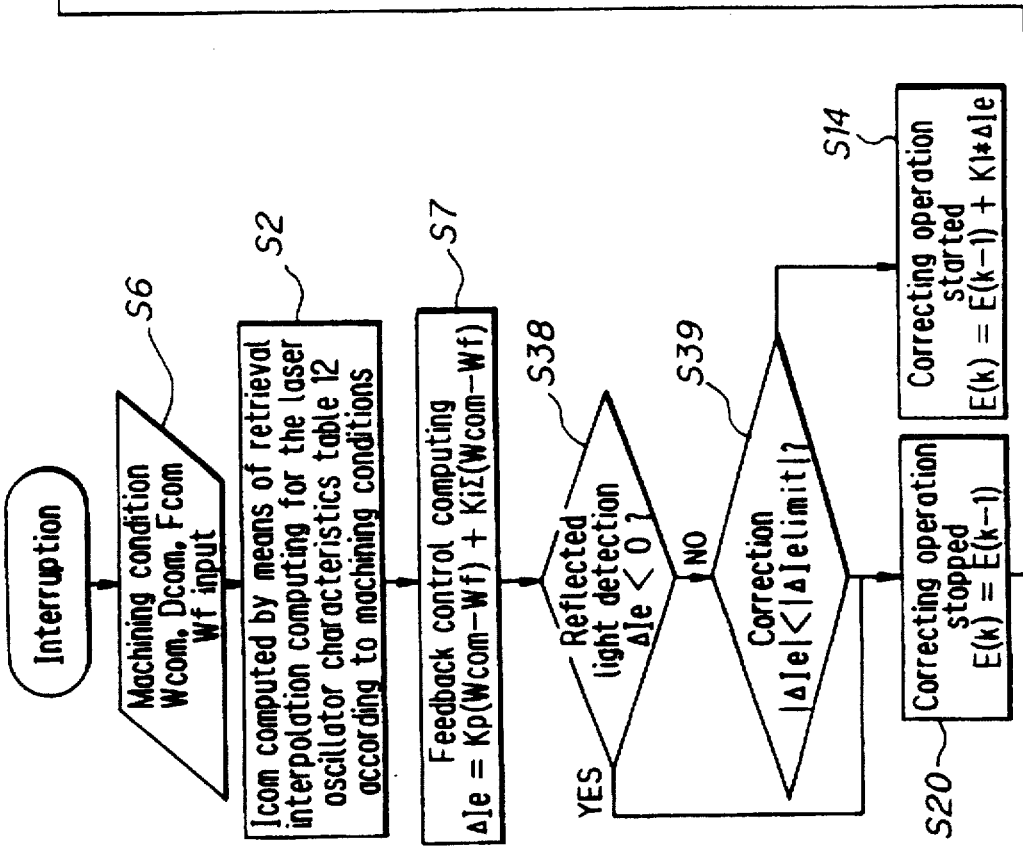

Frequency f1

Frequency f2

Frequency f1

Frequency f2

○ Gas determination/gas temperature state (1)
● Gas determination/gas temperature state (2)

FIG. 39

Frequency f1
Duty ratio d₁

| Power W | Ec |
|---|---|
| w1 | Ec1 |
| w2 | Ec2 |
| w3 | Ec3 |
| w4 | Ec4 |

Frequency f1
Duty ratio d₂

| Power W | Ec |
|---|---|
| w1 | Ec1 |
| w2 | Ec2 |
| w3 | Ec3 |
| w4 | Ec4 |

......

Frequency f4
Duty ratio d₄

| Power W | Ec |
|---|---|
| w1 | Ec1 |
| w2 | Ec2 |
| w3 | Ec3 |
| w4 | Ec4 |

W-Ec table

| Frequency | State S1 | State S2 |
|---|---|---|
| f1 | S1_1 | S2_1 |
| f2 | S1_2 | S2_2 |
| f3 | S1_3 | S2_3 |
| f4 | S1_4 | S3_4 |

Q(f,l_o) table

FIG. 41

| Power W | Ec' |
|---|---|
| w1 | Ec'1 |
| w2 | Ec'2 |
| w3 | Ec'3 |
| w4 | Ec'4 |

W-Ec' table

| Duty ratio \ Frequency | f1 | f2 | f3 | f4 |
|---|---|---|---|---|
| d1 | c1 | c5 | c9 | c13 |
| d2 | c2 | c6 | c10 | c14 |
| d3 | c3 | c7 | c11 | c15 |
| d4 | c4 | c8 | c12 | c16 |

S(f, d) table

| Frequency | State S1 | State S2 |
|---|---|---|
| f1 | S1_1 | S2_1 |
| f2 | S1_2 | S2_2 |
| f3 | S1_3 | S2_3 |
| f4 | S1_4 | S3_4 |

Q(f,l_o) table

LASER MACHINING APPARATUS AND METHOD OF CONTROLLING SAME

This is a Divisional application of application Ser. No. 08/429,208 filed on Apr. 26, 1995 now abandoned.

FIELD OF THE INVENTION

The present invention relates to a laser machining apparatus for executing specified laser machining on a workpiece and a method of controlling the same, and more particularly to a laser machining apparatus having power control and enabling high-speed and high-precision power control, and to a method of controlling the same.

BACKGROUND OF THE INVENTION

A laser machining apparatus of the same general type to which the invention pertains has been disclosed, for instance, in Japanese Patent Laid-Open Publication No. 209790/1986. The configuration of the laser machining apparatus is shown in FIG. 67. In this figure, designated at reference numeral 1 is a laser oscillator tube, at 2 a laser beam, at 3 a shutter with a reflection board, at 4 a power monitor, at 5 a central control section, at 6 a laser oscillator tube current setting section, at 7 a power level control, at 8 a shutter open/close control signal, at 9 a linear estimation mode, and at 10 a feedback mode.

A laser beam 2 emitted from the laser oscillator tube 1 is guided to the shutter 3, and irradiation of the laser beam used for machining on the outside is controlled by opening or closing the shutter 3. The surface of the shutter 3 is coated with a metallic film such as gold having a high reflection factor. When irradiation to the outside is not executed, the laser beam 2 is mirror-reflected by this surface, and is introduced into the power monitor 4 for detecting the power of the laser beam. The central control section 5 controls the laser oscillator tube current setting section 6 for setting the current flowing in the laser oscillator tube 1, detects the set value of the power level control 7 for setting the power of the laser beam as well as an output value of the power monitor 4, and provides controls over opening and closing of the shutter 3. The control mode executed by the central control section 5 is divided into a linear estimation mode 9 for previously linearizing a laser oscillator tube current value and a laser power, and the feedback mode 10 for feeding back an output value from the power monitor 4 to a laser current value.

Next description is made of the operation of the apparatus.

When the power supply for a laser machining apparatus is turned ON, the laser oscillator tube 1 oscillates with the shutter 3 kept closed. The central control section 5 sets a current value Ii in the laser oscillator tube current setting section 6, and detects a power Pi of the laser beam 2 being emitted by the power monitor 4. The above operations are executed depending on a current value Ii monitored at least 2 points or more. A spline function is prepared by means of interpolation such as the method of least squares or the method of approximation from the Ii and Pi. From this spline function, a linear estimation function g, as expressed by the expression (1) below, for deducing a function for a laser current value to a laser power.

After the preparatory operations have been executed, use of the apparatus is enabled.

An operator sets a necessary laser power with the power control 7, and the central control section 5 detects the power set-up value Pvolume [W]. The current value I to be set is immediately determined from this power set-up value Pvolume using the function in expression (1), and is set in the laser oscillator tube setting section 6. This is the linear estimation mode 9.

When the shutter 3 is kept closed and irradiation of a laser beam to the outside is not executed, the apparatus waits for a time constant ts for the power monitor and enters the feedback mode 10. In the feedback mode 10, an output value Pmonitor from the power monitor 4 is compared to the power set-up value Pvolume, and if the output value Pmonitor from the power monitor 4 is larger, the laser oscillator tube value current I is decreased by "I".

To irradiate a laser beam to the outside, the laser oscillator tube current set immediately before the shutter 3 is opened is maintained, and accurate emission of laser power is executed according to the current I. Also when a change occurs in the volume 7 during irradiation of a laser beam, maintenance of the current is immediately canceled, and a laser oscillator tube current value I corresponding to the changed power set-up value Pvolume is obtained through expression (1) and the value is set.

Also in the feedback mode 10, feedback for the laser oscillator tube current I is executed using a current value obtained by substituting an upper limit value Phigh (or a lower limit value Plow) which is higher (or lower) by several tens percent than the power set-up value Pvolume into the expression (1) as an upper limit value Ihigh (or a lower limit value Ilow) for a current. When the current I is larger than the upper limit value Ihigh or largely lower than the lower limit value Ilow, preparation of a linear estimation function, which is a preparatory step, is executed again.

With the output control means using both the feed forward control (described F/F control hereinafter) in which the I/O characteristics of a laser oscillator is stored in a memory unit previously and control of the laser oscillator is executed depending on this stored I/O characteristics, and the feedback control (described F/B control hereinafter) in which an actual laser output value selected as described above is compared to a laser output command value and the laser output is corrected according to a result of the comparison, it is possible to obtain laser output having a quick response speed.

FIG. 68 is a block diagram illustrating the general configuration of a laser machining apparatus having the conventional type of laser output control means for executing both the F/F control and F/B control, and in FIG. 68 designated at the reference numeral 16 is a laser oscillator for outputting a laser, at 15 a power supply unit for supplying an excitation power to the laser oscillator 16, at 18 a power sensor for detecting laser output from the laser oscillator 16, at 97 a laser output command signal for instructing an intensity of the laser output, at 101 an I/O characteristics memory unit for storing I/O characteristics of the laser oscillator 16, at 102 an F/F computing means for obtaining an output signal for an F/F control means 90 from the characteristics stored in the characteristics memory unit 5 and the laser output command signal 97, and at 90 an F/F control means comprising the characteristics memory unit 101 and the F/F computing means 102.

Also designated at 91 is an F/B control means for executing F/B control, at 109 an adding means for adding an output signal from the F/F control means 90 to an output signal from the F/B control means 91, at 95 an output signal from the F/F control means 90, at 96 an output signal from the F/B control means 91, and at 105 an output signal from the power sensor 18. Also in this figure, designated at 2 is a laser beam, at 108 a machining head for machining a workpiece, at 22 an XY table for moving a workpiece mounted thereon in the direction X or Y, at 94 an NC device for providing controls over the F/F control means 90, F/B control means 91, machining head 108, XY table 22, and a shutter (described later).

Also designated at the reference numeral 19 is a reflector for deflecting a laser beam from the laser oscillator 16, at 21 a workpiece as an object for machining, at 99 a focusing lens for focusing a laser beam from the reflector 19, at 18 a shutter for controlling laser beam output, at 98 a laser output control means comprising the F/F control means 90, F/B control means 91, and adding means 109.

Next description is made of the operation of this apparatus. At first description is made for operations of the laser output control means 98. FIG. 69 is a graph showing the I/O characteristics of the laser oscillator 16, plotted with an input to the laser oscillator 16 on the horizontal axis and an laser output on the vertical axis. The I/O characteristics of the laser oscillator 16 varies, as shown in FIG. 69, according to a form of laser oscillation output (continuous wave (CW) or a pulse), a pulse frequency, and duty ratio.

Of these, at least one is a storage signal for the characteristic memory unit 101. When Wa is given as a laser output command signal 97 from the NC device 94 in the F/F control means 90, the F/F computing means 102 obtains Ia as an input command value for the laser oscillator 16 from a storage signal in the characteristics memory unit 101, and provides Ia as an output signal 95 for the F/F control means 90.

Ia is given as an output signal 95 from the F/F control means 90 to an excitation power supply, and when a laser beam is outputted from the laser oscillator 16, if an output signal from the power sensor 18 is different from a value corresponding to the laser output command signal 4, deviation occurs between the laser output command signal 97 and an output signal 105 from the power sensor 18, and the laser output is corrected according to an output signal from the F/B control 91 so that the laser output becomes equal to a value corresponding to the laser output command signal 97.

If an output signal Ia from the F/F control means 90 is equal to an output to the laser oscillator I for obtaining a laser output Wa, deviation between the laser output command signal 97 and the output signal 105 from the power sensor 18 is zero, and also an output signal from the F/B control means is zero, and for this reason an operation for correcting the laser output is not executed.

Herein the F/B control means 91 comprises a filter and an F/B control computing means (not shown), and by inputting the step-formed laser output command signal 97 as well as an output signal 105 from the power sensor 18 having a certain responsibility, deviation between the laser output command signal 97 and the output signal 105 from the power sensor 18 is obtained accurately, thus computing for the F/B control being executed.

The I/O characteristics, one of the characteristics of the laser oscillator, varies, as described above, according to the laser oscillation output form (continuous wave (CW) or a pulse), a pulse frequency, and duty ratio. The I/O characteristics for CW, all the pulse frequencies and duties is not stored in the characteristics memory unit 101, but I/O characteristics for CW or certain pulse frequencies and duties is stored in the characteristics memory unit 101, and I/O characteristics for other pulse frequencies and duties is estimated by computing with the F/F computing means 102 from the stored I/O characteristics.

Next description is made for operations of a laser machining apparatus. The laser beam 2 outputted from the laser oscillator 16 is guided by the reflector 19 to above the workpiece 21 and then is focused onto a specified position on the workpiece 21 by a focusing lens 99 in the machining head 108. Also stored in a memory unit (not shown) in the NC device 94 are a plurality of machining conditions, namely a laser output, a laser oscillation output form (continuous wave or a pulse), a pulse frequency, a pulse duty ratio or the like, and optimal conditions are selected according to a material and a plate thickness of the workpiece 21, a machining speed, and a machining form, and the laser oscillator 16, power supply unit 15, machining head 108, XY table 22, shutter 17 or the like are controlled respectively according to the selected conditions.

In the central control section in the conventional type of laser machining apparatus, a linear estimation function is obtained from expression (1) above. Expression (1) is for computing a current value I required for outputting a power P, but the function is only for power P, and a frequency and a duty ratio are not taken into account. Generally an operating mode of a laser machining apparatus used in such a $CO_2$ laser machine is divided to a continuous wave mode in which a continuous wave is outputted, and a pulse mode in which a pulse wave is outputted, and generally laser machining such as cutting metal is carried out in the pulse mode. If a laser beam is controlled in the pulse mode, with a linear estimation function as expressed by the function for power P in expression (1), it is impossible to compute a current value I required for outputting the power P. Even if laser power control is executed by using the linear estimation function as described above, an error of power output becomes large, which makes it impossible to execute machining under good conditions.

Also with the linear estimation function expressed by expression (1), it has been impossible to execute the duty ratio controlling method in which an input current to a layer oscillator tube is limited and a laser power is controlled by keeping a peak value of current I given to the laser oscillator tube at constant level and also changing a duty ratio of the current. For this reason, the method can not be applied to a wide range of machining mode.

Also in the central control section in the conventional type of laser machining apparatus, as F/B control for providing the power set-up value as described by feeding back a laser power during machining is not executed, even if a power output error is generated during machining, there is no means for correcting it at all. For this reason, a laser power having a large error is outputted, which disables machining under good conditions.

Furthermore in the central control section in the conventional laser machining apparatus, in generally power fluctuation in a laser oscillator tube generated within a short period of time can be corrected, but there is provided no function for correction during machining. To execute correction, it is required to open or close a shutter and interrupt machining. When machining is executed continuously for a long time, change is generated in the characteristics of the laser oscillator tube and correction of linear estimation function is required. However, when, for instance, cutting a thick plate such as a soft steel plate, or when for a long time. However, there is no function for correcting a linear estimation function during machining, a power output error is generated, which sometimes causes machining fault.

In the central control section in the conventional type of laser machining apparatus, correction of a linear estimation function is basically executed only in the preliminary step, and unless a current I largely exceeds the upper limit value or the lower limit value, correction of the linear estimation function is not executed. For this reason, when the characteristics of the laser oscillator changes, an error in the linear estimation function becomes larger, a laser power having a large error is outputted, and machining cannot be executed under good conditions.

In the central control section in the conventional type of laser machining apparatus, in the feedback mode, the output value Pmonitor from the power monitor is compared to the power set-up value Pvolume, and if the output value Pmonitor from the power monitor is larger, correction is executed by reducing the laser oscillator tube current I by ΔI. However, this operation is executed only for correcting a set-up current value for the set-up value Pvolume, so that, if the machining conditions are changed during irradiation of a laser beam, a lower power having a large error is outputted, and machining under good conditions cannot be executed.

As the conventional type of laser machining apparatus has the configuration as shown in FIG. 69, there are the problems as described below.

At first, when an output signal from the F/F control means corresponding to the laser output command signal is given to the excitation power supply, if a value of a laser output outputted from the laser oscillator is different from a value of a laser output command signal, namely if the I/O characteristics stored in the characteristics memory unit is deviated from the I/O characteristics of an actual laser oscillator, the laser output is corrected according to an output signal from the F/B control means.

However, as a power sensor comprises a thermal pair, the response time is rather long, and correction for the laser output is made after the response for the power sensor has passed. In this case, in the first transitional time until the laser output is corrected, or in the last transitional time, overshoot or undershoot occurs in a response of laser output. As the size of overshoot or undershoot in this laser output increases as deviation between the I/O characteristics stored in the characteristics memory unit and I/O characteristics of an actual laser oscillator becomes larger, it becomes a big problem in laser machining in which high machining precision is required.

Secondly, when obtaining an output signal for the F/F control means from a laser output command signal with an F/F computing means, as an output signal for a pulse frequency or a duty ratio not stored in the characteristics memory unit, the value is estimated by the F/F computing means using the I/O characteristics stored in the characteristics memory unit, and an error may occur in the estimate. The error in estimate varies according to the laser oscillation output form, pulse frequency, and duty ratio, and the error in estimate may become very large under certain conditions. For this reason, overshoot or undershoot occurs in the first transition or last transition of laser output. The causes for making the error in estimate include, for instance, a low output, and a low duty ratio.

Thirdly, overshoot or undershoot in the first transition or last transition of laser output may occur when a time constant or delay time in the F/B control means is not optimal. This phenomenon occurs because deviation between an output signal from a laser output detector and a value corresponding to a laser output command signal can not accurately be obtained.

Fourth, when a workpiece is made of a material having a high reflection factor, most of a laser beam irradiated onto the workpiece is reflected without contributing to machining and reaches a laser oscillator. If a reflected light of this laser beam is introduced into a power sensor of a laser oscillator, a detection signal for the reflected light is superimposed on an output signal from the laser output detector, and a laser output detection value, which is larger than a value corresponding to the actual laser output, is compared to a laser output command value in an error amplifier, which disables accurate correction of laser output.

Fifthly, if there is a function for limiting an electric current outside the laser output control means, for instance, in the output section of the power supply source, and power supplied to the laser oscillator is limited by this function, laser power outputted from the laser oscillator has a value smaller than that indicated by the laser output instruction signal, so that an error is continuously generated between the laser output instruction signal and an output signal from the power sensor and an output signal from the F/B control means is increased ultimately up to the infinite, thus normal operation of the F/B control means being disadvantageously disabled.

Sixthly, when a reflection mirror constituting a laser oscillator is broken, laser power remarkably drops, and if power from the power supply source is continuously supplied in this state to the laser oscillator, components of the laser oscillator other than the reflection mirror may sometimes be broken.

SUMMARY OF THE INVENTION

It is a first object of the present invention to obtain a laser machining apparatus which can execute machining under good conditions even if operated in the pulse mode.

Also it is a second object of the present invention to obtain a laser machining apparatus which can execute duty ratio control under good conditions.

It is a third object of the present invention to obtains a laser machining apparatus which can reduce an output error in a power to zero in the normal condition even if an error in power is generated.

It is a fourth object of the present invention to obtain a laser machining apparatus which can correct changes in the characteristics during machining even if characteristics in a laser oscillator changes.

It is a fifth object of the present invention to obtain a laser machining apparatus which can maintain characteristics of an actual laser oscillator with little data.

It is a sixth object of the present invention to obtain a laser machining apparatus which can realize laser output having a good responsibility and a method for the same.

Furthermore it is a seventh object to obtain a laser machining apparatus which executes F/B control enabling accurate operations for correction of laser output and a method for the same.

Also it is a eighth object of the present invention to provide a laser machining apparatus and a laser machining method for the same which can prevent malfunctions in F/B control.

It is a ninth object of the present invention to provide a laser machining apparatus and a laser machining method for the same which can provide higher safety.

In the laser machining apparatus according to the present invention, when a command value setting means sets at least one of a frequency or a duty ratio of a laser oscillator and a power, an input for the power supply unit is computed using a laser oscillator characteristics function describing characteristics of a laser oscillator having at least one of a frequency or a duty ratio as a parameter.

In another laser machining apparatus according to the present invention, when a the command value setting means sets at least one of a frequency or a duty ratio of a laser oscillator and a power, a first operation rate is computed from a power command value from the command value setting means and a power measurement value measured by a power sensor in the F/B control means. Also a second operation rate is computed using outputs from a laser oscillator characteristics function describing means having at least one of a frequency or a duty ratio as a parameter as well as from the command setting means in the feed forward means. Furthermore, an input to the power supply unit are computed from the first operation rate and the second operation rate.

In another laser machining apparatus according to the present invention, in addition to the feature according to the present invention, the F/F control means is corrected by the feed forward correcting means.

In another laser machining apparatus according to the present invention, in addition to the feature according-to the present invention, the F/F control means is corrected by the feed forward correcting means.

In another laser machining apparatus according to the present invention, in addition to features according to the present invention, whether operation of the feed forward correcting means for correcting the F/F control means is enabled or not is controlled by the correcting operation control means.

In another laser machining apparatus according to the present invention, a command for a correcting operation is controlled by the correcting operation control means according to the present invention according to a reflected light from a workpiece.

In another laser machining apparatus according to the present invention, a command for a correcting operation is controlled according to an output from the F/B control means by the correcting operation control means according to the present invention.

In another laser machining apparatus according to the present invention, a command for a correcting operation is controlled at a certain time interval by the correcting operation control means according to the present invention.

In another laser machining apparatus according to the present invention, a command for a correcting operation is controlled by the correcting operation control means according to the present invention according to energy consumption in the laser oscillator.

In another laser machining apparatus according to the present invention, a command for a correcting operation is controlled by the correcting operation control means according to the present invention using a gas density or a gas temperature in the laser oscillator.

In another laser machining apparatus according to the present invention, a command for a correcting operation is controlled by the correcting operation control means according to the present invention using NC.

In another laser machining apparatus according to the present invention, a command for a correcting operation is controlled by the correcting operation control means according to the present invention according to a material of a workpiece.

In another laser machining apparatus according to the present invention, a command for a correcting operation is controlled by the correcting operation control means according to the present invention just after gas exchange in the laser oscillator.

In another laser machining apparatus according to the present invention, a command for a correcting operation is controlled by the correcting operation control means according to the present invention just after power is turned ON.

In another laser machining apparatus according to the present invention, whether correction by the feed forward correcting means according to the present invention is executed correctly or not is checked by an abnormality checking means.

In another laser machining apparatus according to the present invention, in addition to the feature according to the present invention, when the abnormality checking means determines that the state is abnormal, a command for exchange of gas in the laser oscillator is issued.

In another laser machining apparatus according to the present invention, the state detected by the correcting operation control means or the abnormality checking means according to the present invention is displayed.

In another laser machining apparatus according to the present invention, an input to a power supply unit for a laser oscillator is computed using a laser oscillator characteristics function described by a first function describing means for converting, of discharged energy quantities received by a gas in a laser oscillator, an energy quantity approximate to energy contributing to a laser power to a current value at least at a oscillation limit of laser output, and a second function describing means for describing a relation between similarity in each frequency and duty ratio and a laser power according to the present invention.

In order laser machining apparatus according to the present invention, an input to a power supply unit for a laser oscillator is computed using a laser oscillator characteristics function described by a first function describing means for converting, of discharged energy quantities received by a gas in a laser oscillator, an energy quantity approximate to energy contributing to a laser power to a current value at least at a oscillation limit of laser output, a characteristics correcting function describing means for correcting the similarity described above, and a second function describing means for describing a relation between the corrected similarity and a laser power according to the present invention.

In another laser machining apparatus according to the present invention, feed forward correction is executed by adjusting a parameter indicating a current at an oscillation limit of laser output.

In another laser machining apparatus according to the present invention, a discriminating means is connected to outputs from a computing means and to a command output means, and contents of computing executed by a computing means is changed by outputting a computing condition signal to the computing means according to a machining condition set by the command output means.

In another laser machining apparatus according to the present invention, whether selected machining conditions such as a material, a plate thickness, and a machining speed include a large error respectively in the feed forward control or not is checked according to the I/O characteristics, and if it is determined that the error is large, contents of the F/F control is changed.

In another laser machining apparatus according to the present invention, a discriminating means is connected to an output terminal of a computing means as well as to an output terminal of a F/B control means, and if it is determined that a value of an output from the F/B control means is higher than a specified level set by the discriminating means, an output signal from the feed forward means is changed by the computing means according to a computing condition signal from the discriminating means.

In another laser machining apparatus according to the present invention, a discriminating means is connected to an abnormality displaying means, and an alarm or the like is displayed by the abnormality displaying means at a timing just before a value of an output signal from the F/B control means reaches a level at which an output signal from the feed forward control means is made valid or invalid.

In another laser machining apparatus according to the present invention, an estimated error in F/F control is detected according to a value of an output from the F/B control means, whether the value of an output from the F/B control means is higher than a specified level or not is checked, and if it is determined that the value is higher than the specified value, an output signal from the F/F control means is changed.

In another laser machining apparatus according to the present invention, the F/F control means comprises a characteristics storage means for storing therein characteristics of a laser oscillator and a feed forward computing means, while the discriminating means is connected to output from the computing means, characteristics storage means and F/B control means, and when an value of an output signal from the F/B control means is higher than a specified level set by the discriminating means, characteristics of the laser oscillator are evaluated according to an output signal from the discriminating means, and characteristics of the laser oscillator stored in the characteristics storage means are modified according to a result of the evaluation.

In another laser machining apparatus according to the present invention, an output signal from the F/F control means is made invalid until an operation for correcting characteristics of a laser oscillator stored in the characteristics storage means is complete.

In another laser machining apparatus according to the present invention, an estimated error in F/F control is detected according to a value of an output from the F/B control means, whether the value from the F/B control means is higher than a specified level or not is checked, and if it is determined that the value is higher than the specified level, I/O characteristics of the laser oscillator is modified.

In another laser machining apparatus according to the present invention, the discriminating means is connected to output from the computing means and F/B control means as well as to output from or input to the power supply unit, and if size of overshoot or undershoot in an input signal or an output signal for a power supply unit is larger than a specified one and at the same time a value of an output signal from the F/B control means is less than a specified value, an output signal from the F/B control means is made invalid.

In another laser machining apparatus according to the present invention, an abnormality displaying means is connected to the discriminating means, and an alarm or the like is displayed by the abnormality displaying means before size of overshoot or undershoot in an input signal or an output signal for a power supply unit and a value of an output signal from the F/B control means reach a level where an output signal from the F/F control means and an output signal from the F/B control means is made valid or invalid respectively.

In another laser machining apparatus according to the present invention, whether size of overshoot or undershoot in an input signal or an output signal for a power supply unit is higher than a specified value and at the same time a value of an output signal from F/B control is lower than a specified value or not is checked, and if it is determined that size of overshoot or undershoot of the input signal or output signal is higher than the specified value and at the same time a value of the output signal from F/B control is less than the specified value, an output signal from F/B control is made invalid.

In another laser machining apparatus according to the present invention, the F/B control means comprises a filter and a feedback computing means, the discriminating means is connected to output from the F/B control means, input or output of a power supply unit, characteristics storage means as well a to a filter, and if size of overshoot or undershoot of an input signal or an output signal for the power supply unit is more than a specified value and at the same time a value of an output signal from the F/B control means is more than a specified value, characteristics of the laser oscillator is measured, characteristics stored in the characteristics storage means is modified according to a result of the measurement, and if size of overshoot or undershoot of an input signal or an output signal for the power supply unit is more than a specified value and at the same time a value of an output signal from the F/B control means is less than a specified value, a time constant and a delay time for the filter are corrected.

In another laser machining apparatus according to the present invention, an output signal from the F/F control means or an output signal from the F/B control means is made invalid respectively until the discriminating means completes an operation for correcting the characteristics of the laser oscillator or an operation for correcting a time constant as well as a delay time of the filter.

In another laser machining apparatus according to the present invention, if size of overshoot or undershoot of an input signal or an output signal for a power supply unit is higher than a specified value and at the same time a value of an output signal from F/B control is higher than a specified value, characteristics of a laser oscillator is measured, characteristics stored in the laser oscillator is modified according to a result of the measurement, and if size of overshoot or undershoot of an input signal or an output signal for a power supply unit is more than a specified value and at the same time a value of an output signal from F/B control is less than a specified value, a time constant and a delay time of the filter in F/B control is corrected.

In another laser machining apparatus according to the present invention, an operation for measuring characteristics of a laser oscillator is executed when a shutter of the laser oscillator is kept closed.

In another laser machining apparatus according to the present invention, an operation for measuring characteristics of a laser oscillator is executed while a laser beam is penetrated through a workpiece used in start of laser machining, namely during so called the piercing operation.

In another laser machining apparatus according to the present invention, the discriminating means is connected to a computing means and a command output means, materials to be machined each comprising a highly reflective material is previously stored in the command output means, and when any of these materials is selected, the computing means makes invalid an output signal from the F/B control means based on an output signal from the discriminating means.

In another laser machining apparatus according to the present invention, materials to be machined each made of a highly reflective material are previously stored, and when any of the materials is selected for machining, an output signal from F/B control is made invalid.

In another laser machining apparatus according to the present invention, the discriminating means is connected to output of a computing means as well as of a F/B control means and to output of an output detecting means, and in a state where an output signal from the F/F control means is made valid and an output signal from the F/B control means made invalid, a difference between a value of an output detecting means in a state where a shutter of the laser oscillator is closed and a value of an output signal from the output signal from the output detecting means in a state where a shutter of the laser oscillator is opened is obtained, and if the difference is more than a specified value, an output signal from the F/B control means is changed by the computing means according to an output signal from the discriminating means.

In another laser machining apparatus according to the present invention, in a state where an output signal from F/F control is made valid and an output signal from F/B control made invalid, a difference between a laser output value detected in a state where a shutter of the laser oscillator is closed and an output value detected in a state where a shutter of the laser oscillator is opened is obtained, and if the difference is more than a specified value, an output signal from F/B control is changed.

In another laser machining apparatus according to the present invention, the determining means is connected to outputs of the F/B control means, computing means, instruction output means, and output detecting means, and if a value of difference value between an output signal from the instruction output means and an output signal from the output detecting means is more than a specified value set by the determining means, the computing means makes an output signal from the F/B control means invalid according to a computing condition signal from the determining means and also disables operations of the F/B control means.

Also in other control method for the laser machining apparatus according to the present invention, if it is determined that a value of difference between a laser output instruction value and a detected laser output value is more than a preset specified value, an output signal from the F/B control processing is made invalid, and also operations of the feedback control processing are disabled.

In another laser machining apparatus according to the present invention, the determining means is connected to outputs of the abnormal state display means, computing means, instruction output means, and output detecting means, and if it is determined by the determining means that a value of difference between an output signal from the instruction output signal and an output signal from the output detecting means is more than a specified value set by the determining means, the abnormal state display means provides alarm display or the like, and/or operations of the laser machining apparatus are stopped.

Also in other control method for the laser machining apparatus according to the present invention, if it is determined that a value of difference between a laser output instruction value and a detected laser output value is more than a preset specified value, an alert display such as alarm is provided, and/or operations of the laser machining apparatus are stopped.

Other objects and features of this invention will become understood from the following description with reference to the accompanying drawings.

BRIEF DESCRIPTION OF THE DRAWINGS

FIG. 1 is a block diagram illustrating configuration of a laser machining apparatus according to Embodiment 1-1;

FIG. 3 is a chart illustrating a processing according to Embodiment 1-1;

FIG. 4 is a flow chart illustrating a processing according to Embodiment 1-1;

FIG. 6 is a chart illustrating characteristics of a laser oscillator according to Embodiment 1-2;

FIG. 13 is a chart illustrating a characteristics fluctuation correction rate in a laser oscillator according to Embodiment 1-5;

FIG. 19 is a chart illustrating a correction rate storage table in which a correction rate for fluctuation of characteristics in a laser oscillator generated when gas characteristics changes;

FIG. 27 is a flow chart illustrating a processing according to Embodiment 1-10;

FIG. 39 is a chart illustrating data for describing characteristics of a laser oscillator according to Embodiment 1-20;

FIG. 41 is a chart illustrating data for describing characteristics of a laser oscillator according to Embodiment 1-21;

DETAILED DESCRIPTION OF THE PREFERRED EMBODIMENTS

[Embodiment 1]

Figure 2A:
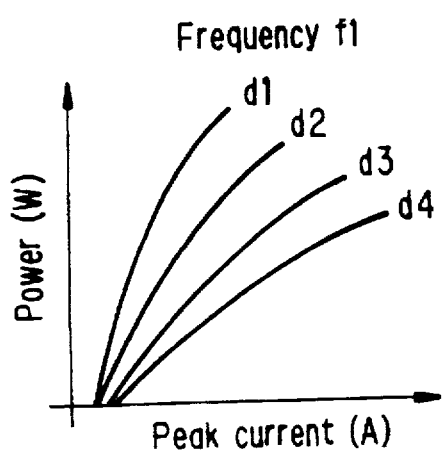
FIG. 2A is a graph showing characteristics of a laser oscillator according to Embodiment 1-1.
Figure 2B:
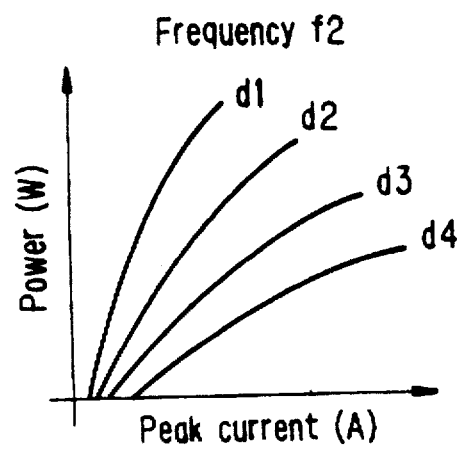
FIG. 2B is a graph showing characteristics of a laser oscillator according to Embodiment 1-1.
Figure 2C:
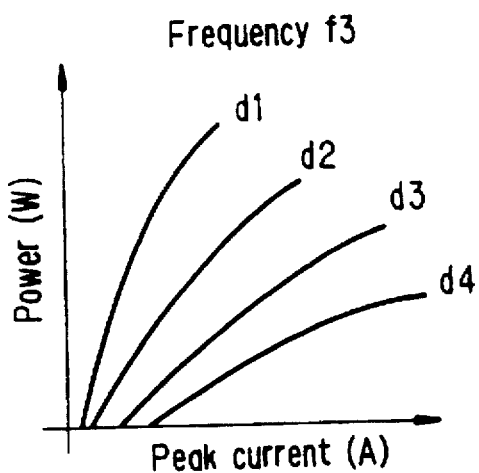
FIG. 2C is a graph showing characteristics of a laser oscillator according to Embodiment 1-1.
Figure 2D:
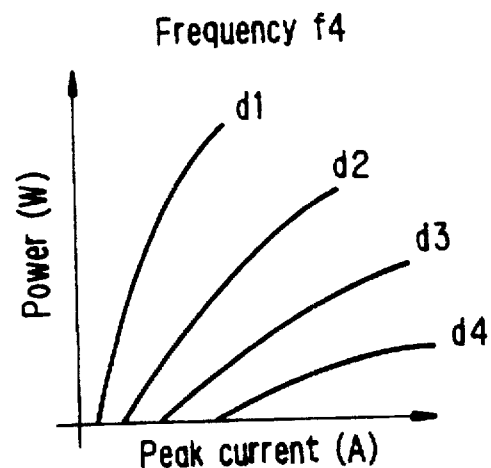
FIG. 2D is a graph showing characteristics of a laser oscillator according to Embodiment 1-1.

Next, a description is made for a laser machining apparatus according to Embodiment 1 of the present invention with reference to the related drawings.

[Embodiment 1-1]

FIG. 1 is a block diagram illustrating configuration of a laser machining apparatus according to Embodiment 1-1. In this figure, the reference numeral 2 indicates a laser beam, which is the same as that used in the conventional type of apparatus. The reference numeral 11 indicates a command value setting means for giving a command for machining conditions for laser machining, which is, for instance, a command setting section for outputting command values including at least one of a frequency and a duty ratio of a laser oscillator as well as a power. It should be noted that the command setting section 11 is realized, for instance, by means of NC (a numerical control device). The reference numeral 12 indicates an laser oscillator characteristics describing means for describing a laser oscillator characteristics function having at least one of a frequency or a duty ratio as a parameter, which is, for instance, a laser oscillator characteristics table in which the laser oscillator characteristics function is described.

Also designated at the reference numeral 13 is a peak current computing section for computing a peak current in a laser oscillator from the machining conditions, at 14 a F/F control means for computing an input to a power supply unit using an output from the command setting section 11 and the laser characteristics table 12, which is, for instance, a F/F control section comprising the laser oscillator characteristics table 12 and the peak current computing section 13. Also designated at the reference numeral 15 is a power supply unit for supplying an excitation power to a laser oscillator, at 16 a laser oscillator characteristics, at 17 a shutter for interrupting a laser beam, and at 18 a power sensor for measuring a power of the laser beam 2 to which a portion of the laser beam 2 irradiated from the laser oscillator 16 is inputted and which measures a power of the laser beam. Also designated at the reference numeral 19 is a mirror, at 20 a nozzle for focusing the laser beam 2, at 21 a workpiece, at 22 an XT table for moving the workpiece 21, at the dotted line section 23 a computer system section comprising a CPU (central processing unit), a memory, an input/output interface (described I/O hereinafter), and a processing in the dotted line section is realized by software.

FIG. 2 is a graph showing laser oscillation characteristics according to Embodiment 1-1. In this figure, the horizontal axis indicates a peak current (A) inputted into the laser oscillator 16, while the vertical axis shows a power (W), which is an average power of the laser beam 2 outputted from the laser oscillator 16. FIG. 2A, FIG. 2B, FIG. 2C and FIG. 2D show laser oscillator characteristics when the frequency is f1, f2, f3 and f4 respectively. In each figure, d1, d2, d3 and d4 indicate a duty ratio of a current inputted to the oscillator 16 respectively, and there are the relations of d1>d2>d3>d4 and f1<f2<f3<f4 among them.

FIG. 3 is a chart showing characteristics of a laser oscillator characteristics used in the laser machining apparatus according to Embodiment 1-1. This table shows data as a result of measurement of a peak current (a wave height value of a current) I1 to I64 under the conditions that the laser power is w1, w2, w3, w4, the duty ratio is d1, d2, d3, d4 and the frequency is f1, f2, f3, f4.

Next description is made for operations of the laser machining apparatus according to Embodiment 1-1 constructed as described above. At first, machining conditions for laser machining are set in the command setting section 11. A command for machining conditions includes a command value for a laser power Wcom, a command value for a duty ratio Dcom, and a command value for a frequency Fcom. Then the machining conditions are inputted to the F/F control section 14, and a command value for a peak current Icom to be inputted into the power supply unit 15 is computed.

The power supply unit 15 receives a peak current command value Icom, a duty ratio command value Dcom for machining conditions, and frequency command value Fcom each computed in the F/F control section 14, and a current having the peak current command value Icom, duty ratio command value Dcom, and frequency command value Fcom is inputted into the laser oscillator 16.

The laser oscillator 16 irradiates the laser beam 2. A light path of the irradiated laser beam 2 is changed by the mirror 19, and the laser beam is focused by the nozzle 20 for machining the workpiece 21. In this step, if the peak current command value Icom inputted to the laser oscillator 16 is not an appropriate value not suited to characteristics of the laser oscillator 16, the power output Wout from the laser oscillator 16 does not match a laser power command value Wcom, and a machining fault is generated. As the F/F control section 14 executes open loop control not requiring data feedback from the power sensor 18 or other related components, it should have accurate laser oscillator characteristics. The laser oscillator characteristics is shown in FIG. 2. This figure shows a relation among a peak value of a current (a peak current) inputted to the laser oscillator 16, a duty ratio, a frequency, and a laser power (average power) output. As shown in FIG. 2, the laser power is a function of the three parameters of a peak current, a duty ratio, and a frequency.

Next description is made for operations of the F/F control section. The F/F control section 14 comprises the laser oscillator characteristics table 12 and the peak current computing section 13. The laser oscillator characteristics table 12 stores therein characteristics of a laser oscillator as a form of data table as shown in FIG. 3. The peak current computing section 13 computes a peak current corresponding to machining conditions using the laser oscillator characteristics table 12. Namely, machining conditions including a laser power command value Wcom, duty ratio command value Dcom, and frequency command value Fcom are inputted from the command setting section 11 to the peak current computing section 13, which retrieves 8 peak current values close to the inputted machining conditions from the laser oscillator characteristics table 12.

For instance, in a case where the relations among the machining conditions Wcom, Dcom, and Fcom are as expressed by the expressions of w1<Wcom<w2, d2<Dcom<d3, and f3<Fcom<f4, the data at eight points close to the machining conditions retrieved are, as shown in FIG. 3, (w1, d2, f3, I37), (w2, d2, f3, I38), (w1, d3, f3, I41), (w2, d3, f3, I42), (w1, d2, f4, I53), (w2, d2, f4, I54), (w1, d3, f4, I57), and (w2, d3, f4, I58), and the peak current values for the retrieved 8 points are (I37, I38, I41, I42, I53, I54, I57, I58). Then a peak current value Icom for the machining conditions (Wcom, Dcom, Fcom) is computed by using the retrieved data and by means of interpolation and the computed value is outputted. The peak current computing section 13 and the laser oscillator characteristics table 12 play a role of a function for describing the laser oscillator characteristics respectively, and is called a laser oscillator characteristics function describing means. Also the laser oscillator characteristics table 12 is previously stored in a memory.

FIG. 4 is a flow chart illustrating a processing in the dotted line section 23 relating to Embodiment 1-1. This processing is executed by interruption at a time interval. In step S1, machining conditions of laser power command value Wcom, duty ratio command value Dcom, and frequency command value Fcom are inputted from the command setting section 11. In step S2, a peak current command value Icom is computed using the inputted machining conditions and the laser oscillator characteristics table 12. In step S3, a processing for outputting each of the command values Icom, Dcom, and Fcom to the power supply unit 15 is executed.

As described above, the F/F control section 14 is constructed so that it has accurate laser oscillator characteristics such as a laser power, a duty ratio, a frequency, and a peak current, and for this reason even in a case where machining is executed in the pulse mode, an accurate peak current can be computed and also in open loop control, a power for the laser oscillator can accurately be controlled.

[Embodiment 1-2]

Figure 5:
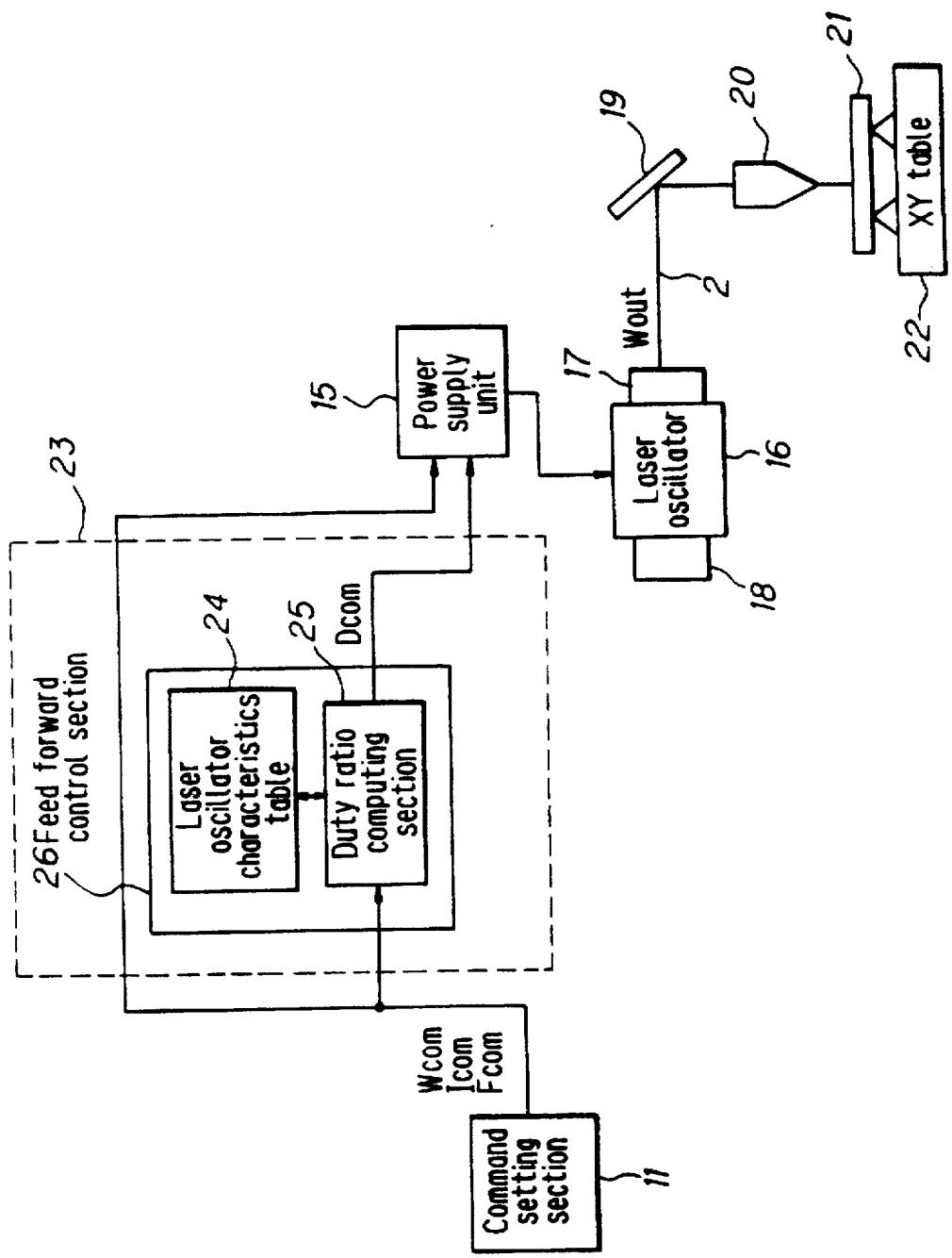
FIG. 5 is a block diagram illustrating configuration of a laser machining apparatus according to Embodiment 1-2.
Figure 7:
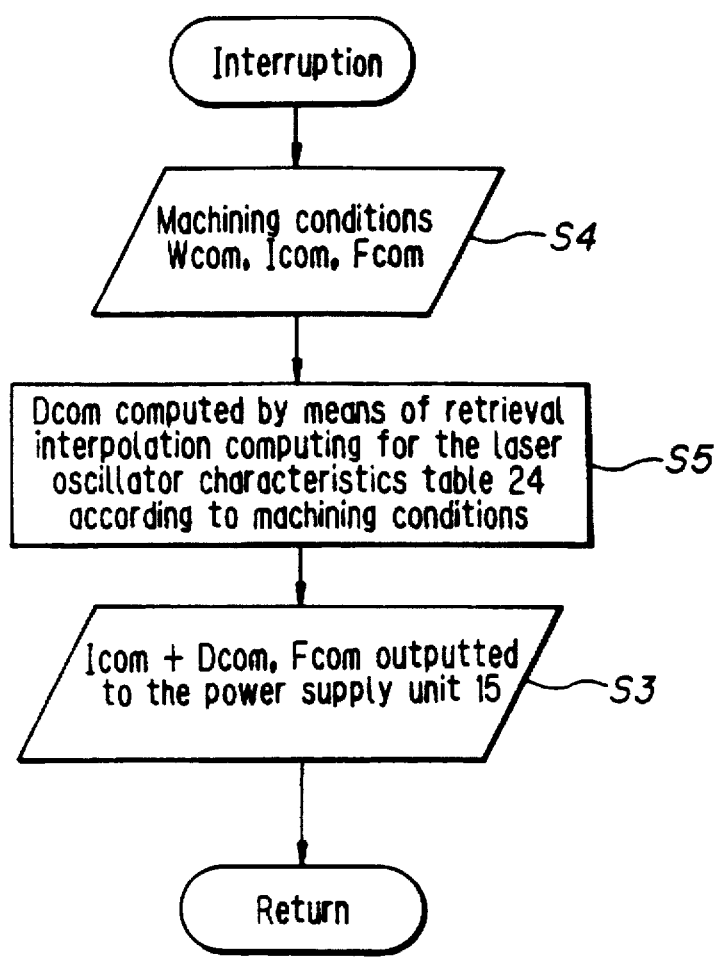
FIG. 7 is a flow chart illustrating a processing according to Embodiment 1-2.

Next description is made for a laser machining apparatus according to Embodiment 1-2 of the present invention. FIG. 5 is a block diagram illustrating configuration of the laser machining apparatus according to Embodiment 1-2, FIG. 6 is a chart illustrating characteristics of a laser oscillator used in the laser machining apparatus according to Embodiment 1-2, and FIG. 7 is a flow chart illustrating a processing in the F/F control section related to Embodiment 1-2.

In FIG. 5, the same reference numerals are assigned to the same components as those in Embodiment 1-1. In this figure, designated at the reference numeral 24 is a laser oscillator characteristics table in which characteristics of a laser oscillator is described, at 25 a duty ratio computing section for computing a duty ratio for the laser oscillator from machining conditions, and at 26 a F/F control section comprising the laser oscillator characteristics table 24 and the duty ratio computing section 25. FIG. 6 is prepared by measuring duty ratio d1 to d64 when power is w1, w2, w3, w4, a peak current is I1, I2, I3, I4, and a frequency is f1, f2, f3, f4 respectively.

Next description is made for operations of the laser machining apparatus according to Embodiment 1-2 having the configuration as described above. At first, machining conditions for laser machining are set in the command setting section 11. Instructions for machining conditions consists of a laser power command value Wcom, a peak current command value Icom, and a frequency command value Fcom. Then, the machining conditions are inputted into the F/F control section 26, and a duty command value Dcom to be inputted into the power supply unit 15 is computed.

Inputted to the power supply unit 15 are the peak current command value Icom computed in the F/F control section 26 and the duty ratio command value Dcom and frequency command value Fcom each as a machining condition, and a current corresponding to the peak current command value Icom, duty ratio command value Dcom, and frequency command value Fcom are inputted into the laser oscillator 16.

Next description is made for operations of the F/F control section 26. The F/F control section 26 comprises the laser oscillator characteristics table 24 and the duty ratio computing section 25. The laser oscillator characteristics table 24 has characteristics of the laser oscillator as a form like a data table shown in FIG. 6. The duty ratio computing section 25 computes a duty ratio according to machining conditions using the laser oscillator characteristics table 24.

Namely, inputted to the duty ratio computing section 25 are machining conditions comprising a laser power command value Wcom, a duty ratio command value Dcom, and a frequency command value Fcom from the command setting section 11, and the duty ratio computing section 25 retrieves duty ratios for 8 points close to the machining conditions like in Embodiment 1-1, and description thereof is omitted. Then a duty ratio command value Dcom for the machining conditions is computed from the duty ratios retrieved as described above and using interpolation, and the computed duty ratio is outputted. The duty ratio computing section 25 and laser oscillator characteristics table 24 work as a function for described characteristics of a laser oscillator respectively and are called laser oscillator characteristics function describing means. The laser oscillator characteristics table 24 is previously stored in a memory.

. Next, a processing in the dotted section 23 is made with reference to the flow chart shown in FIG. 7. This processing is executed by interrupting at a time interval. In step S4, machining conditions consisting of a laser power command value Wcom, a peak current command value Icom, and a frequency command value Fcom are inputted from the command setting section 11. In step S5, duty ratio command value Dcom is computed using the inputted machining conditions and the laser oscillator characteristics table 24. In step S3, a processing like in step S3 in Embodiment 1 shown in FIG. 4 is executed.

As described above, as the F/F control section 26 is constructed so that it has the accurate laser oscillator characteristics comprising a laser power, a peak current, a frequency, and a duty ratio, so that, even in a case where machining is executed in the pulse mode and in addition by controlling the duty ratio, an accurate duty ratio can be computed, also in the open loop control, and a power for a laser oscillator can accurately be controlled.

[Embodiment 1-3]

Figure 8:
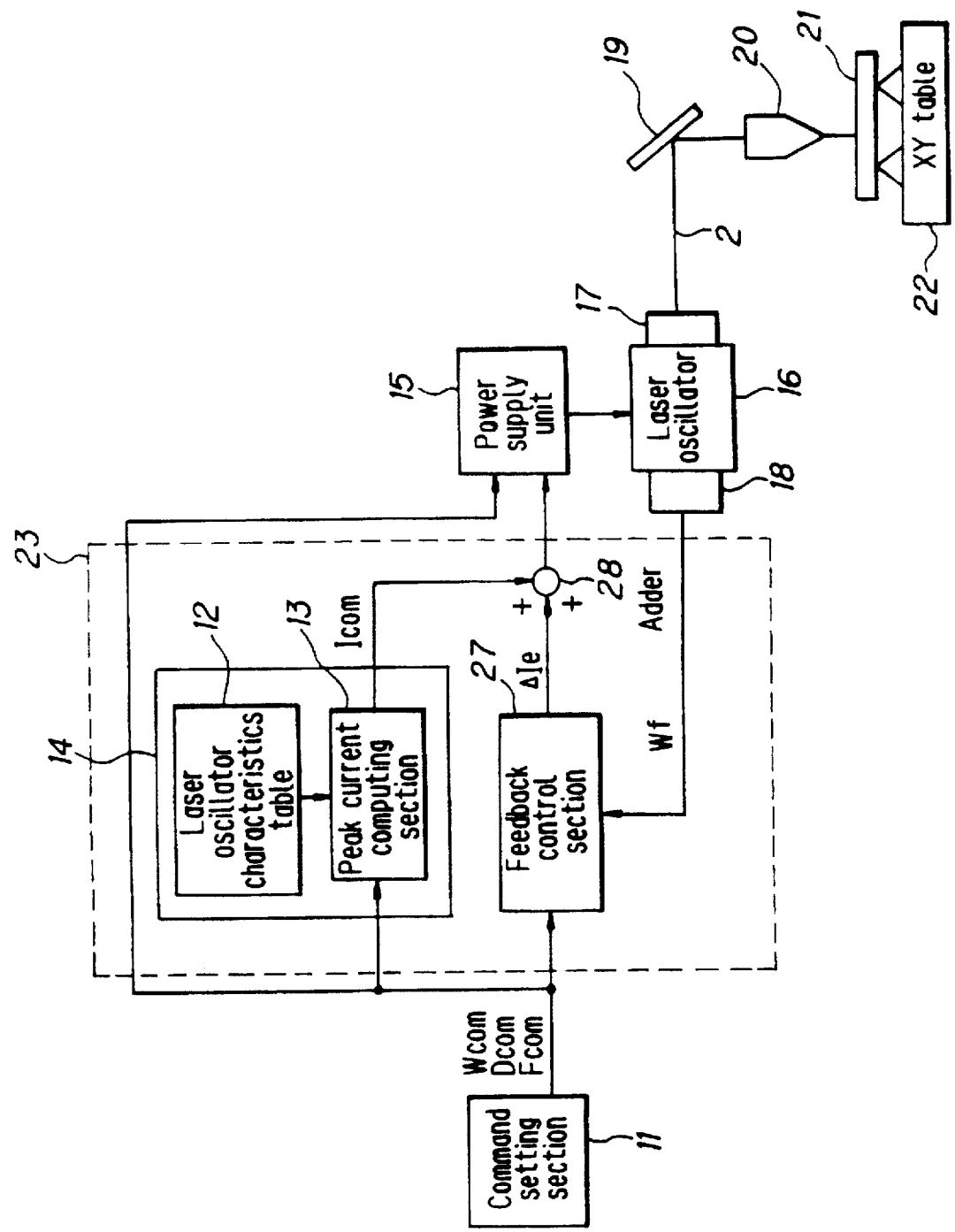
FIG. 8 is a block diagram illustrating configuration of a laser machining apparatus according to Embodiment 1-3.
Figure 9:
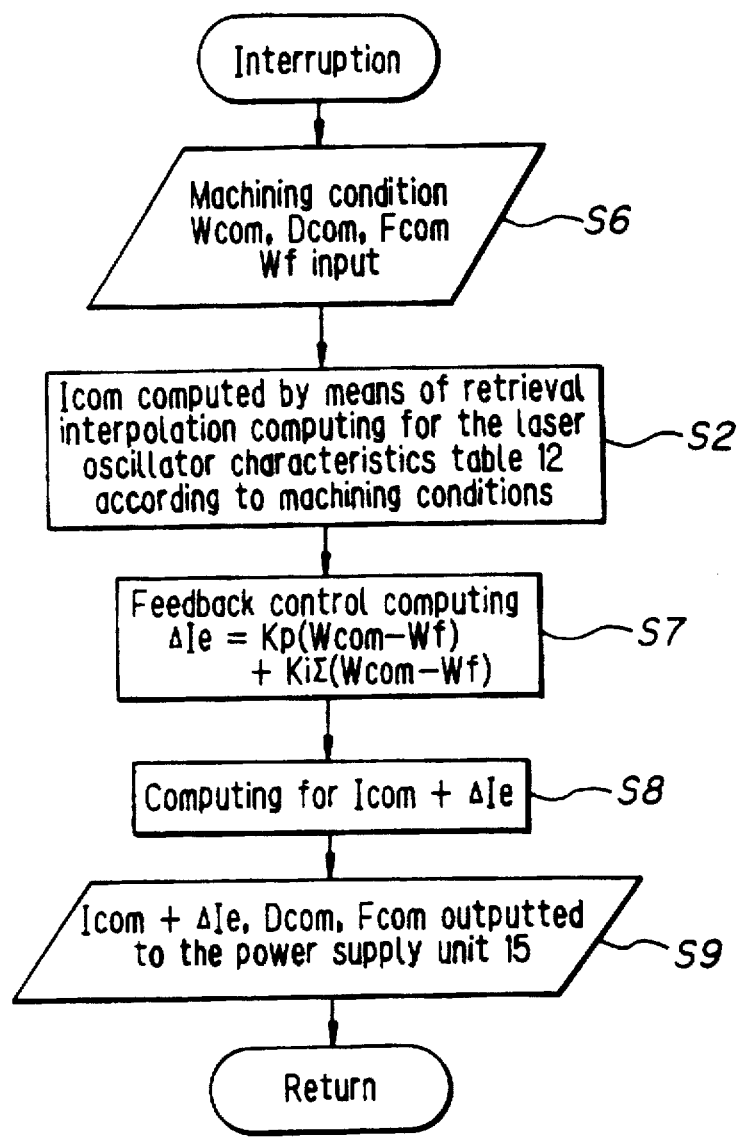
FIG. 9 is a flow chart illustrating a processing according to Embodiment 1-3.

Next, a description is made for a laser machining apparatus according to Embodiment 1-3. FIG. 8 is a block diagram illustrating configuration of the laser machining apparatus according to Embodiment 1-3, and FIG. 9 is a flow chart illustrating a processing according to Embodiment 1-3. In FIG. 8, the same reference numerals are assigned to the same components as those in Embodiment 1-1 shown in FIG. 1, and description thereof is omitted. In this figure, designated at the reference numeral 27 is a F/B control means, which computes an operation rate from a power command value from the command setting section 11 and a power measurement value measured by the power sensor 18, and it is for instance a F/B control section. The reference numeral 28 indicates a computing means for adding two operation rates, and it is for instance an adder.

Next, a description is made for operations of the laser machining apparatus according to Embodiment 1-3 as constructed as described above. At first, a laser command value Wcom, a duty ratio command value Dcom, and a frequency command value Fcom are set as command values for machining condition for laser machining in the command setting section 11. Then the machining conditions are inputted into the F/F control section 14, and a peak current command value Icom, which is an operation rate to be instructed to the power supply unit 15, is computed. Also inputted into the F/F control section 27 are a laser power command value Wcom and a laser power measurement value Wf obtained from the power sensor 18. Computing for control such as computing for PI control (proportional integration control computing) is executed so that a power error between the inputted laser power command value Wcom and a laser power measurement value Wf will become zero (0), and the current correction value ΔIe is outputted as an operation rate.

For instance, computing as expressed by the following expression (2) is executed.

$$\Delta Ie = Kp \times (Wcom - wf) + Ki \times \Sigma (Wcom - Wf) \tag{2}$$

wherein Kp and Ki are constants.

Then the adder 28 adds a power error between a peak current commamd value Icom outputted from the F/F control section 14 and a current correction value ΔIc, and the sum is outputted to the power supply unit 15.

It is assumed herein that characteristics of a laser oscillator in the F/F control section 14 coincides with that of the laser oscillator 16. As there is no error in the characteristics of the F/F control section 14, the laser oscillator 16 outputs a laser power equivalent to the laser power command value Wcom, when the laser measurement value Wf becomes equivalent to the laser power command value Wcom. Namely, the power error becomes zero (0), and also an output from the F/B control section 27 becomes zero.

If the characteristics of a laser oscillator in the F/F control section 14 do not coincide with that of the laser oscillator 16, although the laser power command value Wcom does not coincide with the laser power measurement value Wf transitionally, usually the F/B control section 27 outputs a current correction value ΔIe for changing an input current into the power supply unit 15 so that the laser power command value Wcom will coincide with the laser power measurement value Wf.

In this embodiment, there are provided the F/B control section 27 and the F/F control section 14, and the F/F control section 14 works so that a high speed response control for laser power command will be executed, while the F/B control section 27 works so that a power error between the laser power command value Wcom and the laser power measurement value Wf will quickly becomes zero.

Next, a description is made for processing in the dotted line section 23 with reference to the flow chart shown in FIG. 9.

This processing is executed by interrupting at a time interval. In step S6 shown in FIG. 9, a laser power command value Wcom, a duty ratio command value Dcom, and a frequency command value Fcom are inputted as commands for machining conditions from the command setting section 11, while a laser power measurement value Wf is inputted from the power sensor 18. In step S2, the same processing as that in Embodiment 1-1 is executed. Step S7 is a processing by the F/B control section 27, in which computing for control as expressed by the expression (2) is executed from the laser power command value Wcom and the laser power measurement value wf and a current correction rate ΔIe is computed. In step S8, the peak current command value obtained in step S2 is added to the current correction value ΔIe. In step S9, sum of Icom and ΔIe obtained in step S8 and a duty ratio command value Dcom and a frequency command value Fcom as machining conditions are outputted to the power supply unit 15.

As described above, in this embodiment, the F/F control section 14 is constructed so that it has the accurate laser oscillator characteristics comprising a laser power, a duty ratio, a frequency, and a peak current, so that, even in a case where machining is executed in the pulse mode, an accurate peak current can be obtained, and also in the open loop control, a power from the laser oscillator can accurately be controlled. Also even in a case where an error is generated in the laser oscillator characteristics table 12 in the F/F control section 14 and an error is generated in a laser power output, a laser power is fed back, and F/B control is executed by the F/B control section 27 so that the power error will become zero (0), and for this reason high precision and high reliability laser power control with an output error of zero can be realized constantly.

[Embodiment 1-4]

Figure 10:
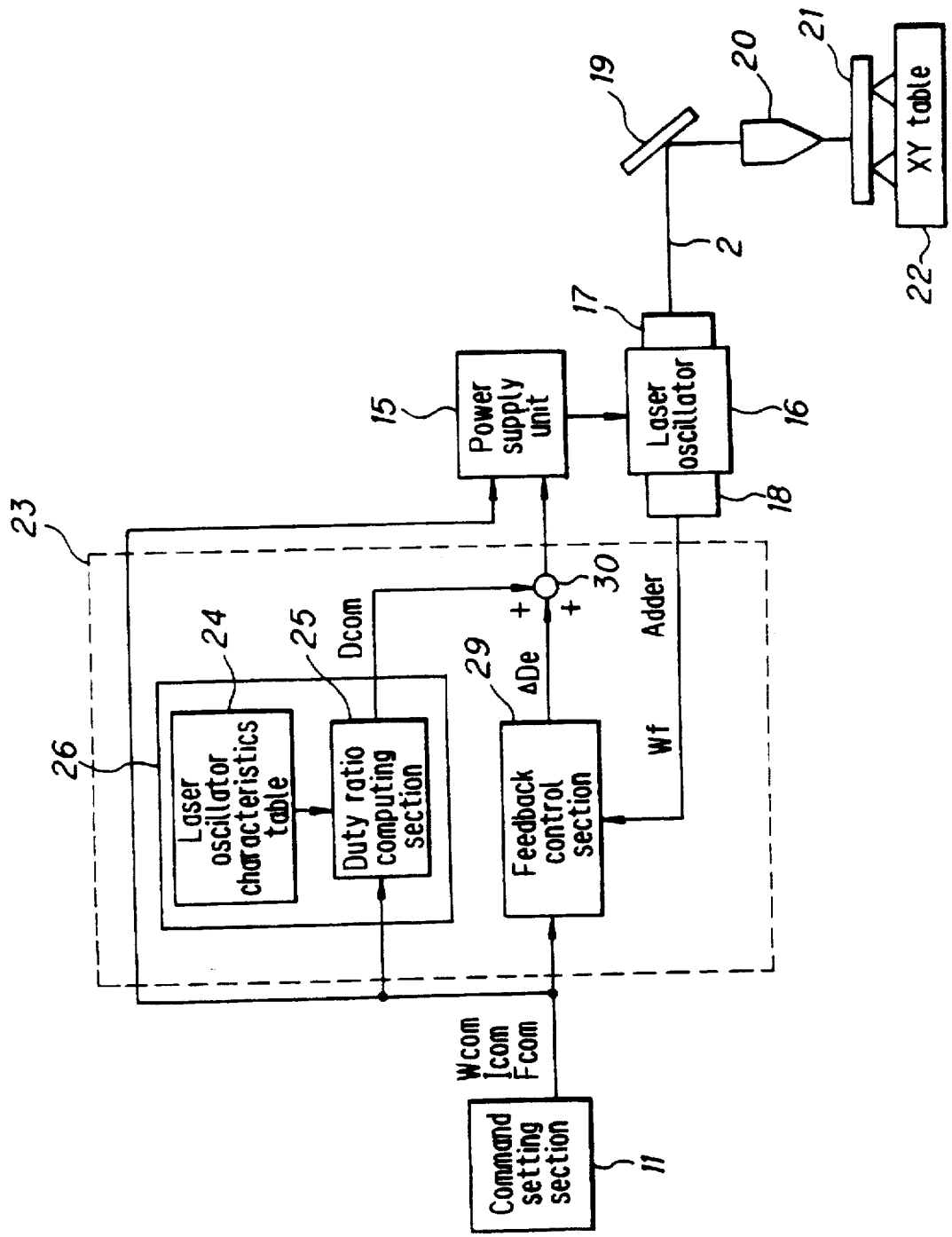
FIG. 10 is a block diagram illustrating configuration of a laser machining apparatus according to Embodiment 1-4.
Figure 11:
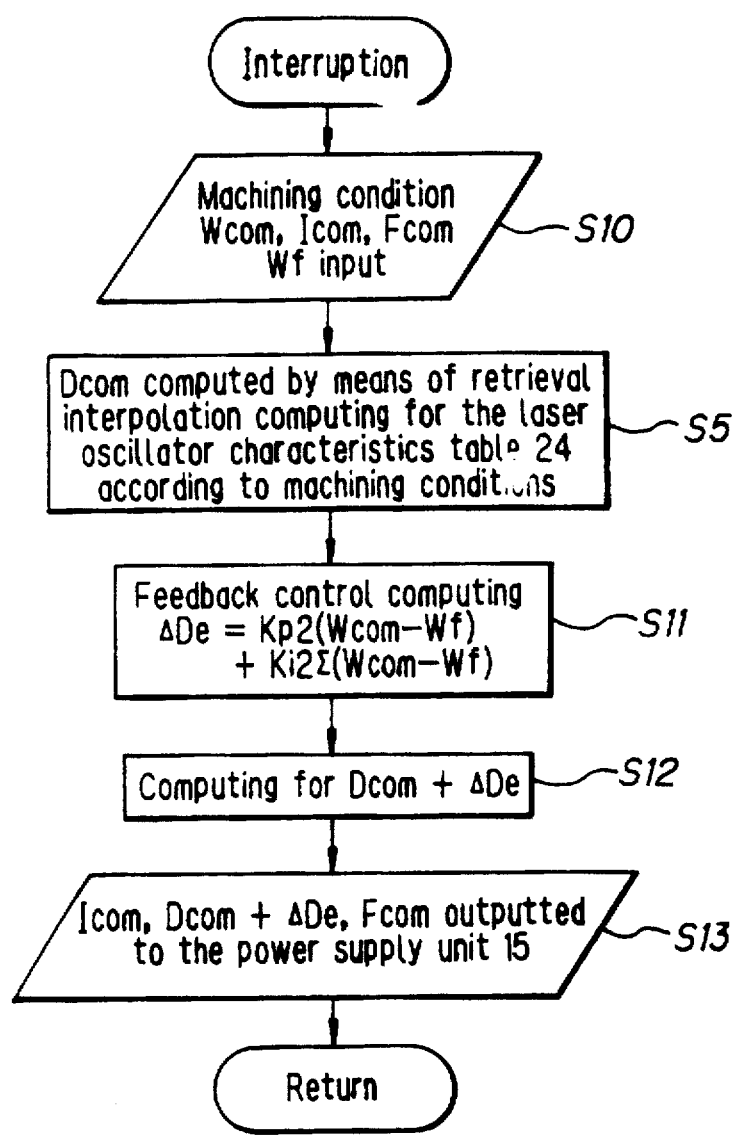
FIG. 11 is a flow chart illustrating a processing according to Embodiment 1-4.

Next description is made for a laser machining apparatus according to Embodiment 1-4 of the present invention. FIG. 10 is a block diagram illustrating configuration of the laser machining apparatus according to Embodiment 1-4, and FIG. 11 is a flow chart illustrating a processing in Embodiment 1-4. In FIG. 10, the same reference numerals are assigned to the same components as those in Embodiment 1-2 shown in FIG. 5 and description thereof is omitted herein. In this figure, the reference numeral 29 indicates an F/B control section, and the reference numeral 30 indicates an adder.

Next description is made for operations of the laser machining apparatus according to Embodiment 14 having the configuration as described above. At first, a laser power command value Wcom, a peak current command value Icom, and a frequency command value Fcom are set as commands for machining conditions for laser machining in the command setting section 11. Then the machining conditions are inputted into the F/F control section 26, and a duty ratio command value Dcom to be instructed into the power supply unit 15 computed. Also inputted to the F/B control section 29 are a laser power command value Wcom and a laser power measurement value Wf obtained from the power sensor 18. Computing for control such as PI control is executed so that a power error between the inputted laser power command value Wcom and the laser power measurement value Wf will become zero, and a duty ratio correction rate ΔDe is outputted. For instance, computing as expressed by the expression (3) below is executed.

$$\Delta De = Kp2 \times (Wcom - wf) + Ki2 \times \Sigma(Wcom - Wf) \qquad (3)$$

wherein Kp2 and Ki2 are constants.

Then the adder 30 adds a power error between a duty ratio command value Dcom outputted from the F/F control section 26 to a duty ratio correction value Δe, and the sum is outputted to the power supply unit 15. It is assumed herein that characteristics of a laser oscillation in the F/F control section 26 coincides with that of the laser oscillator 16. As there is no error in the characteristics of the F/F control section 26, the laser oscillator 16 outputs a laser power equivalent to the laser power command value Wcom. In a case where external disturbance such as reflected light does not enter the power sensor 18, a laser power is correctly measured by the power sensor 18, so that the laser power measurement value Wf becomes equivalent to the laser power command value Wcom. Namely the power error becomes zero (0), and also an output from the F/B control section 29 becomes zero.

If the characteristics of a laser oscillator in the F/F control section 26 does not coincide with that of the laser oscillator 16, although the laser power command value Wcom does not coincide with the laser power measurement value Wf transitionally, usually the F/B control section 29 outputs a duty ratio correction value ΔDe for changing an input current into the power supply unit 15 so that the laser power command value Wcom will coincide with the laser power measurement value Wf.

In this embodiment, there are provided the F/B control section 29 and the F/F control section 26, and the F/F control section 26 works so that a high speed response control for laser power command will be executed, while the F/B control section 29 works so that a power error between the laser power command value Wcom and the laser power measurement value Wf will quickly becomes zero.

Then description is made for a processing in the dotted line section 23 with reference to the flow chart shown in FIG. 11. This processing is executed by interrupting at a time interval. In step S10 shown in FIG. 11, a laser power command value Wcom, a peak current command value Icom, and a frequency command value Fcom are inputted as commands for machining conditions from the command setting section 11, while a laser power measurement value Wf is inputted from the power sensor 18. In step S5, the same processing as that in Embodiment 1-2 shown in FIG. 7 is executed. Step S11 is a processing by the F/B control section 29, in which computing for control as expressed by the expression (3) is executed from the laser power command value Wcom and the laser power measurement value wf and a duty ratio correction rate ΔDe is computed. In step S12, the duty ratio command value obtained in step S5 is added to the duty ratio correction value ΔDe. In step S13, sum of Dcom and ΔDe obtained in step S12 and a peak current command value Icom and a frequency command value Fcom as machining conditions are outputted to the power supply unit 15.

As described above, in this embodiment, the F/F control section 26 is constructed so that it has the accurate laser oscillator characteristics comprising a laser power, a peak current, a frequency, and a duty ratio, so that, even in a case where machining is executed in the pulse mode, an accurate duty ratio can be obtained. Also in the open loop control, a power from the laser oscillator 16 can accurately be controlled. Also even in a case where an error is generated in the laser oscillator characteristics in the F/F control section 26 and an error is generated in a laser power output, a laser power is fed back, and F/B control is executed so that the power error will become zero (0), and for this reason high precision and high reliability laser power control with an output error of zero can be realized constantly.

[Embodiment 1-5]

Figure 12:
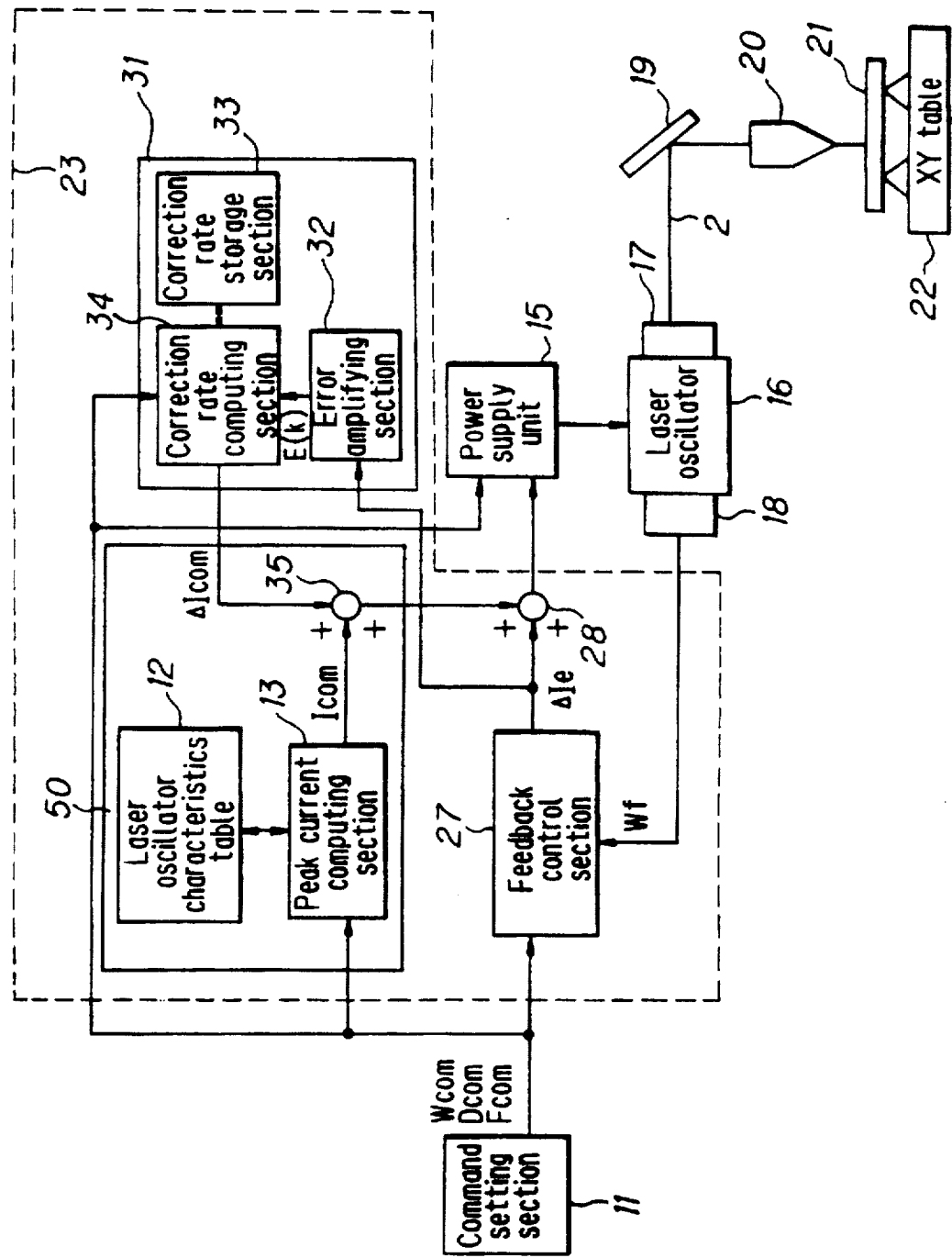
FIG. 12 is a block diagram illustrating configuration of a laser machining apparatus according to Embodiment 1-5.
Figure 14:
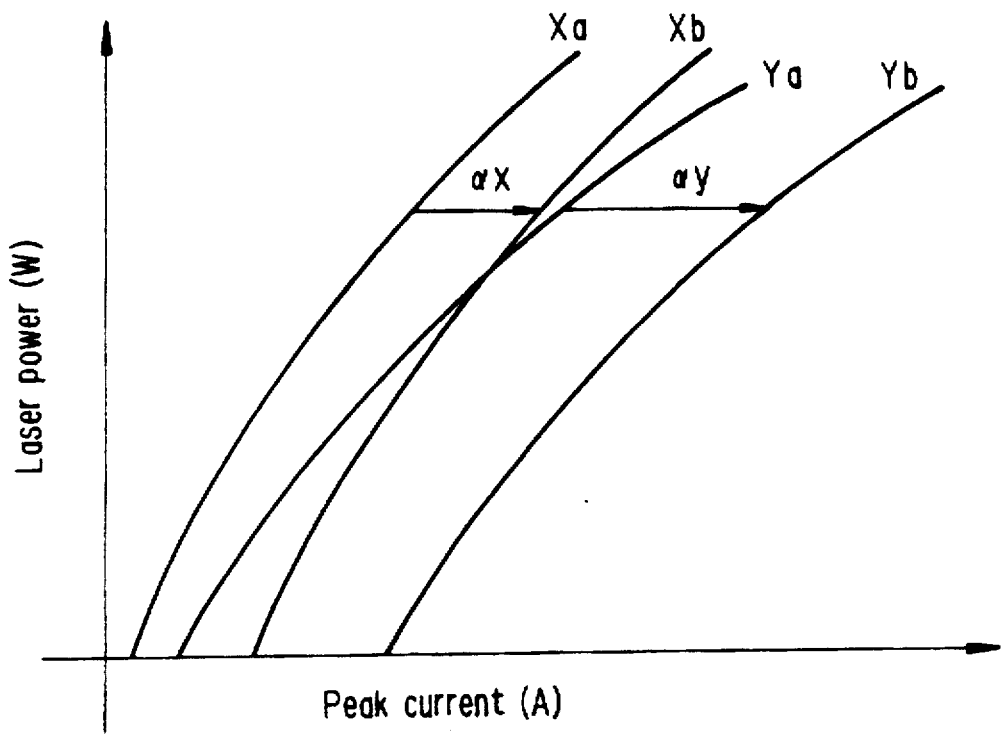
FIG. 14 is a graph showing change of a laser oscillator due to change in gas characteristics according to Embodiment 1-5.
Figure 15:
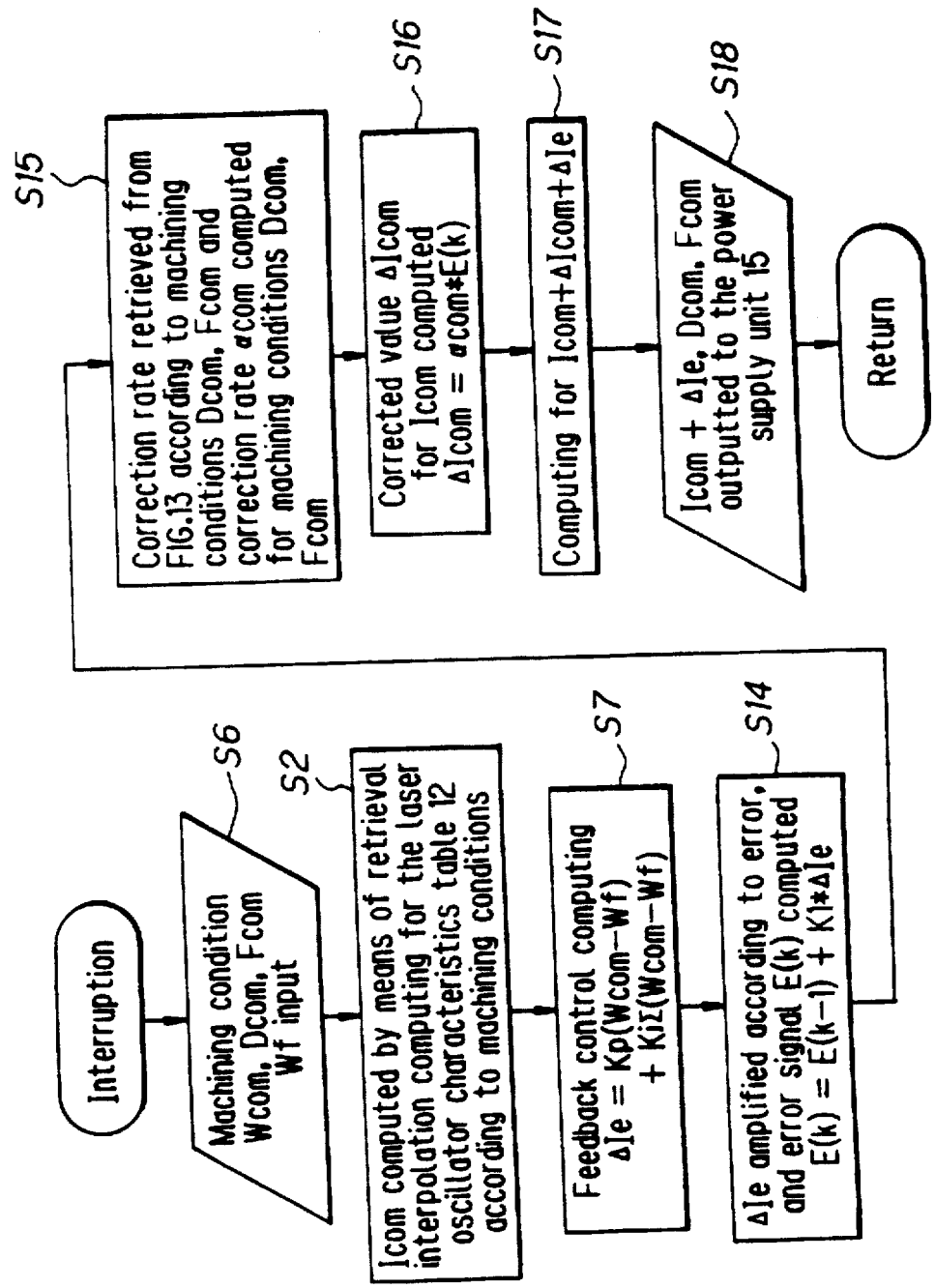
FIG. 15 is a flow chart illustrating a processing according to Embodiment 1-5.

Next description is made for a laser machining apparatus according to Embodiment 1-5 of the present invention. FIG. 12 is a block diagram illustrating configuration of the laser machining apparatus according to Embodiment 5. FIG. 13 is a chart illustrating a correction rate storage table for storing therein correction values for changes in characteristics of a laser oscillator generated when characteristics of said gas is generated. FIG. 14 is a graph showing changes in characteristics of a laser oscillator due to changes in characteristics of a gas used for describing operations in Embodiment 1-5, and FIG. 15 is a flow chart relating to a processing in Embodiment 1-5.

In FIG. 12, the same reference numerals are assigned to the same components as those in Embodiment 1-3 shown in FIG. 8, and description thereof is omitted herein. In this figure, the reference numeral 35 indicates an adder. The reference numeral 50 indicates an F/F control section, which comprises the laser oscillator characteristics table 12, the peak current computing section 13, and the adder 35. The reference numeral 31 indicates a correcting means for computing a correction rate for the F/F control section 50, which is, for instance, an F/F correcting section for correcting an output current from the F/F control section 50. This F/F correcting section 31 comprises an error amplifying section 32, a correction rate storage section 33, and a correction rate computing section 34. The error amplifying section 32 comprises, for instance, an error amplifier having an integrating characteristic. The correction rate storage section 33 stores correction rates according to machining conditions as a data table, and the contents is shown in FIG. 13.

Next, description is made for a method of preparing a correction rate. FIG. 14 is a graph showing an example of change in characteristics of a laser oscillator generated due to changes in characteristics of a gas. The horizontal axis shows a peak current to be inputted, while the vertical axis shows a laser power (W) to be outputted, and in this graph Xa, Xb indicate a duty ratio dx and a frequency fx respectively. Ya, Yb indicate a duty ratio dy and frequency fy, respectively. Xx and Ya indicate a state in which change in characteristics of a gas has not been generated, and Xb, Yb show a graph indicating a state where change in characteristics of a gas has been generated. As shown by this graph, when characteristics of a gas changes, the same duty ratio and frequency change almost in parallel as indicated by the arrow. The parallel displacement rates αx and αy differ according to the duty ratio and frequency.

FIG. 13 shows the characteristics in the form of data table, which was prepared by measuring parallel displacement rates α1 to α16 due to change in characteristics of a gas when the duty ratio of input current to the laser oscillator 16 is d1, d2, d3, d4 and the frequency is f1, f2, f3, and f4. It should be noted that α1 to α16 indicates a rated movement rate for a continuous wave having a duty ratio of 100%, and the rated α1 to α16 are used as respective correction rates.

Data to be stored in the correction rate storage section 33 is previously collected through measurement, and is stored in a memory. The correction rate computing section 34 retrieves a correction rate corresponding to machining conditions from the correction rate storage section 33 and computes a correction rate of the characteristics of the F/F control section 50 by means of interpolation.

Next description is made for operations of the laser machining apparatus according to Embodiment 1-5 constructed as described above. When characteristics of a gas changes, characteristics of the laser oscillator 16 changes as shown in FIG. 14. For this reason, the laser oscillator characteristics table 12 in the F/F control section 50 includes an error, which causes a laser power error in the laser oscillator 16. This laser power error appears as a form of Δle in output from the F/B control section 27.

The F/F correcting section 31 executes and operation for correcting an output from the F/F control section 50 using an output Δle from this F/B control section 27. The error amplifying section 32 in the F/F correcting section 31 executes amplification of the error for Δle. The correction rate computing section 34 in the F/F correcting section 31 receives machining conditions inputted from the command setting section 11, retrieves correction rates at two points close to the current machining conditions, and obtains a correction rate for the current machining conditions by means of interpolation. Then an output from the error amplifying section 32 is multiplied by the correction rate to compute and output a correction rate ΔIcom for an output from the F/F control section 50. The adder 35 executes correction by adding an output Icom from the peak current computing section 13 to the correction rate ΔIcom.

The operation for correction described above is repeatedly executed until Δle becomes almost zero.

Next description is made for a processing in the dotted line section 23 with reference to FIG. 15. Step S6, step S2, and step S7 in FIG. 15 are the same processing as those shown in the processing flow in Embodiment 1-3 shown in FIG. 9. Step S14 is a processing by the error amplifying section 32. In step S 14, error amplification for the output Δle obtained in the F/B control section 27 is executed. In step S14, an integration elements used. The expression for computing is as expressed by the expression (4) below.

$$E(k)=E(k-1)+k1 \times \Delta Icom \qquad (4)$$

Herein E(k) is an integration element, and E(k−1) is a result of integration 1 processing cycle before E(k). k1 is an integration gain.

Step S15 is a processing by the correction rate computing section 34, and correction rates for the duty ratio command value Dcom and frequency command value Fcom which are machining conditions inputted from the command setting section 11 are retrieved from FIG. 13, and a correction rate αcom for the machining condition is computed by means of interpolation. In step S16, a correction rate ΔIcom for an output from the F/F control section 50 is computed from the expression (5) below.

$$\Delta Icom = \alpha com \times E(k) \qquad (5)$$

Step S17 is a processing by the adders 28, 35. Instep S18, a sum of Icom+Δle+Δle, Dcom, and Fcom is outputted to the power supply unit 15.

As described above, in this embodiment, as the F/F correcting section 31 continues to correct the output from the F/F control section until a power error is eliminated, so that excellent power control can be executed even if change in characteristics of a gas occurs. Also even if machining conditions change, a correction rate suited to new machining conditions can be outputted. In addition, as correction can be executed even during machining, always accurate power control can be executed even if machining is executed for a long time.

It should be noted that the responsibility of the error amplifying section 32 is not affected by a cycle of a frequency command value Fcom of the command setting section 11 included in an output ΔIe from the F/B control section 27.

Although an output from the F/F control section 50 is corrected by adding an output from the characteristics correcting section 31 to an output from the F/F control section 50 above, the same effect can be obtained also by correcting the laser oscillator characteristic table 12 in the F/F control section 50.

Also the same effect can be obtained also by correcting the laser power command value Wcom inputted to the F/F control section 50 instructed from the command setting section 11 using an output from the F/F correcting section 31.

[Embodiment 1-6]

Figure 16:
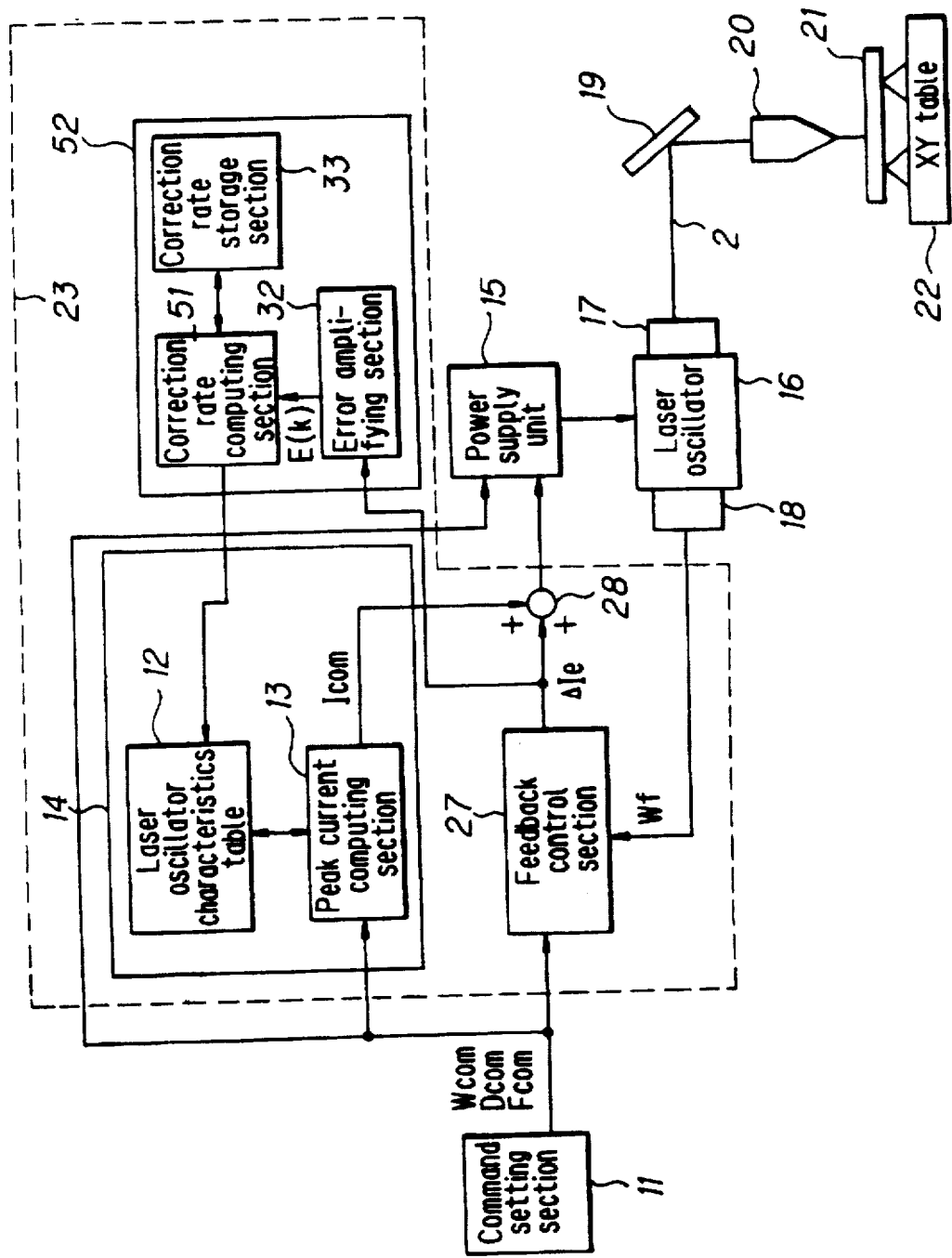
FIG. 16 is a block diagram illustrating configuration of a laser machining apparatus according to Embodiment 1-6.
Figure 17:
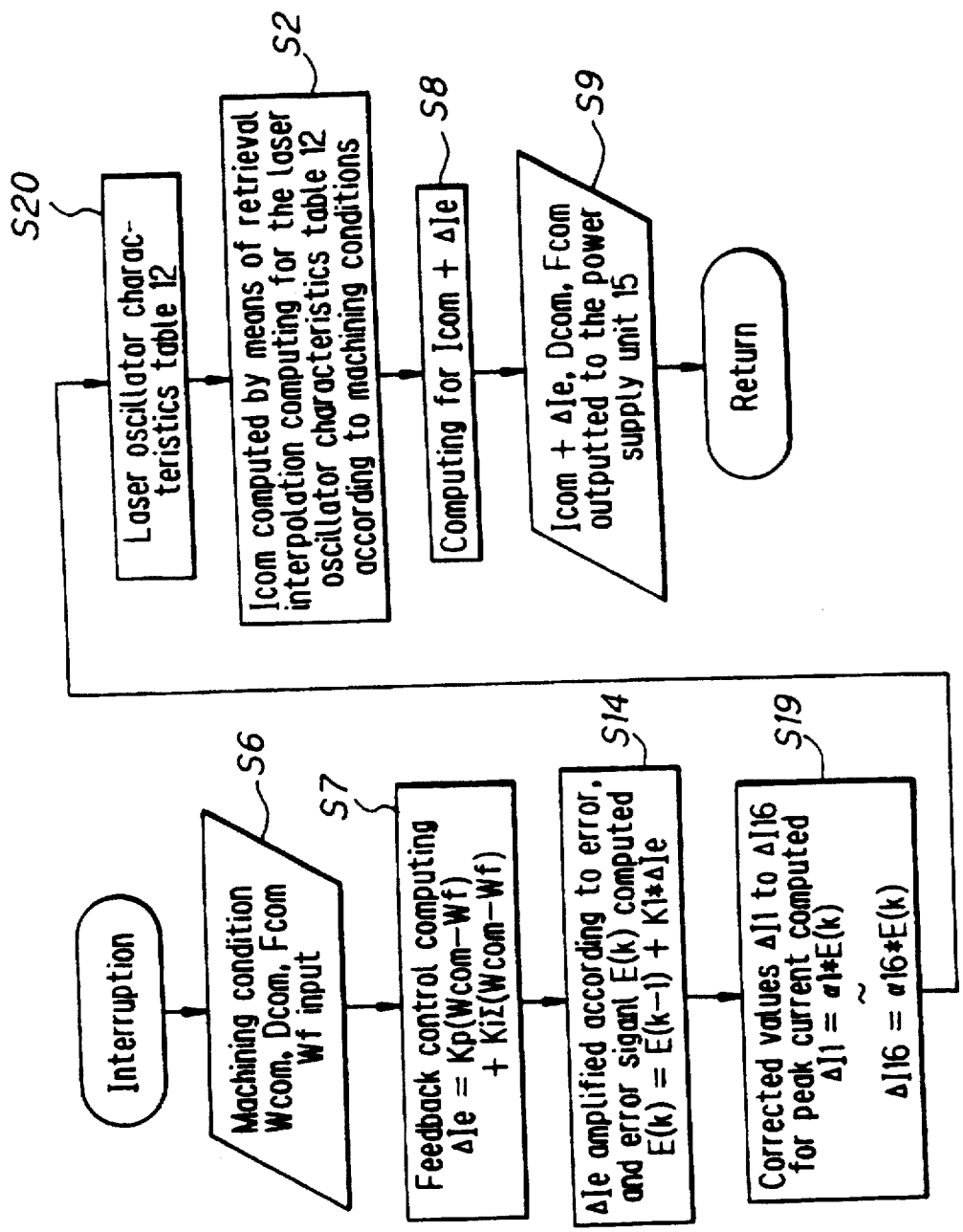
FIG. 17 is a flow chart illustrating a processing according to Embodiment 1-6.

Next description is made for a laser machining apparatus according to Embodiment 1-6 of the present invention. FIG. 16 is a block diagram illustrating the laser machining apparatus according to Embodiment 1-6, and FIG. 17 is a flow chart illustrating a processing in Embodiment 1-6. In FIG. 16, the same reference numerals are assigned to the same components as those in Embodiment 1-5 shown in shown in FIG. 12, and description thereof is omitted herein. In this figure the reference numeral 52 indicates an F/F control correcting for executing correction of the F/F control section 14, and computes, for instance, a correction rate for the laser oscillator characteristics table 12. This F/F correcting section 52 comprises the error amplifying section 32, the correction rate storage section 33, and correction rate computing section. The correction rate computing section 51 computes a correction rate for the laser oscillator characteristics table 12 in the F/F control section 14 from a correction rate stored in the correction rate storage section 33 and an output from the error amplifying section 32.

Next description is made for operations of the laser machining apparatus according to Embodiment 1-6 constructed as described above. When characteristics of a gas changes as described above, also characteristics of the laser oscillator 16 changes. For this reason, the laser oscillator characteristics table 12 prepared from the characteristics of the laser oscillator 16 has errors. The F/F correcting section 52 executes an operation for correcting the laser oscillator characteristics table 12 using an output ΔIe from the F/B control section 27. The error amplifying section 32 outputs amplifies the error of ΔIe and outputs a correction rate (k). The correction rate computing section 51 obtains peak current correction rates ΔI1 to ΔI16 for each frequency and each duty ratio using an output E(k) from the error amplifying section 32 and the correction percentages α1 to α16 stored in the correction rate storage section 33 through expression (6) below.

$$\Delta Ii = \alpha 1 \times \Delta Ee$$

$$\Delta I16 = \alpha 16 \times \Delta Ee \qquad (6)$$

Then, the correction computing section 51 executes correction by adding the peak current correction rates ΔI1 to ΔI16 for each frequency and each duty ratio described above to the peak current values I1 to I64 for each frequency and each duty ratio in the laser oscillator characteristics table 12. In this adding method, for instance, ΔI1 is added to I1 to I4 and ΔI16 to I61 to I64 in the laser oscillator characteristics table 12. This operation is shown by the following expression (7).

$$I1 = I1 + \Delta I1$$

$$I2 = I2 + \Delta I1$$

$$I3 = I3 + \Delta I1$$

$$I4 = I4 + \Delta I1$$

$$I61 = I61 + \Delta I16$$

$$I62 = I62 + \Delta I16$$

$$I63 = I63 + \Delta I16$$

$$I64 = I64 + \Delta I16 \qquad (7)$$

This correcting operation is repeatedly executed until ΔIc becomes almost zero.

Next description is made for a processing in the dotted line section 23 with reference to the flow chart shown in FIG. 17. This processing is executed by interrupting at a time interval. In the processing shown in FIG. 15, the same reference numbers are assigned to the same steps as those in FIG. 15 for Embodiment 1-5 and description thereof is omitted herein. Step 19 is a processing by the correction rate computing section 51, which computes peak current correction rates ΔI1 to ΔI16 using an output E(k) from the error amplifying section 32 and the correction percentages α1 to α16 stored in the correction rate storage section 33. In step S20, correction for the peak currents I1 to I64 in the laser oscillator characteristics table 12 is executed according to the peak current correction rates ΔI1 to ΔI16.

In this embodiment, the F/F correcting section 31 continues to correct the F/F control section 14 until errors in the laser oscillator characteristics table 12 are eliminated, so that, even when change in characteristics of a gas occurs, power control can be executed in good conditions. Also even if the machining conditions change, a correction rate for the current machining conditions can be outputted. Furthermore, as correction can be executed even during correction, even if machining is executed for a long time, always an accurate power control can be realized.

[Embodiment 1-7]

Figure 18:
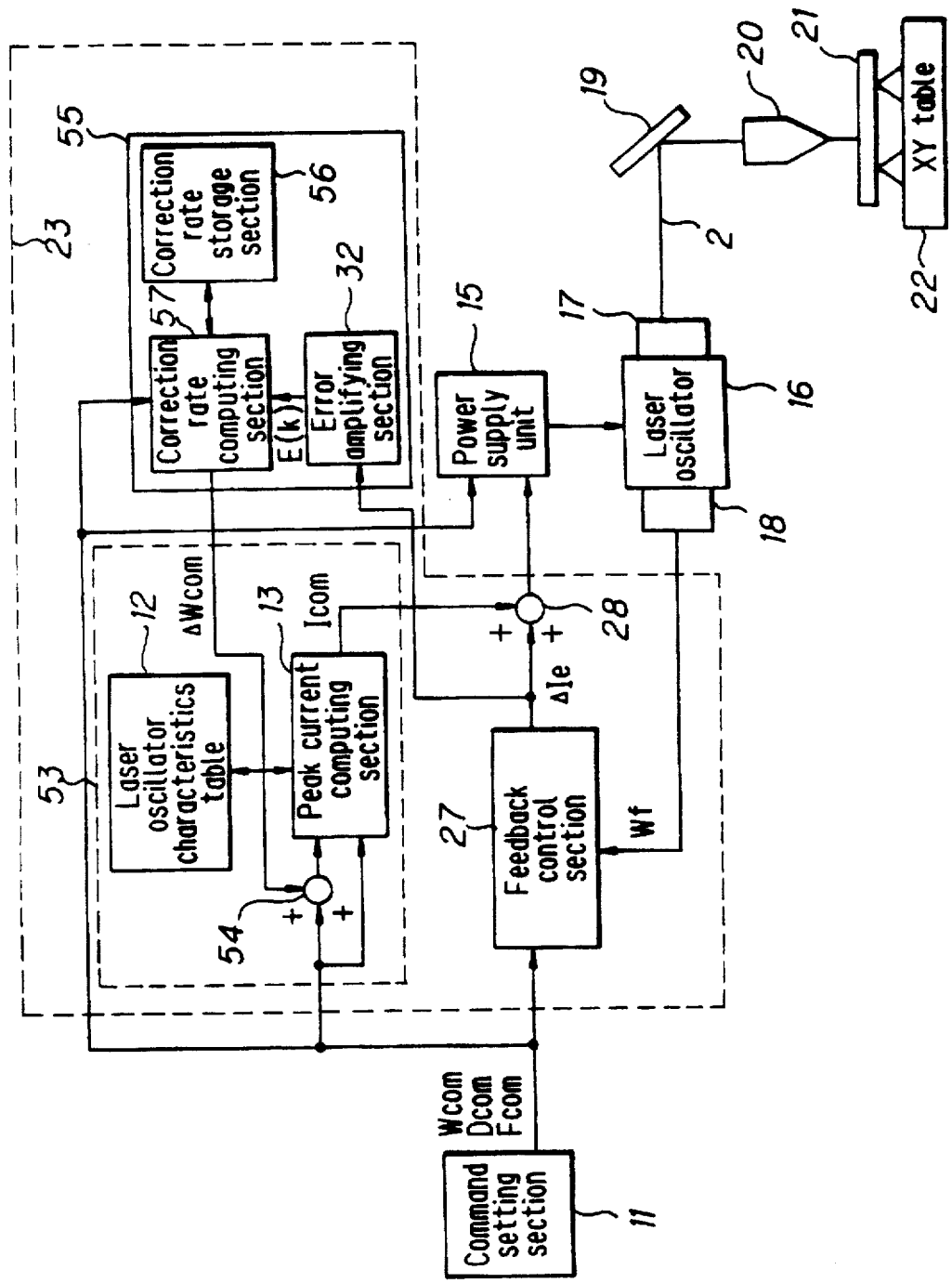
FIG. 18 is a block diagram illustrating configuration of a laser machining apparatus according to Embodiment 1-7.
Figure 20:
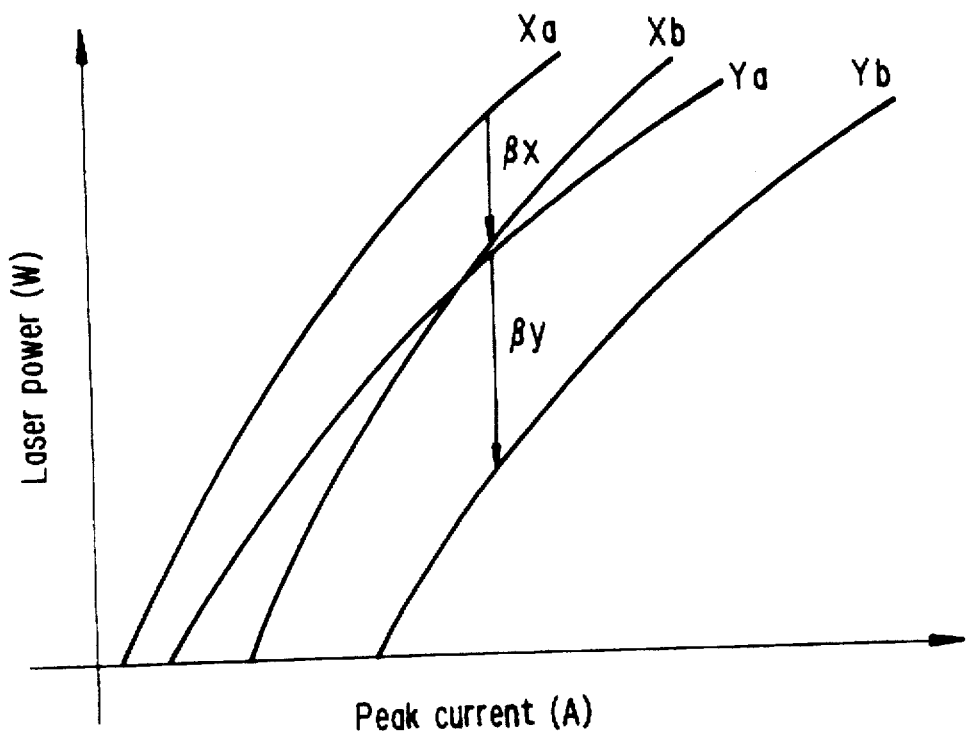
FIG. 20 is a graph showing changes in characteristics of a laser oscillator due to change in characteristics of a gas used for description of operations in Embodiment 1-7.
Figure 21:
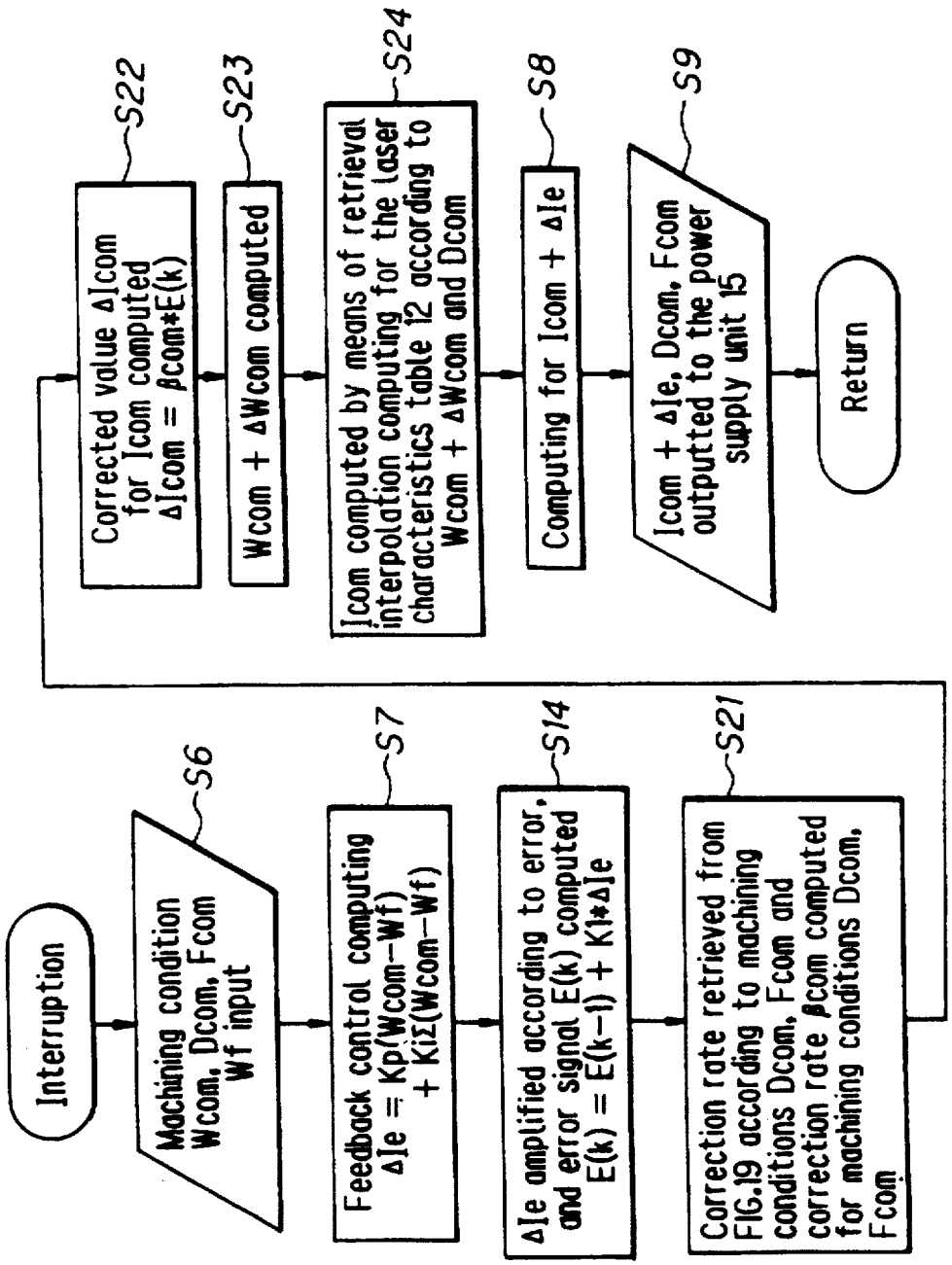
FIG. 21 is a flow chart illustrating a processing according to Embodiment 1-7.

FIG. 18 is a block diagram illustrating configuration of a laser machining apparatus according to Embodiment 1-7, FIG. 19 is a chart illustrating a correction rate storage table in which correction rates for changes in characteristics of a laser oscillator generated when characteristics of a gas changes, FIG. 20 is a graph showing changes in characteristics of a laser oscillator due to change in characteristics of a gas used for description of operations in Embodiment 1-7, and FIG. 21 is a flow chart showing a processing in Embodiment 1-7.

In FIG. 18, the same reference numerals are assigned to the same components as those shown in FIG. 12 for Embodiment 1-5 and description thereof is omitted herein. The reference numeral 53 indicates an F/F control section comprising the laser oscillator characteristics table 12, the peak current computing section 13, and the adder 54. The reference numeral 31 is a correcting means for computing a correction rate for the F/F control section 53, which is, for instance, an F/F correcting section for correcting a command for input power to the F/F control section 53. This F/F correcting section 55 comprises the error amplifying section 32, correction rate storage section 56, and correction rate computing section 57. The correction rate storage section 56 stores therein correction rates for machining conditions as a form of data table, and the contents is as shown in FIG. 19.

Next description is made for a method of preparing the data table shown in FIG. 19. FIG. 20 is a graph showing an example of change in characteristics of a laser oscillator generated due to the same change in characteristics of a gas as that shown in FIG. 14. Difference from FIG. 14 is that, although the parallel displacement rates are αx and αy in the direction of peak current axis in FIG. 14, they are βx and βy in the direction of laser power axis. In FIG. 19 the characteristics is shown as a form of data table, and this data table is prepared by measuring the parallel displacement rates β1 to β16 due to changes in characteristics of a gas when a duty ratio is d1, d2, d3, d4 and a frequency is f1, f2, f3, f4. However, the β1 to β16 are the rated parallel displacement rates under the condition that the duty ratio of 100% is maintained continuously, and these rated β1 to β16 are used as correction rates.

Data for the correction rate storage section 56 is previously collected through measurement and is stored in a memory. The correction rate computing section 57 retrieves correction rates according to machining conditions from the correction rate storage section 56 and computes a correction rate for the F/F control section 53 by means of interpolation.

Next description is made for operations of the laser machining apparatus according to Embodiment 1-7 constructed as described above. When characteristics of a gas changes, characteristics of the laser oscillator 16 changes as shown in FIG. 19. For this reason, the laser oscillator characteristics table 12 for the F/F control section 53 includes errors, and an output from the F/F control section 53 does not correspond to a command for power. So also a laser power output from the laser oscillator 16 includes an error, but is corrected by the F/B control section 27, and appears as an output ΔIe from the F/B control section 27.

The F/F correcting section 55 executes an operation for correcting by the F/F control section 53 using an output ΔIe from this F/B control section 27. The error amplifying section 32 in the F/F correcting section 55 executes error amplification for ΔIe. The correction computing section 57 receives machining conditions inputted from the command setting section 11, retrieves correction rates for two points close to the current machining conditions from the correction rate storage section 56, obtains a correction rate for the current conditions by means of interpolation, and outputs βcom. Then an output E(k) from the error amplifying section 32 is multiplied by the βcom above, and a correction rate ΔWcom for the F/F control section 53 is computed. The adder 54 computes addition of the laser power command Wcom to the correction rate ΔWcom. This operation for correction is repeated until ΔIe becomes almost zero.

Next description is made for a flow chart illustrating a processing in the dotted line section 23 with reference to the flow chart shown in FIG. 21. This processing is executed by interrupting at a time interval. In the processing in FIG. 21, the same reference numerals are assigned to the same steps as those in FIG. 17 for Embodiment 1-6, and description thereof is omitted herein. Step S21 is a processing by the correction rate correcting section 57, and correction rates for a duty ratio command value Dcom and a frequency command value Fcom, which are machining conditions inputted from the command setting section 11, are retrieved from FIG. 19. Then a correction rate βcom for the machining condition is computed by means of interpolation. In step S22, a correction value Δcom for the F/F control section 53 is obtained through the expression (8) below.

$$\Delta Wcom = \beta com \times E(k) \qquad (8)$$

Step S23 is a processing by the adder 54. Step S24 is a processing by the peak current computing section 13, and the same processing as that in Step S2 is executed herein. However, the difference is that the laser power command is a sum of corrected Wcom+ΔWcom. As an output, the peak current Icom is outputted.

For this reason, with the embodiment described above, the F/F control section 55 continues the operation for correction until an error in the F/F control section 53 is eliminated, so that, even in a case where characteristics of a gas changes, power control can be executed under good conditions. Also even when the machining conditions change, a correction rate suited to the new machining condition is outputted. Furthermore as correction can be executed even during correction, always accurate power control is realized even if machining is executed for a long time.

It should be noted that the responsibility of the error amplifying section 32 is not affected by a cycle of the frequency command value Fcom from the command setting section 11 included in an output ΔIe from the F/B control section 27.

[Embodiment 1-8]

Figure 22:
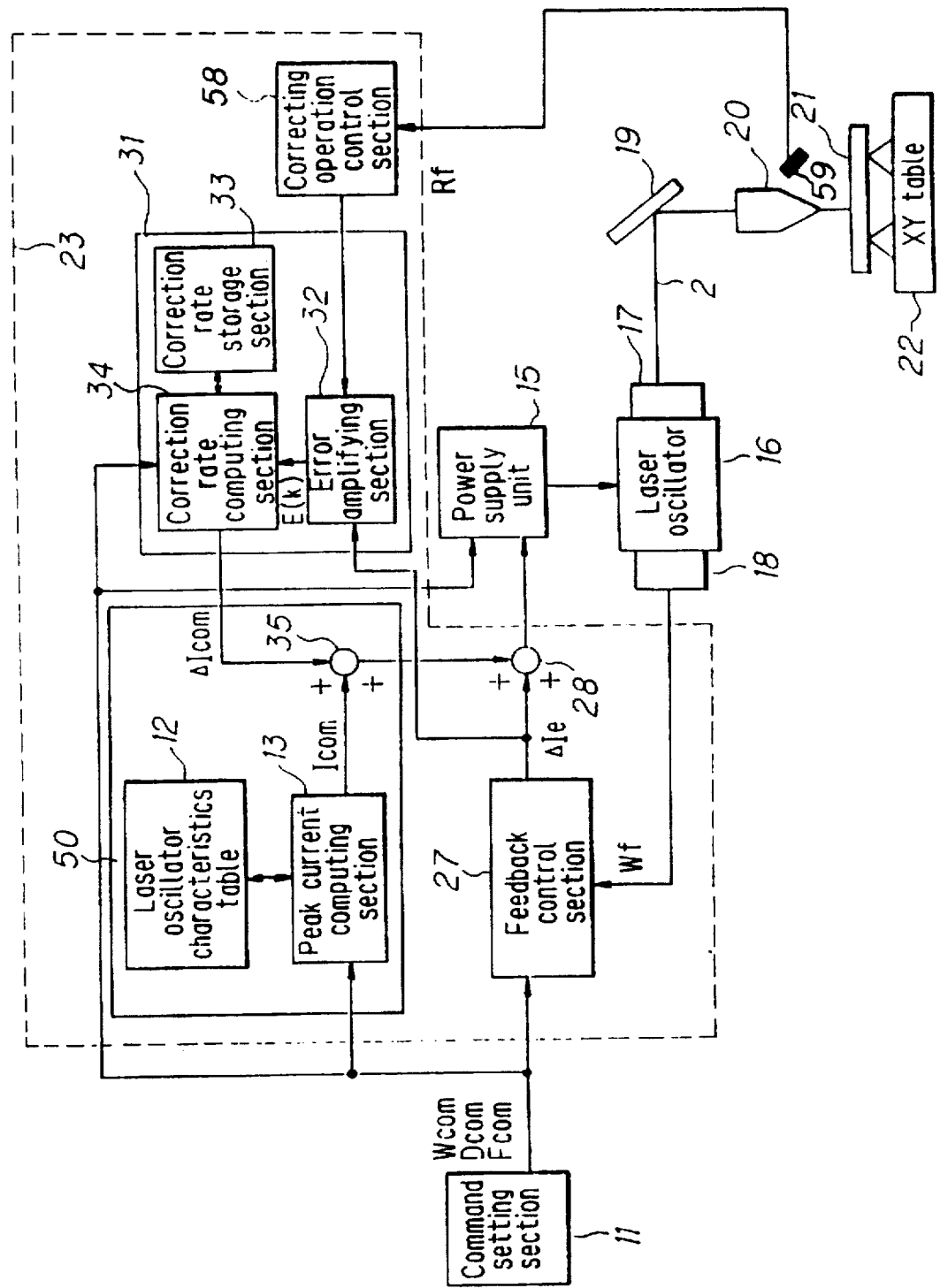
FIG. 22 is a block diagram illustrating configuration of a laser machining apparatus according to Embodiment 1-8.
Figure 23:
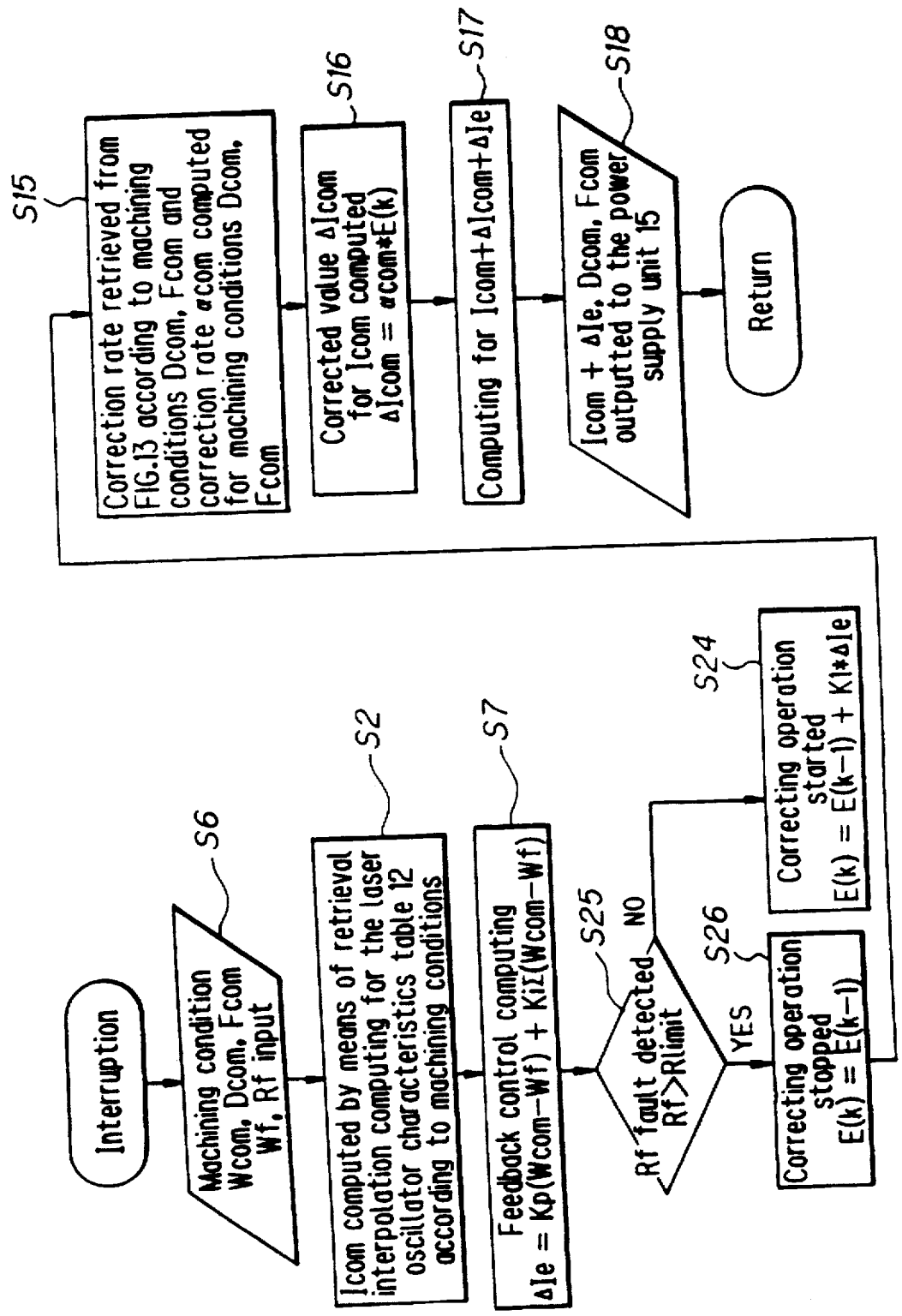
FIG. 23 is a flow chart illustrating a processing according to Embodiment 1-8.

FIG. 22 is a block diagram illustrating configuration of the laser machining apparatus according to Embodiment 1-8, and FIG. 23 is a flow chart illustrating a processing in Embodiment 1-8. In FIG. 22, the same reference numerals are assigned to the same components as those in Embodiment 1-5 shown in FIG. 12, and the description thereof is omitted herein. In this figure, the reference numeral 58 indicates a correcting operation control means for making a determination as to whether an operation of the F/F correcting section 31 is continued or stopped according to an input signal, such as a correcting operation control section. The reference numeral 59 indicates a light sensor.

Description is made for operations of the laser machining apparatus according to Embodiment 1-8 constructed as described above. Herein description is made assuming a case where a highly reflective material is used in the workpiece 21. If the laser oscillator characteristics table 12 in the F/F control section 50 correctly shows the characteristics of the laser oscillator 16, the laser oscillator outputs a laser power just as instructed, but as the workpiece 21 is made of a highly reflective material, the reflected light Rf is detected by the power sensor 18, and a laser power measurement value Wf including an error is fed back. For this reason, the F/B control section 27 outputs a corrected output ΔIe for correcting an error factor caused by the reflected light Rf. So the F/F correcting section 31 can correct an output from the F/F control section 50 even when there is no error. An operation for correction by the F/F control section 50 is repeated until an output ΔIe from the F/B control section 27 becomes zero. To prevent malfunction of the F/F correcting section 31, a reflected light is detected by the light sensor 59, and this detected signal is inputted into a correcting operation control section 58. The correcting operation control section 58 makes a determination as to whether the reflected light is strong or not depending on the inputted detection signal. This determination is made by comparing the inputted detection signal to a preset signal level. If it is determined that the reflected light is strong, the correcting operation control section 58 outputs an operation stop signal to the F/F correcting section 31. When the operation stop signal is inputted through the F/F correcting section 31, the F/F correcting section 31 immediately stops the operation for correcting.

Next description is made for a processing in the dotted line 23 with reference to the flow chart shown in FIG. 23. This processing is executed by interrupting at a time interval. In the processing shown in FIG. 23, the same reference numerals are assigned to the same steps as those in FIG. 12 and description thereof is omitted herein. If the reflected light Rf is larger than the reflected light maximum allowable value Rlimit previously set in step S25, it is determined abnormal and the system control goes to step S26, and if smaller than the reflected light maximum allowable value Rlimit, it is determined no abnormality a processing branches to step 14. This is a processing in the correcting operation control section 58. In step S26, an operation of E(k)=E(k−1) for stopping operations of an integrator is executed to an operation of the error amplifying section 32, and system control goes to step S15. If no abnormality is recognized in step S25, the same processing in step S14 as that in Embodiment 1-5 is executed and a correcting operation is started.

With this embodiment, even in a case where a large quantity of light is reflected from a workpiece, the F/F correcting section 31 does not cause a malfunction, and machining can be executed smoothly.

[Embodiment 1-9]

Figure 24:
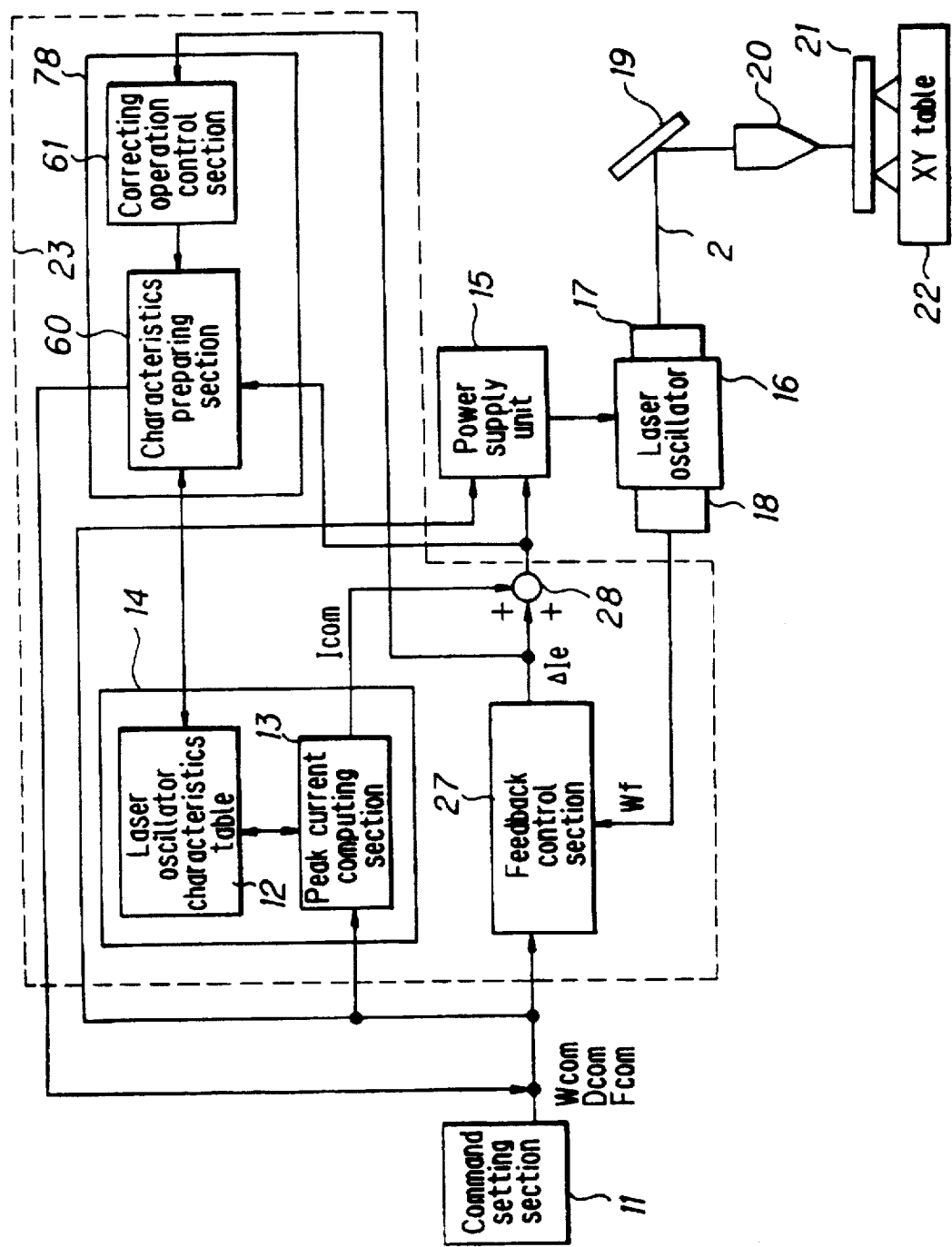
FIG. 24 is a block diagram illustrating configuration of a laser machining apparatus according to Embodiment 1-9.
Figure 25:
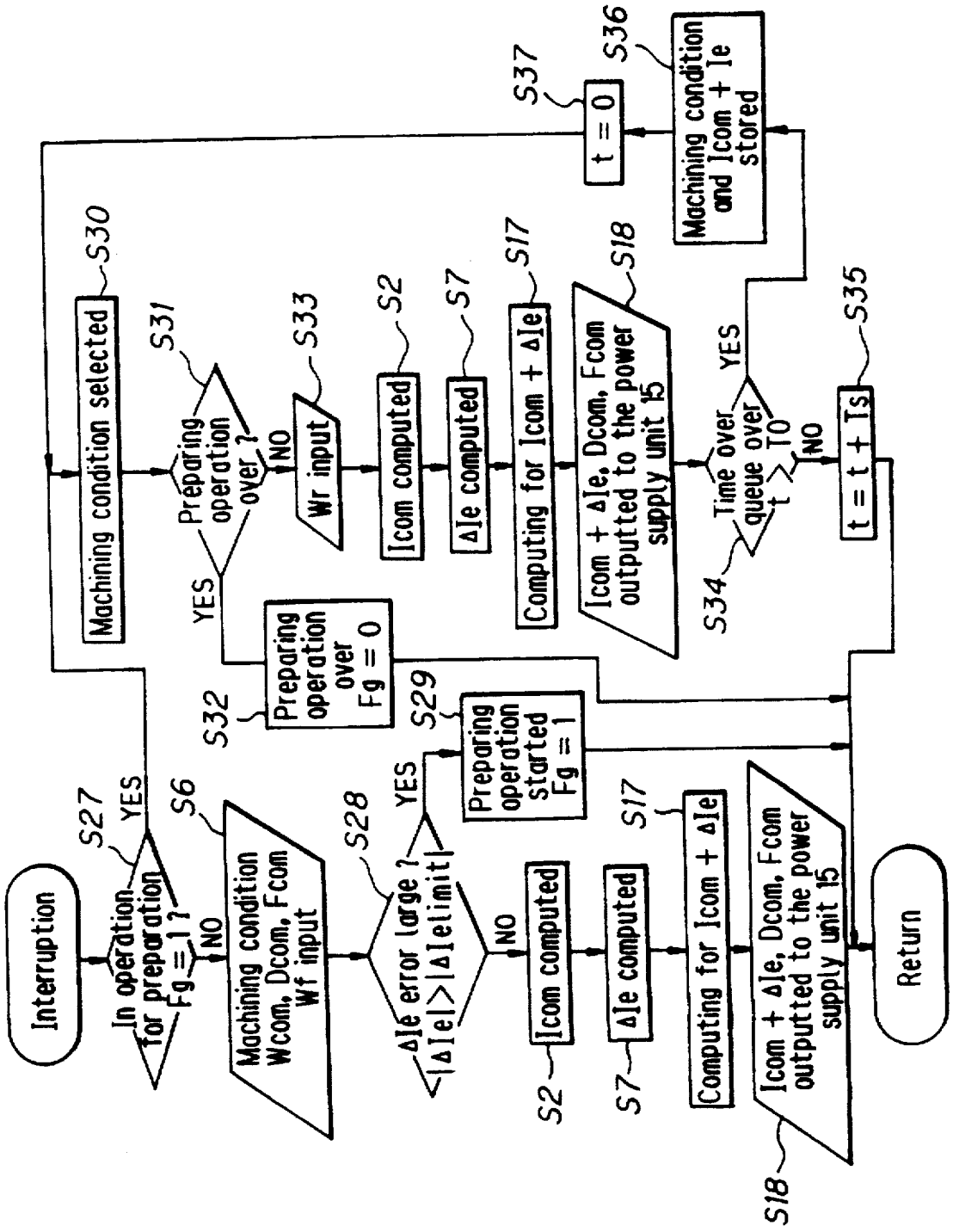
FIG. 25 is a flow chart illustrating a processing according to Embodiment 1-9.

FIG. 24 is a block diagram illustrating configuration of a laser machining apparatus according to Embodiment 1-9, and FIG. 25 is a flow chart illustrating a processing in Embodiment 1-9. In FIG. 24, the same reference numerals are assigned to the same components as those in Embodiment 1-3 shown in FIG. 8 and description thereof is omitted herein. The reference numeral 28 indicates an F/F correcting section for correcting the F/F control section 14, which comprises a characteristics preparing section 60 and a correcting operation control section 61. The characteristics table preparing table 60 is for preparing the laser oscillator characteristics table 12. The correcting operation control section 61 is for making a determination as to whether an operation of the characteristics table preparing section 60 should be started or not according to an input signal.

Next description is made for the laser machining apparatus according to Embodiment 1-9 constructed as described above. When characteristics of a gas changes, also characteristics of the laser oscillator 16 changes as shown in FIG. 14. For this reason, errors are generated in the laser oscillator characteristics table 12 in the F/F control section 14, and the errors appears as errors of laser power output from the laser oscillator 16. The laser power output error is corrected in the F/B control section 27, and appears as an output Δle from the F/B control section 27.

The correcting operation control section 61 makes a determination, using the output Δle from this F/B control section 27, as to whether the laser oscillator characteristics table 12 should is prepared anew or not. This determination is made through the following expression (9). Herein Δlelimit is a maximum allowable error for the Δle and is previously set.

$$|\Delta Ie| > |\Delta Ielimit| \qquad (9)$$

When the expression (9) above is satisfied, an operation for preparing the laser oscillator characteristics table 12 is started. When it is determined that the correcting operation control section 61 starts an operation for preparing the table, the characteristics table preparing section 60 executes an operation for preparing the laser oscillator preparing table 12. This operation for preparing the table is executed, for instance, according to the following sequence. At first, a laser power w1, a duty ratio d1, and a frequency f1, which are machining conditions in the laser oscillator characteristics table 12 shown in FIG. 3, are selected and set as command value, and control over the laser power is started. Then after the laser power is set to a constant value, a current inputted to the power supply unit 15 is measured. This current is a sum of an output Icom from the F/F control section 14 and an output Δle from the F/B control section 27, and the same is stored as a peak current I1 in the laser oscillator characteristics table 12. Similarly other machining conditions for the laser oscillator characteristics table 12 are selected, and peak current I2 to I64 are measured and stored in the laser oscillator characteristics table 12. An operation for preparing the laser oscillator characteristics table 12 is executed as described above.

Next description is made for a processing the dotted line section 23 with reference to a flow chart shown in FIG. 25. This processing is executed by interrupting at a time interval. The same reference numerals are assigned to the same steps as those in Embodiment 1-5 shown in FIG. 12, and description thereof is omitted herein. In step S27, whether the operation for preparing the table as described above is being executed or not is checked. If the table is being prepared, the processing goes to step S30 is finished, and if not, the process branches to step S6. In step S28, if Δle is larger than the maximum allowable error Δlelimit, the processing goes to step S29, and if not, the processing branches to step S2. When branched to step S29, a power, a duty ratio, and frequency are selected as machining conditions sequentially from the laser oscillator characteristics table 12. In step S31, when it is determined that measurement of a peak current for all the machining conditions in the laser oscillator characteristics table 12 in step S30, the processing branches to step S32, and if not, to step S33. In step S33, a laser power Wf is inputted from the power sensor 18. From step S2 up to step S18, control of laser power is executed under the machining conditions set in step S30, and a peak current for the power supply unit 15 is outputted.

In step S34, the timing is waited when the laser power Wf coincides with a power set in step S30. Herein T0 indicates a preset value for waiting and this value is set previously. It is a parameter for measurement of time, and the initial value is set to zero (0). In step S34, when it is determined that the time for waiting is over, the processing branches to step S36, and if not, to step S35. In step S35, the time for waiting is measured by adding the time interval Ts to the time parameter t. Step S36 is a case where the time for waiting is over, and a value for a peak current is read. The peak current is a sum of Icom+Δle obtained in step S 17. This value is stored at a position for the peak current corresponding to the machining conditions in the laser oscillator characteristics table 12. For instance, if the machining conditions are w1, d3, and f3 as shown in FIG. 6, a position for the peak current is 125. In step S37, the time parameter t is cleared to zero. Step S37 is followed by step S30, but in this case the machining conditions for step S30 are changed. When data preparation for all the machining conditions are over, the processing goes through step S31, and a flag Fg is returned to zero in step S32, thus an operation for preparing the data table being complete.

For this reason, with the embodiment described above, there is a means for automatically preparing the laser oscillator characteristics table 12 even if the laser oscillator characteristics table 12 includes an error, so that power control can be executed under good conditions even when characteristics of a gas changes.

[Embodiment 1-10]

Figure 26:
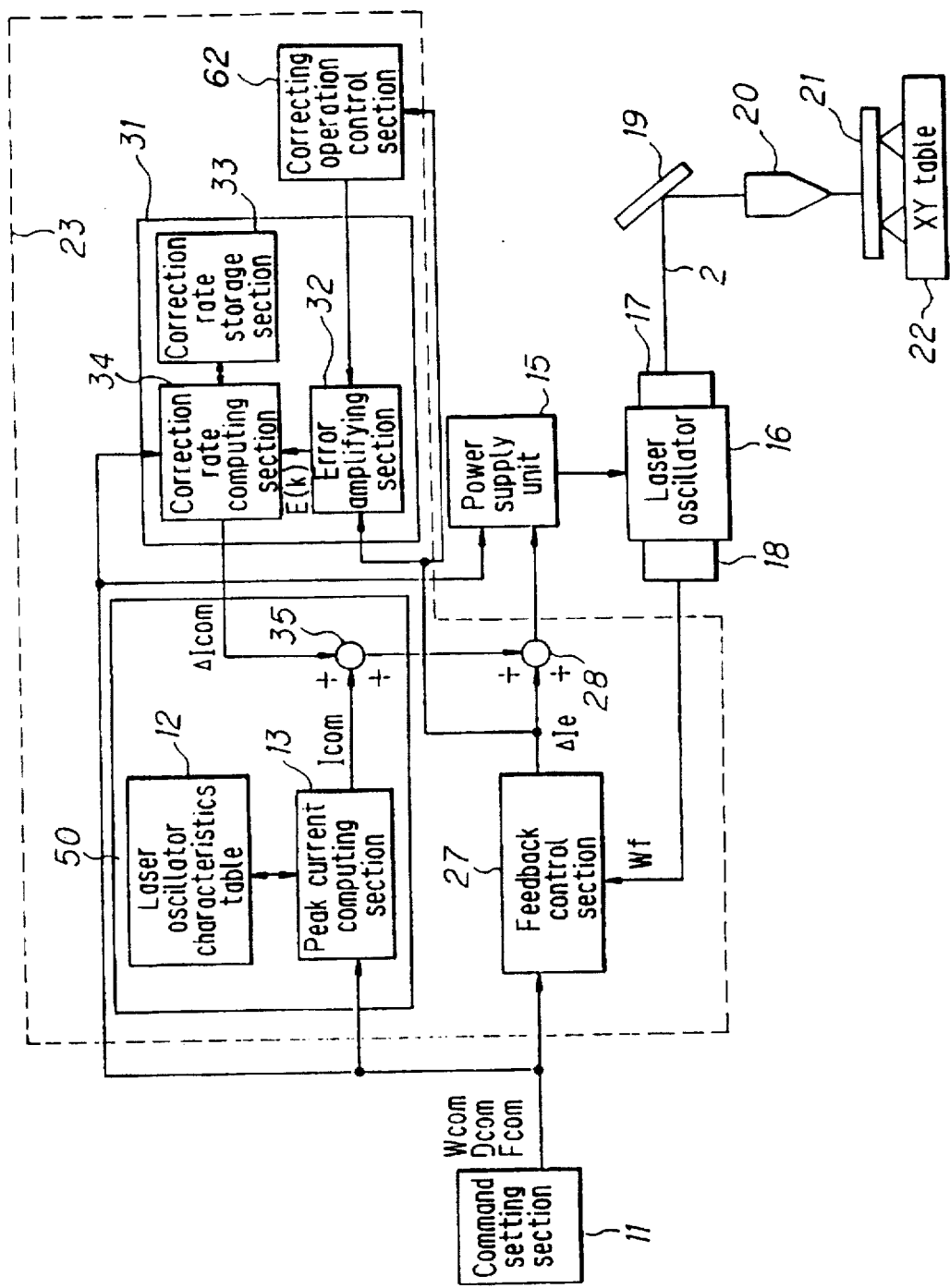
FIG. 26 is a block diagram illustrating configuration of a laser machining apparatus according to Embodiment 1-10.

FIG. 26 is a block diagram illustrating a laser machining apparatus according to Embodiment 1-10, and FIG. 27 is a flow chart illustrating a processing in Embodiment 1-10. In FIG. 26 the same reference numerals are assigned to the same steps as those in Embodiment 1-5 shown in FIG. 12 and description thereof is omitted. The reference numeral 62 indicates a correcting operation control section, which makes a determination, using an output Δle from the F/B control section 27, as to whether an operation for correcting by the F/F control section 31 should be executed or not.

Next description is made for operations of the laser machining apparatus according to Embodiment 1-10 constructed as described above. Difference in operations of this laser machining apparatus from Embodiment 1-5 is that an operation for correcting the F/F correcting section 31 is controlled by the correcting operation control section 62. When characteristics of a gas changes, also characteristics of the laser oscillator 16 changes as shown in FIG. 14. For this reason, an error is generated in the laser oscillator characteristics table 12 in the F/F control section 50, and a peak current Icom, an output from the F/F control section 50, is not set to an appropriate value, which generates an error in a laser power from the laser oscillator 16. This laser power error is corrected by the F/B control section 27 and appears as an output ΔIe from the F/B control section 27. The F/F correcting section 31 executes correction of the F/F control section 50 using this ΔIe. However, if the workpiece 21 is made of a highly reflective material, a measurement error is generated in the power sensor 18 due to the reflected light, and this measurement error appears as an output &$Ie from the F/B control section 27. When effect by the reflected light is large, if F/F correcting section 31 is operated using ΔIe, wrong correction is executed in the F/F control section 50, which give damages to the high speed processing capability of laser power control.

The correcting operation control section 62 receives ΔIe inputted thereto, and makes a determination as to whether the effect by the reflected light is large or not. This determination is executed by discriminating whether ΔIe is positive or negative. Namely, when characteristics of a gas in the laser oscillator 16 changes, the laser oscillation efficiency drops, so that ΔIe is increased to raise the peak current and ΔIe becomes a positive value. On the other hand, if a measurement error in the power sensor 18 is generated by the reflected light, an output Wf from the power sensor 18 is detected as a large value, and ΔIe becomes a negative value to reduce the peak current. For this reason, the correcting operation control section 62 gives a command to the error amplifying section 32 in the F/F correcting section 31 to stop the correcting operation if ΔIe is negative, or to start the correcting operation if ΔIe is positive.

Even when ΔIe is positive, if the value is very small, the correcting operation control section 62 stops a correcting operation by the F/F correcting section 31, when the condition as expressed by the expression (9) is satisfied like in Embodiment 1-9, to prevent unnecessary correcting operations from being executed.

Next description is made for processing in the dotted line section 23 with reference to the flow chart shown in FIG. 27. This processing is executed by interrupting at a time interval. The same reference numerals are assigned to the same steps as those in Embodiment 1-5 shown in FIG. 12 and description thereof is omitted herein. Step S38 branches to step S20 if ΔIe is negative, and to step S39 if the ΔIe is not negative. Step S39 branches to step S14 if a value of ΔIe becomes larger than the maximum allowable error ΔIelimit, and to step S20, if not. In step S20, as a correcting operation by the F/F correcting section 31 is stopped, effect by a reflected light can be suppressed as much as possible. Also unnecessary correcting operations can be prevented.

For this reason, with the embodiment described above, if a reflected light is introduced, the F/F correcting section 31 stops its correcting operations, so that malfunction never occurs even while a highly reflective material is being machined. If the workpiece is not made of a highly reflective material, the F/F control section 50 continues its correcting operation, so that power control can be executed under good conditions even if characteristics of a gas changes. Furthermore correction can be continued even during machining, always accurate power control can be executed even if machining is continued for a long time.

[Embodiment 1-11]

Figure 28:
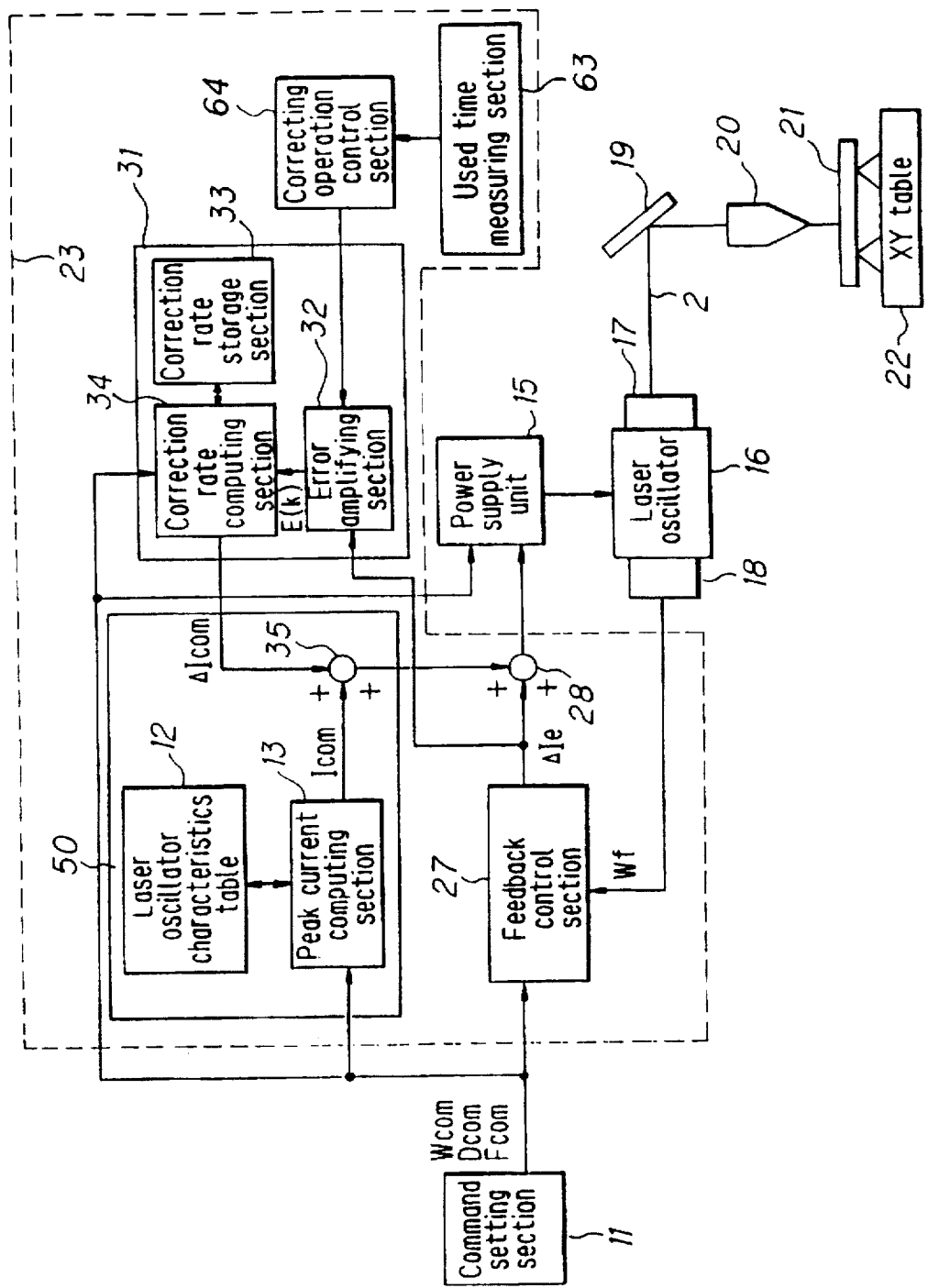
FIG. 28 is a block diagram illustrating configuration of a laser machining apparatus according to Embodiment 1-11.

FIG. 28 is a block diagram illustrating configuration of a laser machining apparatus according to Embodiment 1-11. In FIG. 28, the same reference numerals are assigned to the same components as those in Embodiment 1-10 shown in FIG. 26 and description thereof is omitted herein. When the laser oscillator 16 starts its operation, a use time measuring section 63 measures the time and outputs a signal at a time interval. The correcting operation control section 64 controls a correcting operation by the F/F correcting section 31 depending on an output signal from the use time measuring section 63.

Next description is made for operations of the laser machining apparatus according to Embodiment 1-11 constructed as described above. The same reference numerals are assigned to the same components as those in Embodiment 1-10 shown in FIG. 26 and description thereof is omitted herein. Characteristics of a gas in the laser oscillator 16 largely changes as the laser is used for a long time, and an error between characteristics of the gas and the characteristics in the laser oscillator characteristics 12 becomes gradually larger. The use time measuring section 63 has a function to measure a use time of the laser oscillator 16, and outputs a signal at a time interval T1 set previously. The correcting operation control section 64 receives a signal inputted from the use time measuring section 63. The error amplifying section 32 is controlled so that a correcting operation by the F/F correcting section 31 is started according to this inputted timing and is stopped in the prespecified time T2. Herein the time interval T1 is set to a value so that effect by change in characteristics of a gas becomes larger, while T2 is set to a valuer required for correction of the F/F control section 50. For this reason, as correction of the F/F control section 50 is executed at a time interval, power control can be executed under good conditions even if characteristics of a gas changes.

[Embodiment 1-12]

Figure 29:
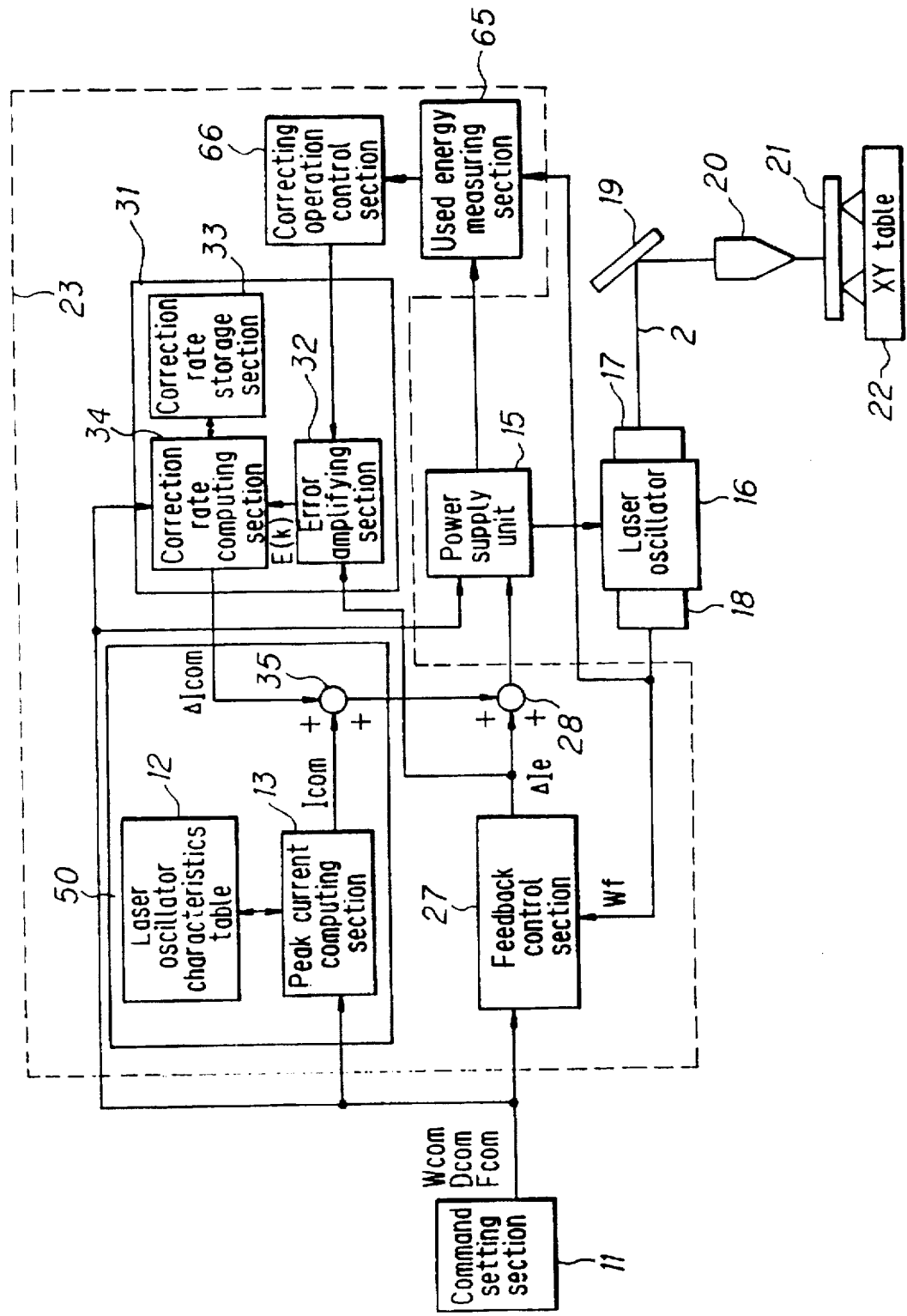
FIG. 29 is a block diagram illustrating a laser machining apparatus according to Embodiment 1-12.

FIG. 29 is a block diagram illustrating configuration of a laser machining apparatus according to Embodiment 1-12. In FIG. 29, the same reference numerals are assigned to the same components as those in Embodiment 1-10 shown in FIG. 26 and description thereof is omitted herein. The reference numeral 65 indicates an used energy measuring section, which measures energy consumed by the laser oscillator 16 and outputs the value. Also the reference numeral 66 indicates a correcting operation control section, which makes a determination according to an output signal from the used energy measuring section 65 as to whether a correcting operation by the F/F correcting section 31 should be executed or not.

Next description is made for operations of the laser machining apparatus according to Embodiment 1-12 constructed as described above. In this figure, the same reference numerals are assigned to the same components as those in Embodiment 1-10 shown in FIG. 26 and description thereof is omitted herein. Characteristics of a gas in the laser oscillator changes according to a quantity of energy used by the laser oscillator 16, and the difference from the characteristics in the laser oscillator characteristics table 12 becomes gradually larger. The used energy measuring section 65 receives a current to be inputted the power supply unit 15 for measuring energy used by the laser oscillator 16 and measures the used energy by integrating a value of voltage in the power supply unit 15. Or, the used energy measuring sections 65 obtains a value of energy corresponding to the used energy by receiving an output from the power sensor 18 and integrating it. A value measured by the used energy measuring section 65 is outputted to a correcting operation control section 66.

The correcting operation control section 66 controls a correcting operation of the F/F correcting section 31 using a value measured by the used energy measuring section 65, and if the measurement value exceeds a preset energy value En1, the correcting operation control section 66 controls the error amplifying section 32 so that correcting operation by the F/F correcting section 31 is started and then is stopped in time T2 previously set. Immediately after the correcting operation is stopped, a cumulative value for used energy in the used energy measuring section 65 is cleared, and then used energy is measured. En1 is set to a minimum value in a range where an error in the F/F control section 50 is not ignored, while T2 is set to a time required for correction of the F/F control section 50. As described above, correction of the F/F control section 50 is executed according to a measurement value on used energy, so that laser power control can be realized under good conditions even if characteristics of a gas changes.

[Embodiment 1-13]

Figure 30:
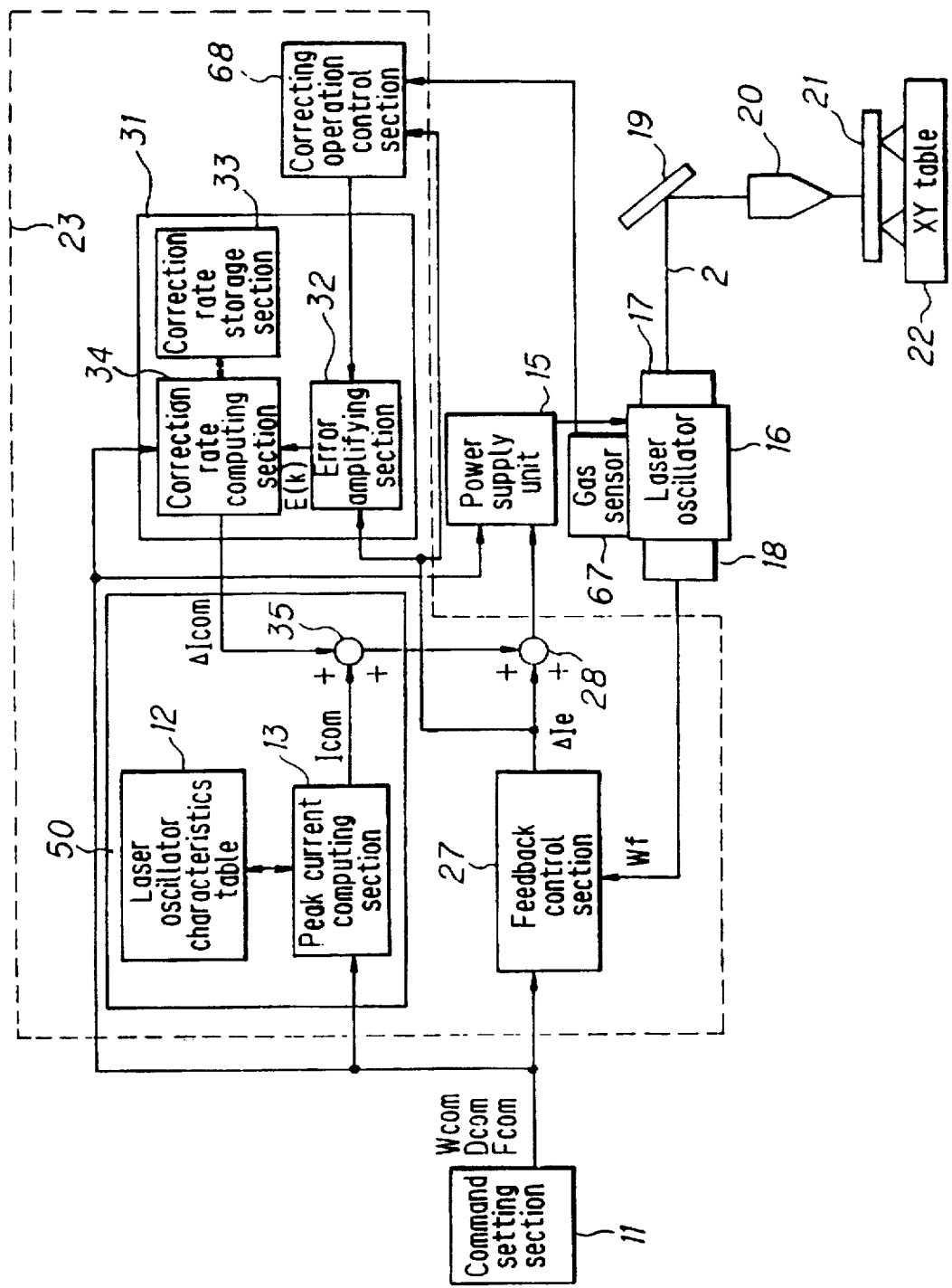
FIG. 30 is a block diagram illustrating configuration of a laser machining apparatus according to Embodiment 1-13.

FIG. 30 is a block diagram illustrating configuration of a laser machining apparatus according to Embodiment 1-13. In FIG. 30, the same reference numerals are assigned to the same components as those in Embodiment 1-10 shown in FIG. 26, and description thereof is omitted herein. The reference numeral 67 indicates a gas sensor for measuring a density of $CO_2$ gas in the laser oscillator 16. The reference numeral 68 indicates a correcting operation control section, which makes a determination, according to a density of $CO_2$ gas, as to whether a correcting operation of the F/F correcting section 31 should be executed or not.

Next description is made for operations of the laser machining apparatus according to Embodiment 1-13 constructed as described above. The same reference numerals are assigned to the same components as those in Embodiment 1-10 shown in FIG. 26, and description thereof is omitted herein. After laser oscillation is executed, a density of a gas, especially $CO_2$ gas in the laser oscillator 16, drops. As a gas density becomes lower, also efficiency of the laser oscillator 16 becomes lower, and the difference from the characteristics in the laser oscillator characteristics table 12 becomes gradually larger. A gas sensor 67 means a density of the $CO_2$ gas above. A correcting operation control section 68 receives a measurement value inputted from the gas sensor 67, and makes a determination as to whether the correcting operation by the F/F correcting section 31 should be executed or not. The correcting operation control section 68 compares a gas density detected when correction was executed previously to the last gas density to obtain the difference between the two, compares the difference to a density change rate ΔN1 previously set, and controls the error amplifying section 32 so that a correcting operation of the F/F correcting section is started when the difference is larger than the ΔNi, and is stopped in time T2 set previously. Herein, the ΔN1 is set to a minimum value in a range where an error in the F/F control section 50 can not be ignored, while T2 is set to a time required for correction of the F/F control section 50.

As described above, with the embodiment above, a gas density in the laser oscillator is measured with the gas sensor 67, and correction of the F/F correcting section 50 is executed according to the measurement value, so that laser power control can be executed under good conditions even if changes of the gas changes.

It should be noted that, although the above description assumes a case where a determination as to whether a correcting operation of the F/F correcting section 31 should be executed or not according to a density of $CO_2$ gas, the gas is not always limited to $CO_2$ gas. For instance, a similar effect can be achieved by using a sensor which can measure a density of vapor $H_2O$ as the gas sensor 67, measuring change of the density of vapor $H_2O$, comparing the change rate in the density to a preset density change rate ΔN2, and making the correcting operation control section 68 start a correcting operation of the F/F correcting section 31 when the detected change rate becomes larger than ΔN2.

Furthermore, although the above description assumes a case where a gas density is measured for correction, a similar effect can be achieved by using a gas temperature sensor as the gas sensor 67, comparing a detected change in temperature to a preset temperature change rate ΔN3, and making the correcting operation control section 68 start a correcting operation of the F/F correcting section 31 when the detected change rate becomes larger than ΔN3, because the oscillation efficiency of the laser oscillator 16 changes also when a gas temperature changes.

[Embodiment 1-14]

Figure 31:
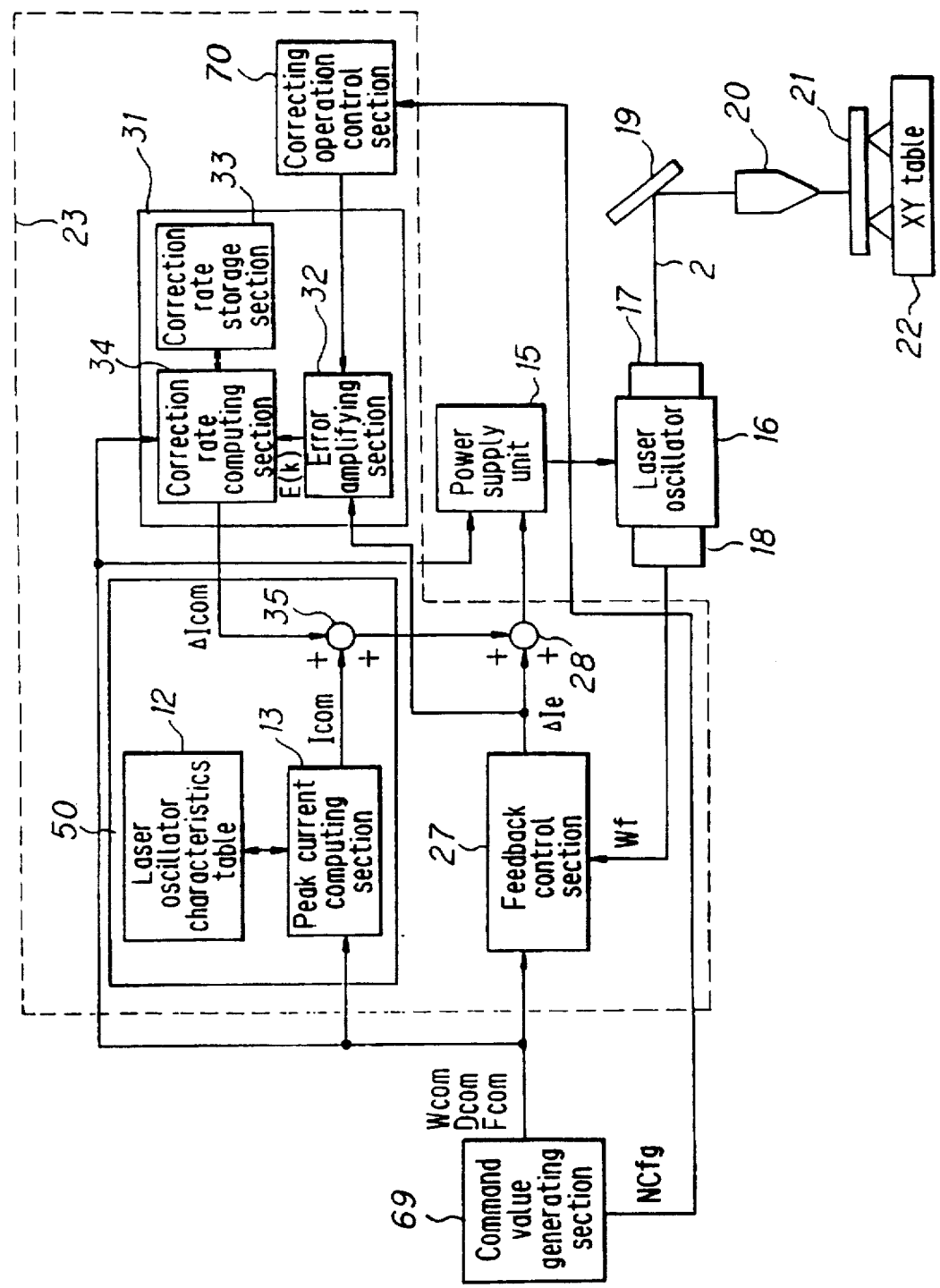
FIG. 31 is a block diagram illustrating configuration of a laser machining apparatus according to Embodiment 1-14.

FIG. 31 is a block diagram illustrating configuration of a laser machining apparatus according to Embodiment 1-14. In FIG. 31, the same reference numerals are assigned to the same components as those in Embodiment 1-10 shown in FIG. 26, and description thereof is omitted herein. The reference numeral 69 indicates a command value generating section for generating a laser power, a duty ratio, and a frequency as machining conditions, and also giving a command as to whether correction of the F/F control section 50 should be executed or not, and it may be, for instance, an NC device (numerical control unit). The reference numeral 70 indicates a correcting operation control section, which makes a determination, according to a command from the command value generating section 69, as to whether a correcting operation of the F/F correcting section 31 should be started or not.

Next description is made for operations of a laser machining apparatus according to Embodiment 1-14 constructed as described above. The same reference numerals are assigned to the same components as those in Embodiment 1-10 shown in FIG. 26, and description thereof is omitted therein. When a difference between characteristics of the laser oscillator 16 and that in the laser oscillator characteristics table 12 becomes larger due to change in characteristics of a gas, the command value generating section 69 outputs a signal for instructing correction of the F/F control section 50. The correcting operation control section 70 receives a command signal from the command generating section 69 and controls the error amplifying section 32 so that a correcting operation of the F/F correction section 31 is started and then stopped in the preset time T2. Herein, if a numerical control unit is used as the command value generating section 69, a signal for instructing the above correction is entered from an input screen of the numerical control unit. Also if machining is executed for a long time, a command is issued according to M code of an NC program. It should be noted that T2 is set to a time required for correction of the F/F control section 50.

As described above, correction of the F/F control section 50 is executed according to a command signal from the command value generating section 69, so that correction of the F/F control section 50 can easily be executed and excellent laser power control is realized.

[Embodiment 1-15]

Figure 32:
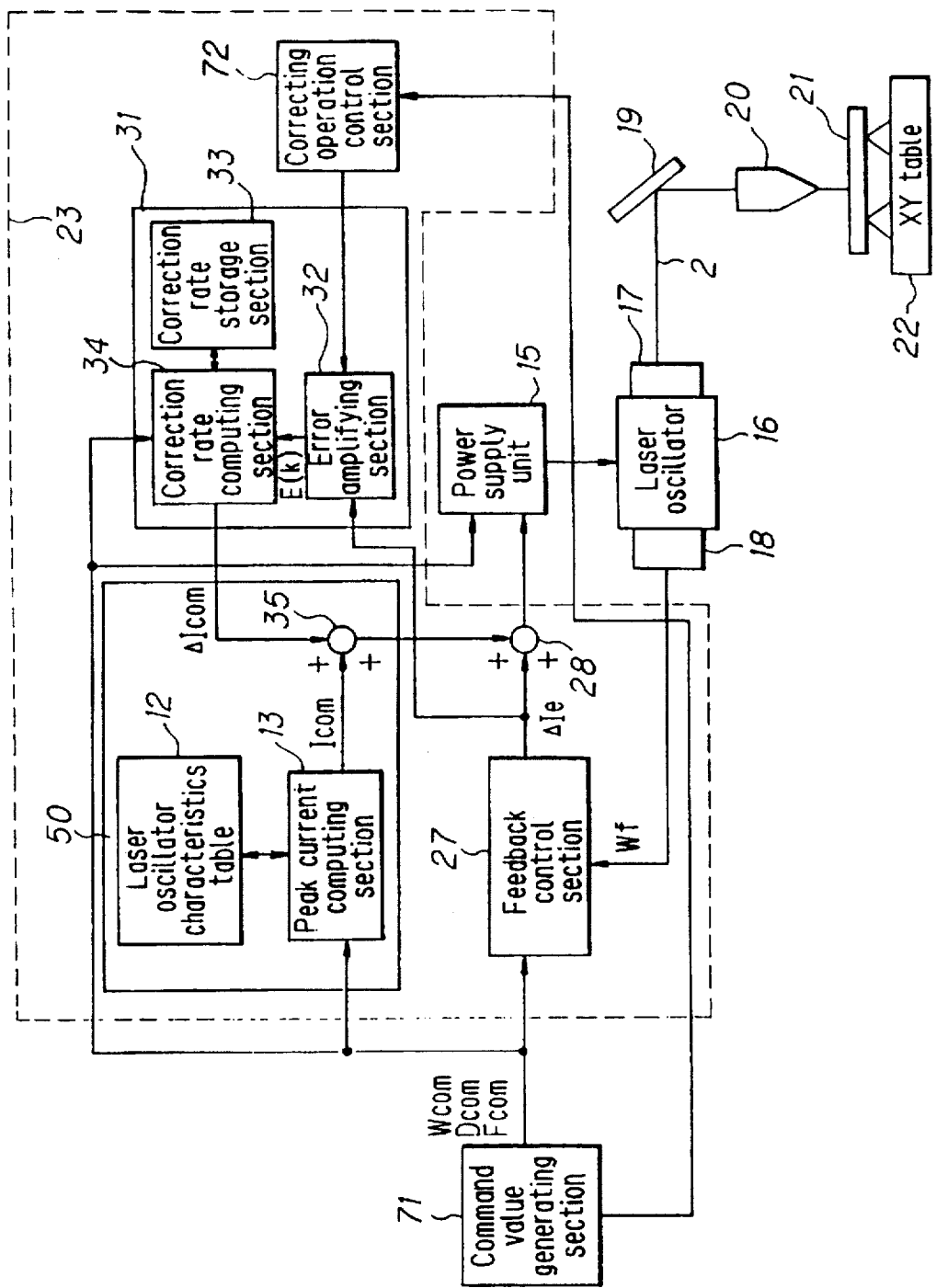
FIG. 32 is a block diagram illustrating configuration of a laser machining apparatus according to Embodiment 1-15.

FIG. 32 is a block diagram illustrating configuration of a laser machining apparatus according to Embodiment 1-15. In FIG. 32, the same reference numerals are assigned to the same components as those in Embodiment 1-10 shown in FIG. 26, and description thereof is omitted herein. The reference numeral 71 indicates a command value generating section for outputting a laser power, a duty ratio, and a frequency as machining conditions and also giving a command for gas exchange, and it is a kind of numerical control unit. The reference numeral 72 indicates a correcting operation control section, which makes a determination, according to material of the workpiece 21, as to whether a correcting operation of the F/F correcting section 31 should be executed or not.

Next description is made for operations of the laser machining apparatus according to Embodiment 1-15 constructed as described above. The same reference numerals are assigned to the same components as those in Embodiment 1-10 shown in FIG. 26, and description thereof is omitted herein. A command value generating section 71 outputs information on material of the workpiece 21. In case of a highly reflective material, as described in relation to Embodiment 1-10, malfunction is generated if a correcting operation of the F/F correcting section 31 is started, and to prevent this malfunction, information of the material is inputted from the command value generating section 71 into the correcting operation control section 72, and a determination as to whether the material is highly reflective or not is executed. If the material is a highly reflective one, the error amplifying section 32 is controlled so that correcting operation of the F/F correcting section 31 is stopped.

For this reason, with the embodiment described above, malfunction of the F/F correcting section 31 can be prevented by inputting information as to whether material of the workpiece 21 is high reflective or not from the command generating section 71 when the material is highly reflective.

[Embodiment 1-16]

Figure 33:
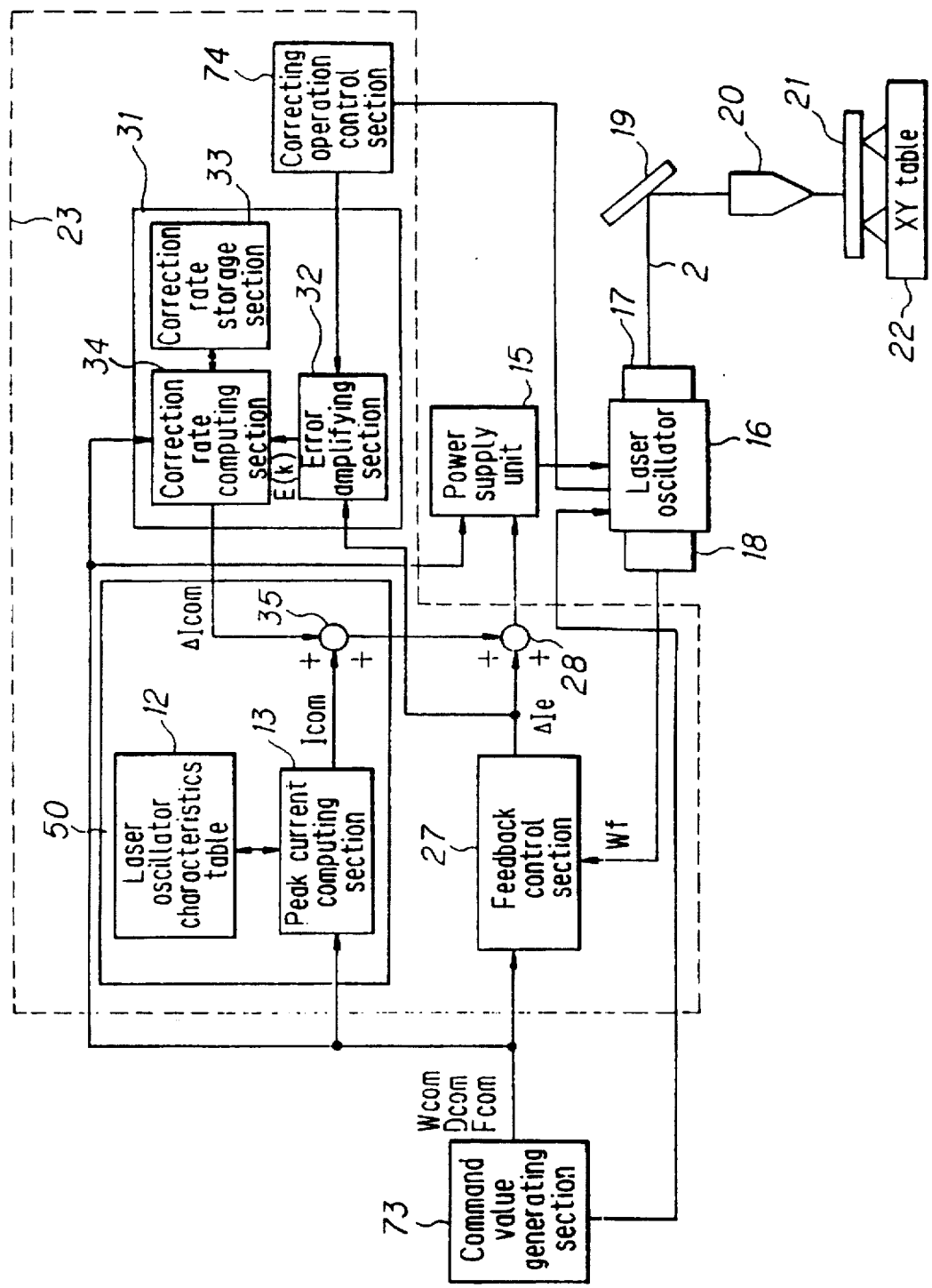
FIG. 33 is a block diagram illustrating configuration of a laser machining apparatus according to Embodiment 1-16.

FIG. 33 is a block diagram illustrating configuration of a laser machining apparatus according to Embodiment 1-16. In FIG. 33, the same reference numerals are assigned to the same components as those in Embodiment 1-10 shown in FIG. 26, and description thereof is omitted herein. The reference numeral 73 indicates a command generating section for outputting a laser power, a duty ratio, and a frequency as machining conditions and also giving a command for gas exchange, which is like a numerical control unit. The reference numeral 74 indicates a correcting operation control section, which controls a correcting operation of the F/F control section 31 when a gas in the laser oscillator 16 is exchanged.

Next description is made for operations of the laser machining apparatus according to Embodiment 1-16 constructed as described above. The same reference numerals are assigned to the same components as those in Embodiment 1-10 shown in FIG. 26, and description thereof is omitted herein. The command value generating section 73 outputs a laser power, a duty ratio, and a frequency as machining conditions, sets a command for a laser power to zero (0) when a gas in the laser oscillation is deteriorated, and outputs a command for gas exchange to the laser oscillator 16. When the laser oscillator 16 receives the command, it executes gas exchange, and then outputs a gas exchange complete signal to the command value generating section 73 and the correcting operation control section 74. The command value generating section 73 outputs appropriate machining conditions for executing correction of the F/F control section 50 when gas exchange is complete, and starts power control. If it is determined that a correcting operation of the F/F control section 50 is not complete, the correcting operation control section 74 controls the error amplifying section 32 so that a correcting operation of the F/F correcting section 31 is started and then stopped in the time T2 previously set. If the correcting operation is complete, a correcting operation complete flag is displayed, and a correction of the F/F correcting section is stopped. If an operation of the F/F correcting section 31 is started immediately after a gas in the laser oscillator 16 is exchanged, machining can be executed under good conditions even immediately after the gas exchange.

It should be noted that, as an appropriate machining condition for executing a correcting operation of the F/F control section 50, a continuous wave having a frequency of 0 and a duty ratio of 1 is used. The reason is that, when the machining condition is for pulse mode, an output from the power sensor 18 includes an AD element, and this AD element is also included in the output $\Delta Ie$ from the F/B control section 27 to impede a correcting operation of the F/F control section 50.

[Embodiment 1-17]

Figure 34:
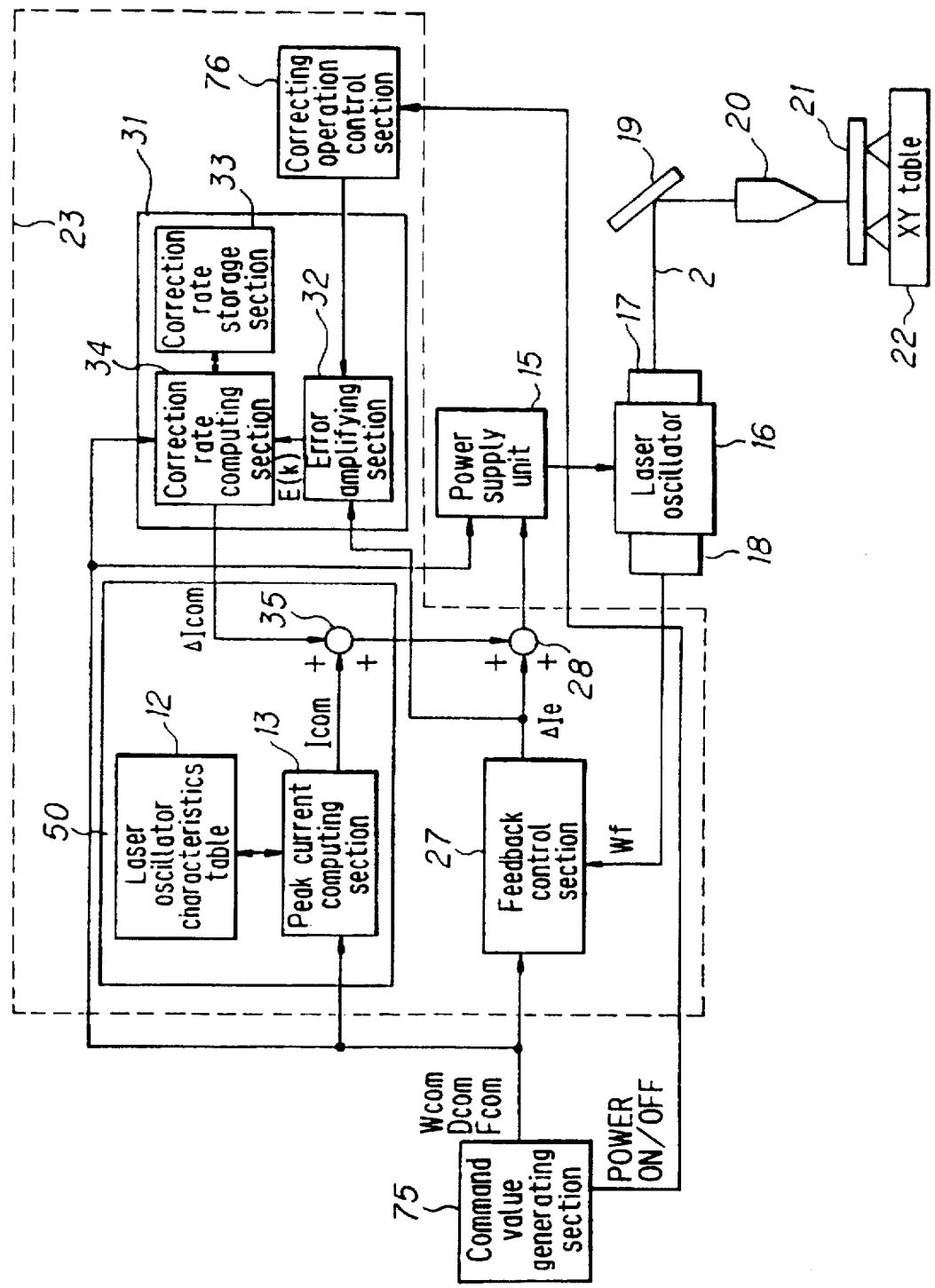
FIG. 34 is a block diagram illustrating configuration of a laser machining apparatus according to Embodiment 1-17.

FIG. 34 is a block diagram illustrating configuration of a laser machining apparatus according to Embodiment 1-17. In FIG. 34, the same reference numerals are assigned to the same components as those in Embodiment 1-10 shown in FIG. 26, and description thereof is omitted herein. The reference numeral 75 indicates a command value generating section for outputting a laser power, a duty ratio, and a frequency as machining conditions and also giving a command for a correcting operation of the F/F correcting section 31, which is like a NC (numerical control) unit. The reference numeral 76 indicates a correcting operation control section, which receives a command for the correcting operation inputted from the command value generating section 75 and controls a correcting operation of the F/F correcting section 31.

Next description is made for operations of the laser machining apparatus according to Embodiment 1-17 constructed as described above. In FIG. 34, the same reference numerals are assigned to the same components as those in Embodiment 1-10 shown in FIG. 26, and description thereof is omitted herein. The command generation section 75 sets appropriate machining conditions for executing a correcting operation of the F/F control section 50 immediately after power supply is turned ON and starts power control. Simultaneously the command value generating section 75 outputs a command for a correcting operation to the correcting operation control section 76. When the correcting operation control section 76 receives a command for a correcting operation from the command value generating section 75, it controls the error amplifying section 32 so that a correcting operation of the F/F correcting section 31 is started and then stopped in the preset time T2. When the correcting operation is complete, a correcting operation complete flag is displayed, and correction of the F/F correcting operation is stopped. Thus, by making the F/F correcting operation 31 execute a correcting operation immediately after power supply is turned ON, machining can be executed under good conditions even immediately after power supply is turned ON.

[Embodiment 1-18]

Figure 35:
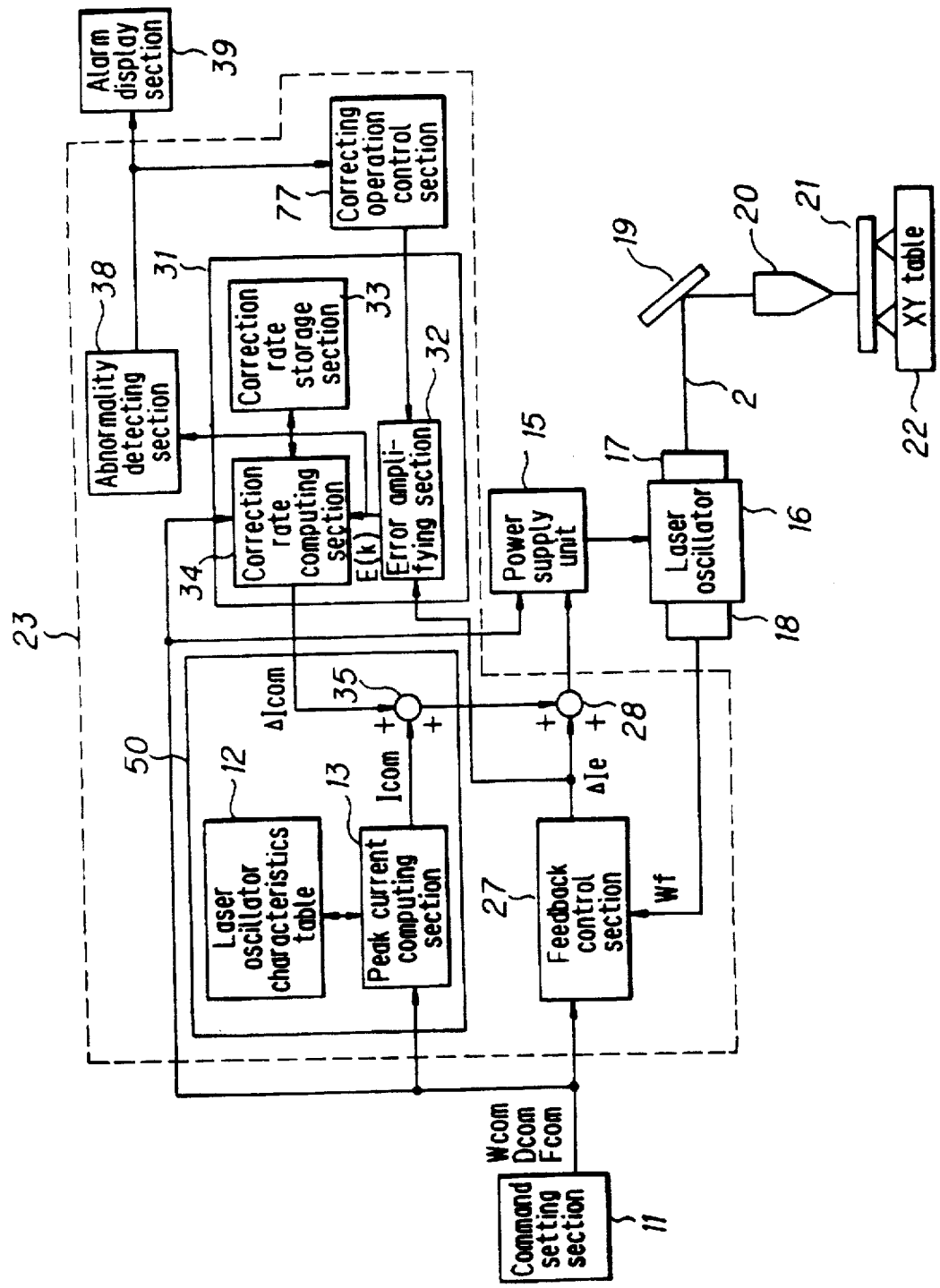
FIG. 35 is a block diagram illustrating configuration of a laser machining apparatus according to Embodiment 1-18 and Embodiment 1-19.
Figure 36:
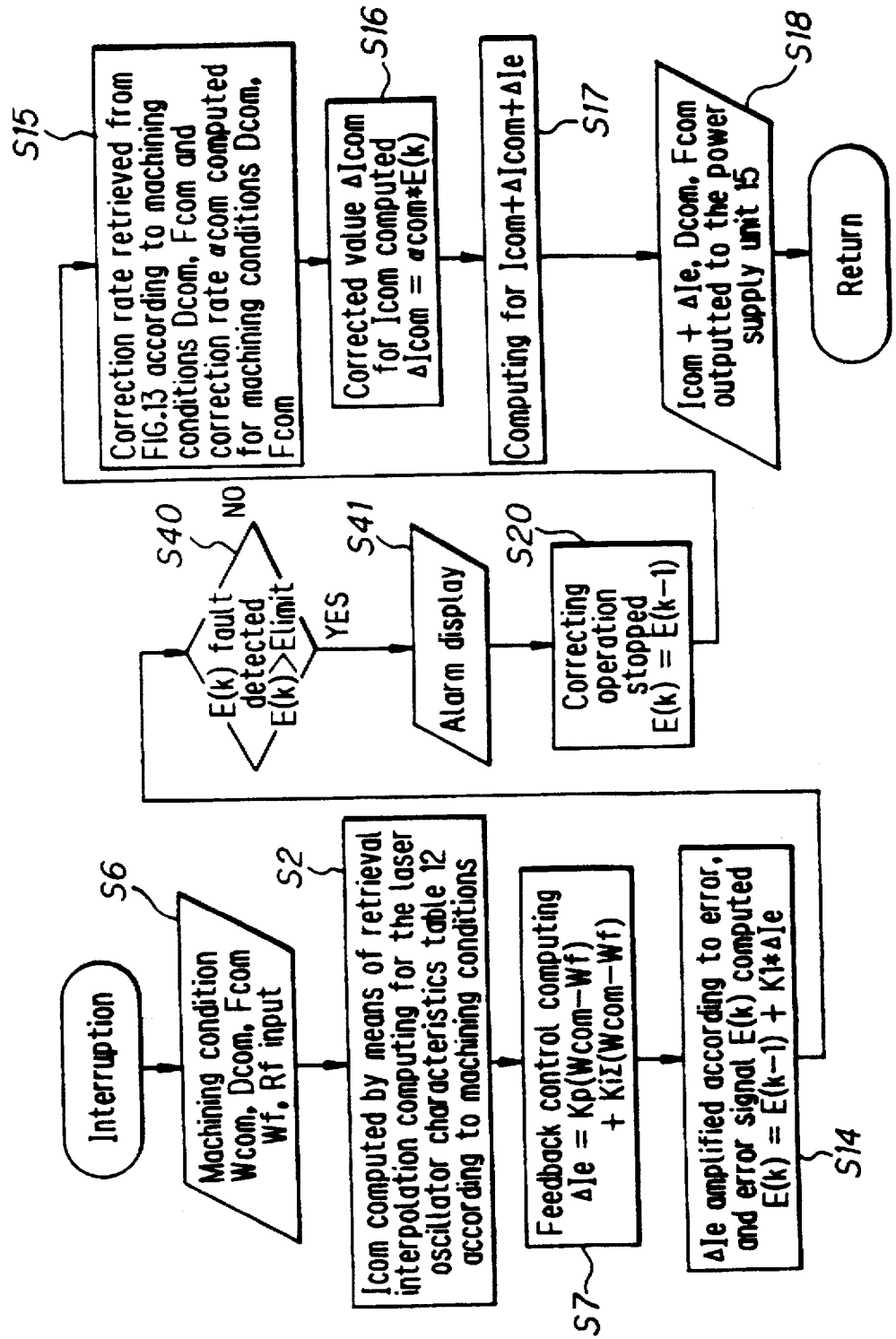
FIG. 36 is a flow chart illustrating a processing according to Embodiment 1-18.

FIG. 35 is a block diagram illustrating configuration of a laser machining apparatus according to Embodiment 1-18, and FIG. 36 is a flow chart illustrating a processing in Embodiment 1-18. In FIG. 35, the same reference numerals are assigned to the same components as those in Embodiment 1-6 shown in FIG. 16, and description thereof is omitted herein. The reference numeral 38 indicates an abnormality discriminating means for determining that a state of change in characteristics of a gas is abnormal, and the reference numeral 39 indicates an alarm indicating means, such as, for instance, an alarm displaying section. The reference numeral 77 indicates a correcting operation control section, which controls the F/F correcting section 31 according to determination by the abnormality discriminating section 38.

Next description is made for operations of the laser machining apparatus according to Embodiment 1-18 constructed as described above. When characteristics of a gas sealing in the laser oscillator 16 changes and then characteristics of oscillation of the laser oscillator changes, as described in relation to Embodiment 1-5, changes in characteristics of the laser oscillator 16 is outputted s an output error ΔIe of the F/F control section 27. This error ΔIe is inputted into the F/F correcting section 31, which corrects an output from the F/F control section 50. When a change rate in characteristics of a gas becomes large, also an output from the error amplifying section 32 in the F/F correcting section 31 becomes larger. So the F/F correcting section 31 outputs an output from the error amplifying section 32 to the abnormality discriminating section 38.

The abnormality discriminating section 38 receives a signal outputted from the F/F correcting section 31, and compares the output signal to a preset value for discriminating abnormality. If it is determined as a result of comparison that the state is abnormal, the result is outputted to the alarm displaying section 39 and the correcting operation control section 77. The alarm displaying section 39 displays an alarm. When the abnormality discriminating section 38 determines that the state is abnormal, the correcting operation control section 77 outputs a command for stopping an operation of the F/F correcting section 31. The F/F correcting section 31 receives the command for stopping operation of the correcting operation control section 77 and stops the correcting operation.

Then description is made for a processing in the dotted line section 23 with reference to the flow chart shown in FIG. 36. This processing is executed by interrupting at a time interval. In FIG. 36, the same reference numerals are assigned to the same components as those in Embodiment 1-6 shown in FIG. 17, and description thereof is omitted herein. In step S40, if it is determined in a processing by the abnormality discriminating section 38 that an output E(k) from the error amplifying section 32 is larger than the value for discriminating abnormality Elimit, it is determined that the state is abnormal, and processing in step S41 and that in step S20 are executed. In step S41, an alarm is displayed in the alarm displaying section 39. If not abnormal, the processing step shifts to step S15.

As described above, with the embodiment described above, when change in characteristics of a gas becomes very large, an alarm is automatically outputted, so that laser machining under good conditions can be executed up to a limit of use of a gas. Also an appropriate timing for gas exchange can be known.

If an output from the abnormality discriminating section 38 is abnormal, a command for gas exchange may be given to an operator. In that case, gas exchange is executed at an appropriate timing, and machining fault can be previously prevented. Furthermore, if an output from the abnormality discriminating section 38 is abnormal, gas exchange may automatically be executed according to the system configuration. In this case, workpiece load to an operation for exchanging a gas is saved, which allows power saving in machining works.

By setting an abnormality discriminating value to be preset in the abnormality discriminating section 38 to a value close to a limit of correction by the F/F correcting section 31, it is possible to efficiently exchange a gas because an alarm is displayed at a timing close to a use limit of the gas.

[Embodiment 1-19]

A laser machining apparatus according to Embodiment 1-19 has basically the same configuration as that of Embodiment 1-18 excluding the point that the abnormality discriminating section 38 measures times of and a time required for correction of the F/F correcting section 31, and displays an alarm when the measurement value becomes larger than a preset abnormality discriminating value. With this configuration, it is possible to easily diagnose whether a correcting operation of the F/F correcting section 31 is being executed correctly or not, and machining fault can be previously prevented.

[Embodiment 1-20]

Figure 37:
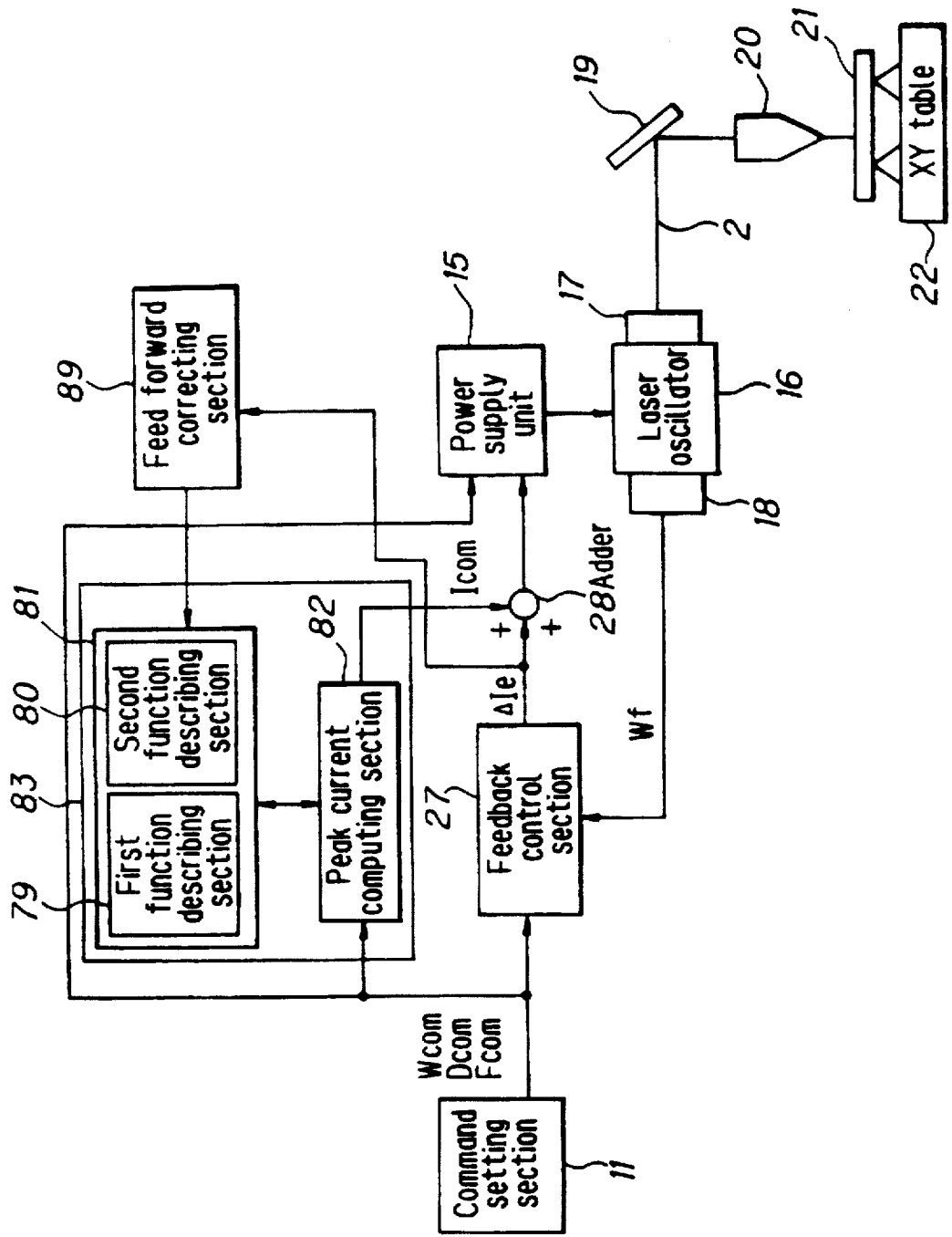
FIG. 37 is a block diagram illustrating configuration of a laser machining apparatus according to Embodiment 1-20.
Figure 38A:
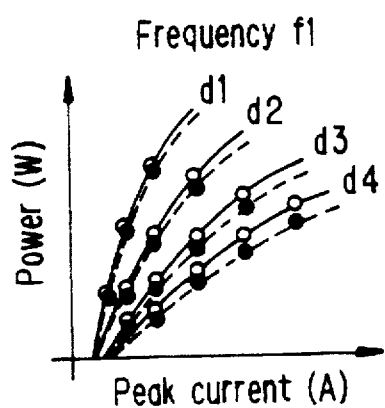
FIG. 38 is a graph showing a relation between energy contributing to a laser power according to Embodiment 1-20 and the laser power.
Figure 38B:
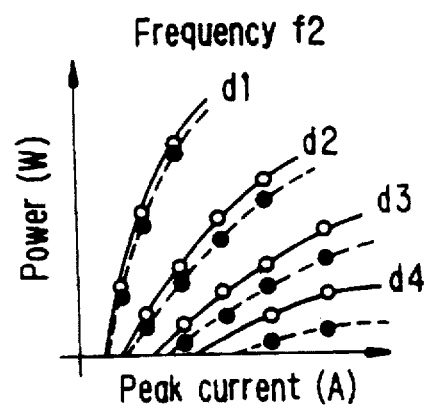
Figure 38C:
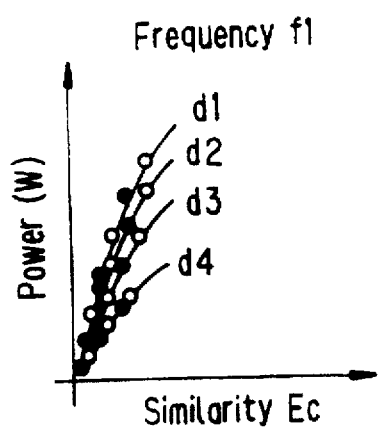
Figure 38D:
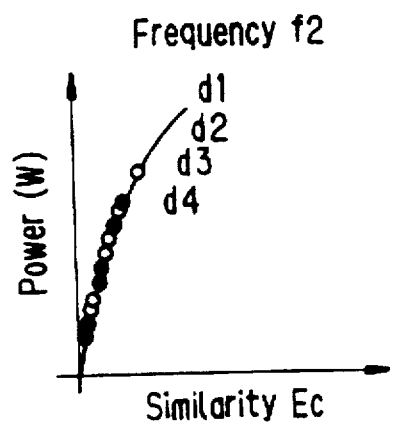

FIG. 37 is a block diagram illustrating configuration of a laser machining apparatus according to Embodiment 1-20. In FIG. 37, the same reference numerals are assigned to the same components as those in Embodiment 1-3 shown in FIG. 8, and description thereof is omitted herein. In this figure, designated at the reference numeral 79 is a first function describing section, at 80 a second function describing section, at 81 laser oscillator characteristics described by a first function describing section 79 and a second function describing section 80, at 82 a peak current computing section for computing a peak current from machining conditions instructed in the command setting section 11 and laser oscillator characteristics 81, at 83 a F/F control section comprising the laser oscillator characteristics 81 and the peak current computing section 82.

Next description is made for operations of the laser machining apparatus according to Embodiment 1-20 constructed as constructed above. In this embodiment, Operations in this embodiment are basically the same as those in Embodiment 1-3 shown in FIG. 8 excluding the operations by the F/F control section 83, and detailed description is made especially for operations of the F/F control section 83. At first, description is made for a method of describing the laser oscillator characteristics 81. General laser oscillator characteristics changes, as shown in FIG. 2, according to a peak current, a duty ratio, and a frequency, and furthermore according to deterioration of a gas and a gas temperature. So in order to describe the characteristics as shown in FIG. 2, of the energy which a gas in the laser oscillator 16 receives for electric discharge, a quantity of energy close to that of energy contributing to a laser power is described with a first function in which at least a current value at an oscillation limit of laser output is used as a parameter.

For instance, the quantity of energy Ec contributing to laser oscillation is expressed, for instance, by the following expression (10);

$$Ec = P(I, f, d, I\_o) \quad (10)$$
$$= d(I + Q(f, I\_o) - I\_o - Q(f, I\_o))$$

wherein $I\_o$ is a current at an oscillation limit of laser output, $I$ is a peak current, $f$ is a frequency, and $d$ is a duty ratio. $P$ and $Q$ are specific functions.

The relation between approximate values of the frequency, duty ratio and laser power are described with the second function. The expression (11) is, for instance, as follows:

$$W = R(Ec) \quad (11)$$

wherein W is a laser power.

FIG. 38 shows a relation among the laser oscillator characteristics, the approximate values corresponding to the characteristics, and a laser power for a different degree of gas deterioration and gas temperature. As shown in this figure, even if deterioration of a gas or change in gas temperature occurs, the relation can be shown on a curve, indicating that the functions P and Q are constant even if deterioration of a gas or changes in gas temperature occurs. Also the curve passes through an origin even if a frequency varies, which indicates the laser oscillator characteristics can be described with data far less than those required for preparing the table 3. FIG. 39 is a chart showing an example of data corresponding to the functions P, Q.

Next description is made for a way of computing in the peak current computing section 82. The peak current computing section 82 computes Ec corresponding to a laser power Wcom using a laser power Wcom, a frequency Fcom, a duty ratio Dcom, which are instructed in the command setting section 11, a current I__o at an oscillation limit of the current laser output, and from the W-Ec data table corresponding to the expression (11) shown in FIG. 39. Then a peak current I is computed using a value for Q (Fcom, I__o) obtained from the Q (f, I__o) data table and the expression (10). However, in the data table, necessary data is obtained by way of, for instance, interpolation.

Operations of the F/F control section 83 are as described above, and in this embodiment, always an accurate peak current can be obtained like in Embodiment 1-3, and a power of the laser oscillator 16 can always be controlled accurately even in open loop control. Also even if an error is generated in laser power output because, for instance, an error is generated in the laser oscillator characteristics 81 in the F/F control section 83, a lower power is fed back and F/B control is executed so that the power error is reduced to zero, so that high precision and high reliability laser power control with output error of zero can be realized constantly.

It is needless to say that the F/F control section 83 in this embodiment can be used in place of the F/F control section 14 in Embodiment 1-1. In addition, although power control is executed by controlling a peak current, power control depending on a duty ratio may be realized by using a laser power Wcom, a frequency Fcom, a peak current Icom, each of which is set in the command setting section 11, and a current value I__o at an oscillation limit of the current laser output, obtaining Ec corresponding to the laser power Wcom from the data shown in FIG. 39, and providing a duty ratio computing section for obtaining a duty ratio D using the expression (10) in place of providing the peak current computing section 82. Furthermore it is needless to say that an F/F control section having the duty ratio computing section described above can be used in place of the F/F control section 26 in Embodiment 1-2.

[Embodiment 1-21]

Figure 40:
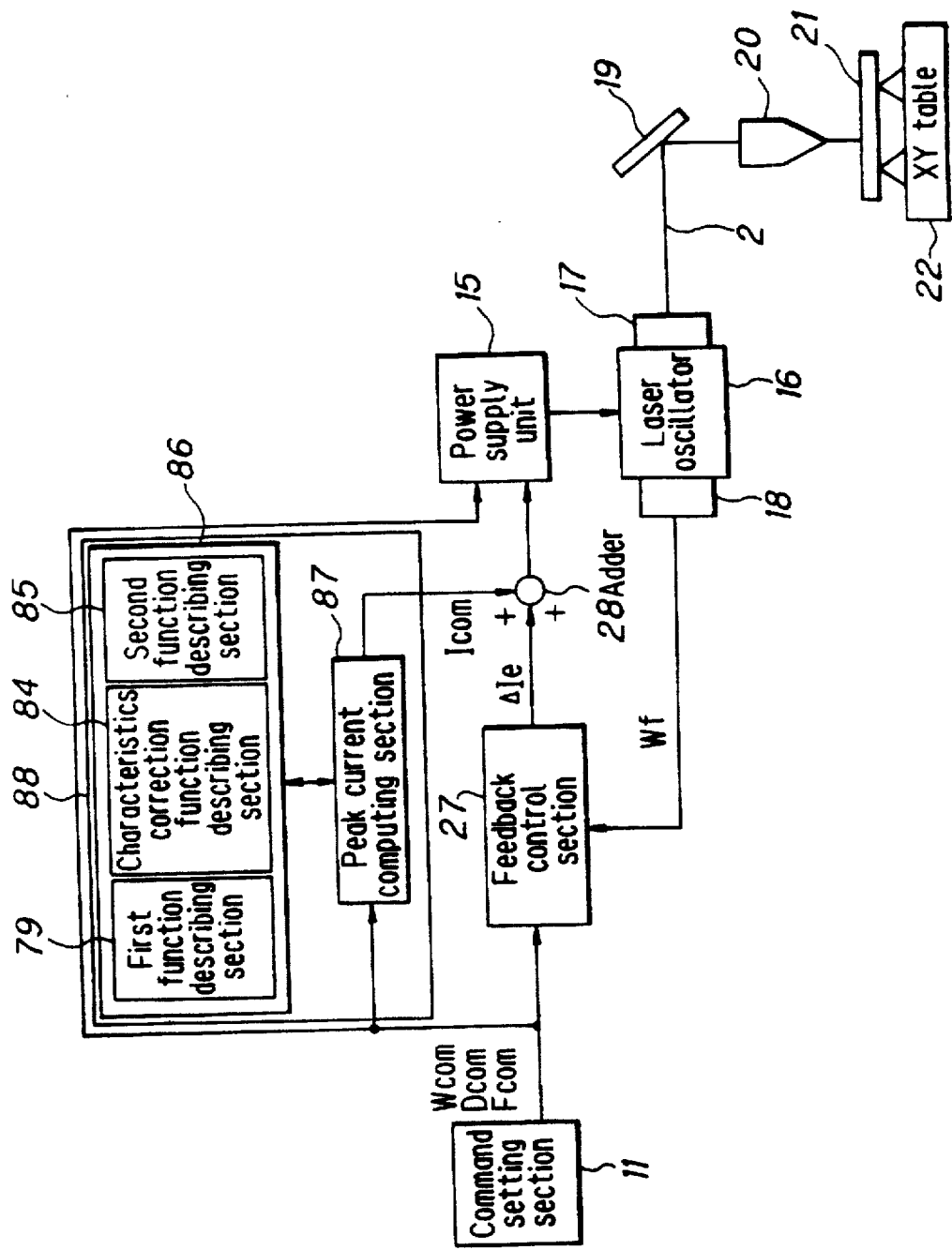
FIG. 40 is a block diagram illustrating configuration of a laser machining apparatus according to Embodiment 1-21.

FIG. 40 is a block diagram illustrating configuration of a laser machining apparatus according to Embodiment 1-21. In FIG. 40, the same reference numerals are assigned to the same components as those in Embodiment 1-3 shown in FIG. 8 and those in Embodiment 1-20 shown in FIG. 37, and description thereof is omitted herein. In this figure, designated at the reference numeral 84 is a characteristics correcting function describing section for correcting a volume described in the first function describing section 79, at 85 a second function describing section, at 86 a laser oscillator characteristics described by the first function describing section 79, the characteristics correcting function describing section 84, and the second function describing section 85, at 87 a peak current computing section for computing a peak current from machining conditions set in the command setting section 11 and from the laser oscillator characteristics 86, and at 88 an F/F control section comprising the laser oscillator characteristics 86 and the peak current computing section 87.

Next description is made for operations of the laser machining apparatus according to Embodiment 1-21 constructed as described above. Operations in this embodiment are basically the same as those in Embodiment 1-3 shown in FIG. 8 excluding the F/F control section 88, so that detailed description is made especially for operations of the F/F control section 88. At first operation is made for a method of describing the laser oscillator characteristics 86. The first function describing section 79 in the laser oscillator characteristics 86 is, as described in relation to Embodiment 1-20, provided by describing, of quantities of energy which a gas in the laser oscillator 16 receives for electric discharge, a quantity of energy contributing to laser power with a function in which at least a current value at an oscillation limit of laser output is used as a parameter; namely, for instance with the expression (10). Herein, as clearly shown in FIG. 38, a relation between a quantity of energy Ec contributing to laser power and a laser power varies according to a frequency or a duty ratio. Then, approximate quantity Ec is corrected in the characteristics correcting function describing section 84 with the expression (12) below.

$$Ec' = S(f, d)Ec \quad (12)$$

With the correction above, in the second function describing section 85, the only function R' is used regardless of a frequency and a duty ratio, and a relation between the corrected approximate rate Ec' and a laser power W is described as follows;

$$W = R'(Ec') \quad (13)$$

S and R' are specified functions.

In this embodiment, as the first function describing section 79 is used, even in a case where deterioration of a gas or change in gas temperature changes, it is possible to reduce a quantity of data to be used for describing the laser oscillator characteristics 86. Also as it is possible to reduce a quantity of data used for describing the second function describing section 85 by providing the characteristics correcting function describing section 84, the laser oscillator characteristics 86 can be described with a furthermore smaller quantity of data as compared to that in Embodiment 1-20.

FIG. 41 is a chart illustrating an example of data corresponding to the functions Q, S, and R'. Next, description is made for a way of computing in the peak current computing section 87. In the peak current computing section 87, Ec' corresponding the laser power Wcom is obtained using the power Wcom, a frequency Fcom, and a duty ratio Dcom set in the command setting section 11 and a current value I__o at an oscillation limit of the current laser output, and from the W-Ec' data table corresponding to the expression (13) shown in FIG. 41. Then, Ec is obtained depending on a value of S (Fcom, Dcom) obtained from the S (f, d) data table corresponding to the expression (12). Finally a peak current I is obtained using a value of Q (Fcom, I__o) obtained from the Q (f, I__o) data table and the expression (10). However, in the data table, necessary data is obtained by means of, for instance, direct interpolation.

Operations of the F/F control section 88 are as described above, but in this embodiment always an accurate peak current can be obtained like in Embodiment 1-3. For this reason, a power for the laser oscillator 16 can accurately be controlled even by means of open loop control. Also in a case where an error is generated in a laser power output because, for example, an error is generated in the laser oscillator characteristics 86 in the F/F control section 88, a laser power is fed back and F/B control is executed so that the power error is reduced to zero (0), a high precision and high reliability laser power control with output error of zero can be realized constantly.

It is needless to say that the F/F control section 88 in this embodiment can be used in place of the F/F control section 14 in Embodiment 1-1. In addition, although power control is executed by controlling a peak current, a power control by controlling a duty ratio may be realized by providing a duty ratio computing section for obtaining a duty ratio D by using a laser power Wcom, a frequency Fcom, and a peak current Icom each set in the command setting section 11 as well as a current value I o at an oscillation limit of the current laser output in place of providing the peak current computing section 87. Furthermore it is needless to say that an F/F control section having the duty ratio computing section as described above can be used in place of the F/F control section 26.

[Embodiment 1-22]

Figure 42:
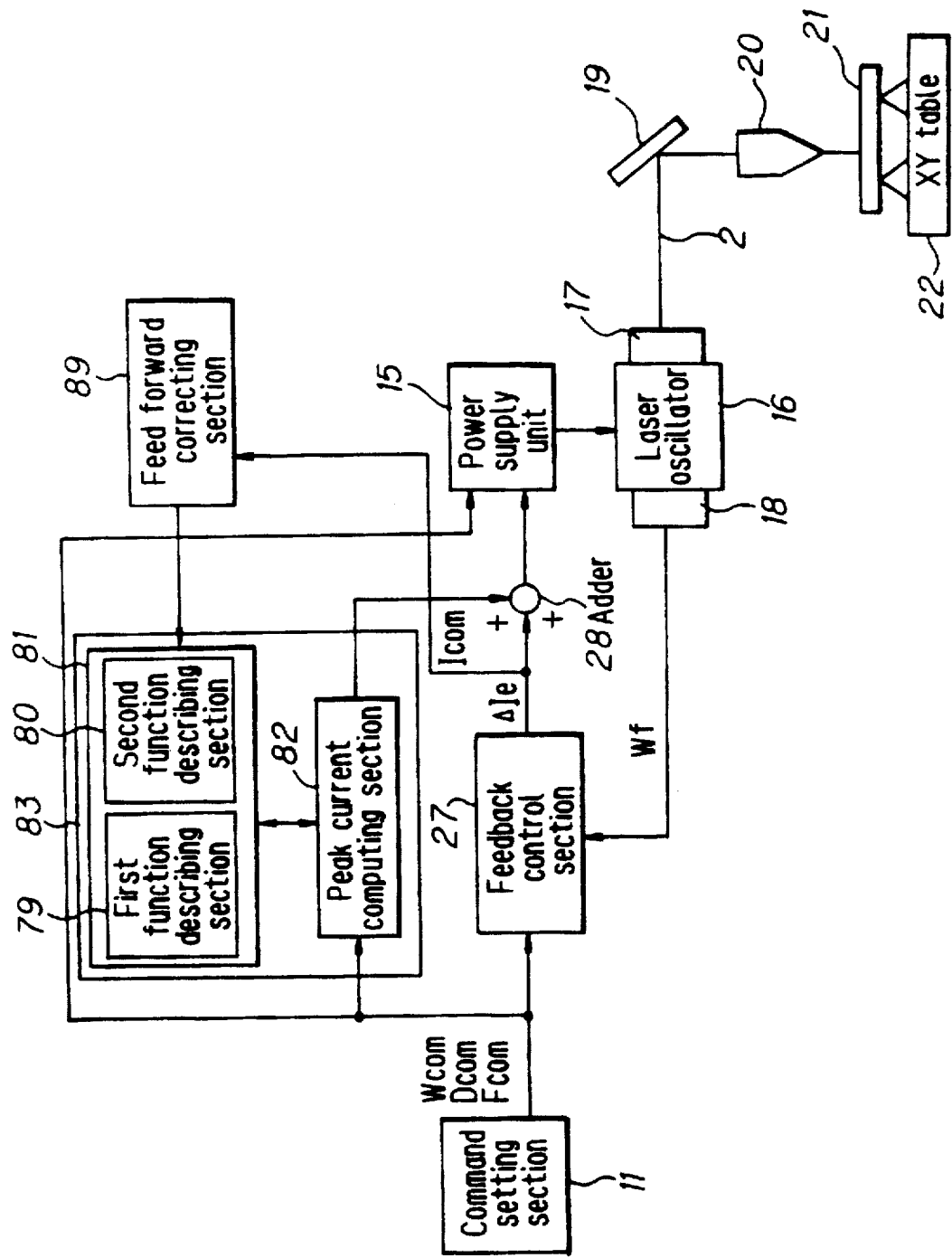
FIG. 42 is a block diagram illustrating configuration of a laser machining apparatus according to Embodiment 1-22.

FIG. 42 is a block diagram illustrating configuration of a laser machining apparatus according to Embodiment 1-22. In FIG. 42, the same reference numerals are assigned to the same components as those in Embodiment 1-20 shown in FIG. 37, and description thereof is omitted herein. The reference numeral 89 indicates an F/F control section for correcting the F/F control section 83.

Next description is made for operations of the laser machining apparatus according to Embodiment 1-22 constructed as described above. Operations in this embodiment are basically the same as those in Embodiment 1-20 shown in FIG. 37 excluding the F/F correcting section 89, so that detailed description is made herein especially for operations of the F/F correcting section 89. As described in relation to Embodiment 1-20, by describing a quantity close to that of energy contributing to a laser power of the quantities of energy which a gas in the laser oscillator 16 receives with a function in which a current at an oscillation limit of the current laser output is used as a parameter, even if deterioration of a gas or changes in gas temperature occurs, a relation between the approximate quantity above and a laser power can be shown on a curve. In other words, this indicates that a state of gas deterioration or change in gas temperature can be grasped by checking a current value at an oscillation limit of laser output. If the actual characteristics of a laser oscillator is different from that shown in the laser oscillator characteristics 81 due to, for instance, change in gas temperature, a desired laser power cannot be outputted according to a peak current command value outputted from the F/F control section 83, and correction of the peak current value is executed by the F/B control section 27.

The F/F correcting section 89 modifies the current value I_o at an oscillation limit for a laser output used as a parameter in the first function describing means 79 using the output Δle from the F/B control section 27, and corrects the laser oscillator characteristics 81. The correction rate is computed, for instance by the expression (14), shown below. It should be noted that, in the expression 14, Ki is a integral gain and Kp is a proportional gain.

$$\Delta I\_o = Ki \int \Delta Ie + Kp \Delta Ie \qquad (14)$$

Modification of I_o is continued by repeating the correcting operation as expressed by the expression (14) until finally Δle becomes equal to zero.

As a method of modifying the current value I_o at an oscillation limit of another laser output, a current value at an actual oscillation may be measured through test oscillation, and the measured value may be set as I_o. This method may be combined with the correcting method described before.

As described above, with the embodiment as described above, it is possible to modify the laser oscillator characteristics 81 with only one parameter, so that it is possible to easily construct the F/F correcting section 89. In addition, by making the F/F correcting section 89 run, power control under good conditions can be realized even if deterioration of a gas or change in gas temperature occurs. It should be noted that, although a laser machining apparatus with the F/F correcting section 89 is added thereto, the F/F correcting section 89 may be added to Embodiment 1-21

[Embodiment 2]

Next description is made for a laser machining apparatus according to Embodiment 2 of the present invention with reference to the related drawings.

[Embodiment 2-1]

Figure 43:
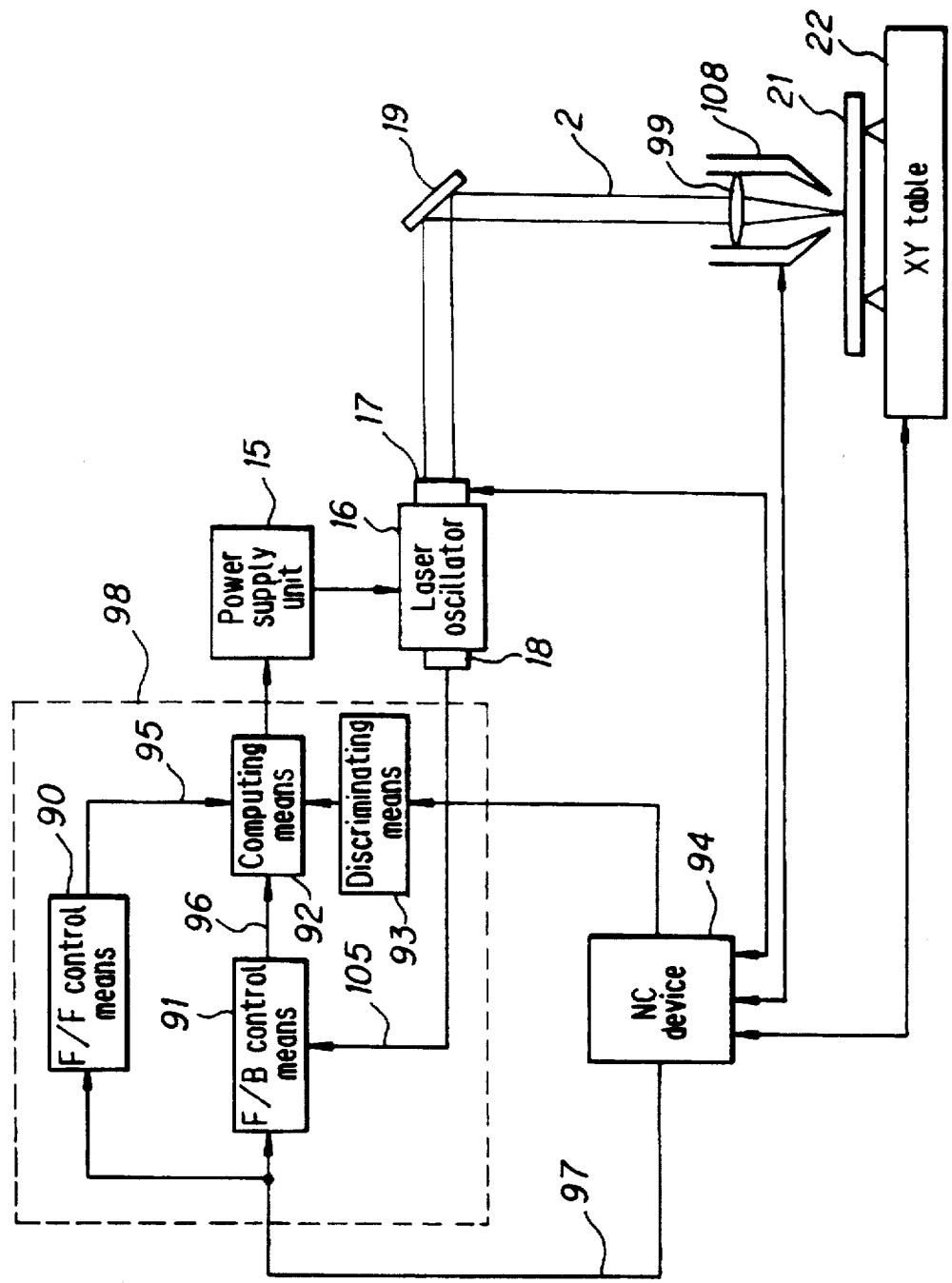
FIG. 43 is a block diagram illustrating configuration of a laser machining apparatus according to Embodiment 2-1.

Description is made for embodiments of the laser machining apparatus and a method for laser machining according to the present invention with reference to the related drawings. At first description is made for Embodiment 2-1. FIG. 43 is a block diagram illustrating configuration of a laser machining apparatus according to Embodiment 2-1, and the difference in its configuration from the apparatus described above and based on the conventional technology is that there are provided a computing means 92 for changing a value of an output signal 95 from the F/F control means 90 and a discriminating means 93.

Figure 44:
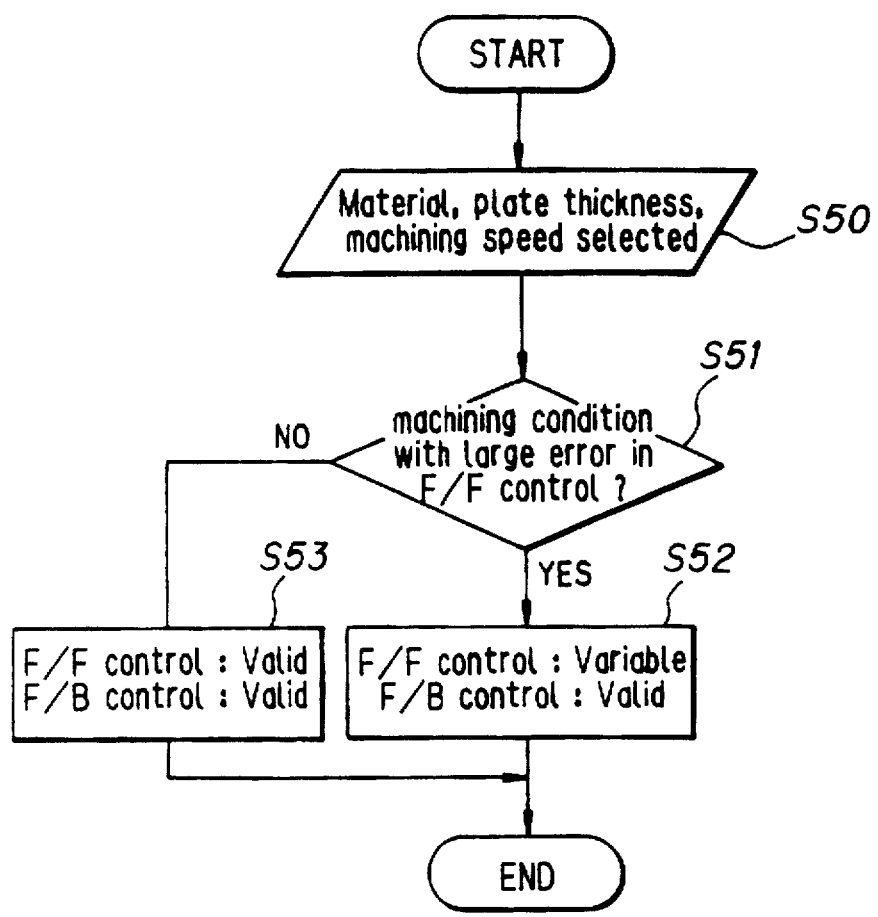
FIG. 44 is a flow chart illustrating a processing according to Embodiment 2-1.

Next description is made for operations thereof. FIG. 44 is a flow chart illustrating operations of the laser machining apparatus shown in FIG. 43. At fast, in step S50, machining conditions including a material of the workpiece 21, a laser output according to a plate thickness and a machining speed, a form of laser oscillation output (continuous wave or pulse), a pulse frequency, and a pulse duty are previously set in a memory unit in the NC device 94, and an operator selects a material, a plate thickness, and a machining speed. The machining conditions are decided according to the conditions specified by the operator.

Of the machining conditions, those generating a large laser output error when F/F control is executed are previously stored in a memory unit in the NC device 94, a determination as to whether the current machining condition causes a large error in F/F control or not is made in step S51, and if it is determined that a machining condition causing a large error has been selected in F/F control, a value of an output signal 95 from an F/F control means 90 is changed by a computing means 92 according to a command from a discriminating means 93 in step 52. If it is determined that the machining condition corresponding to the selected material, plate thickness, and machining speed does not cause a large laser output error when F/F control is executed, computing combining F/F control with F/B control is executed in step S53.

Herein the "valid" shown in step S51 and step S52 in FIG. 44 means that a value of an output signal from the F/F control means 90 is computed as it is. Also the "change" means that a value of an output signal from the F/F control means 90 is multiplied, for instance, by a coefficient in a range from 0 to 100%.

With the feature as described above, machining fault due to an estimation error in F/F control can be prevented.

[Embodiment 2-2]

Figure 45:
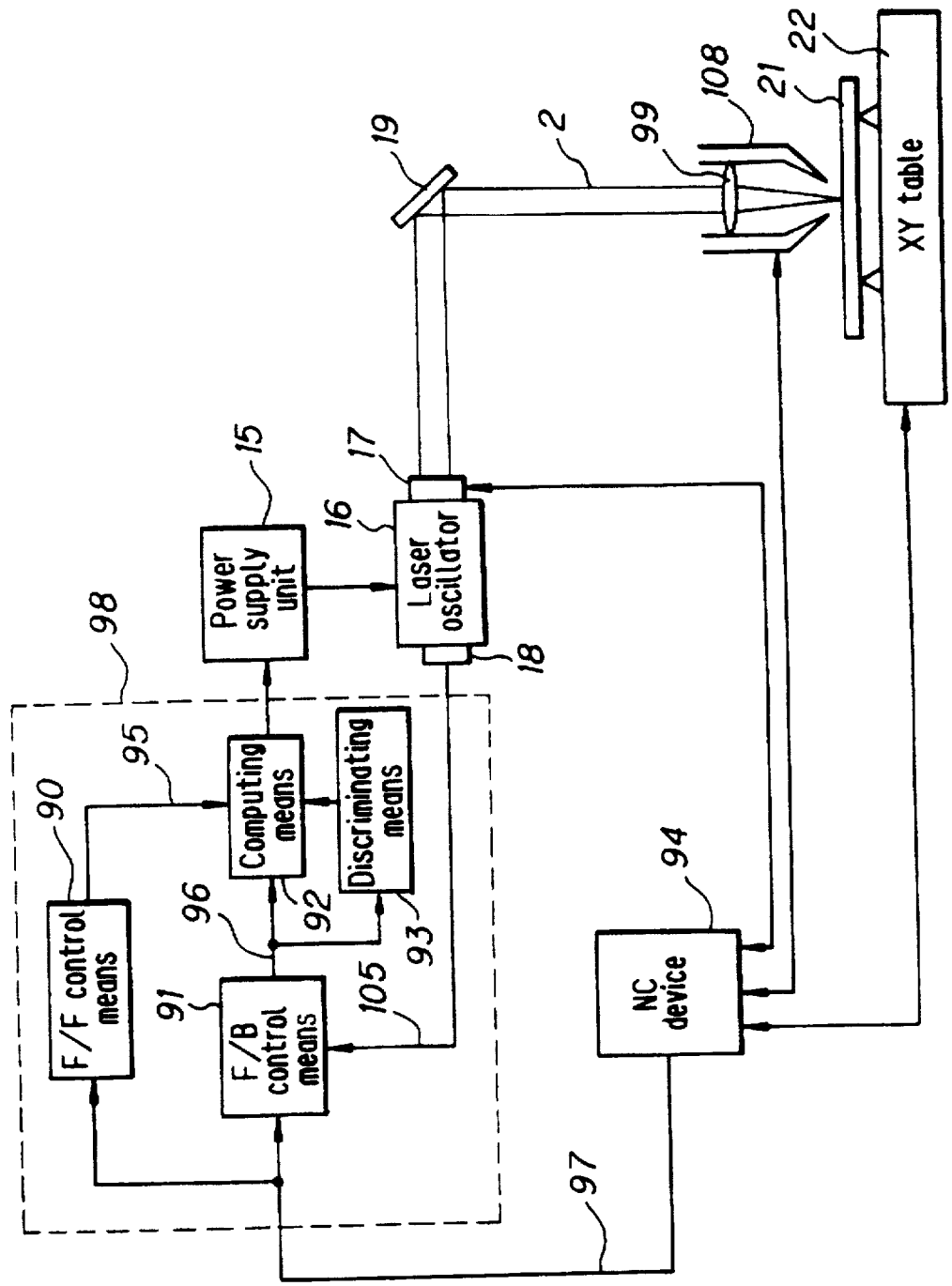
FIG. 45 is a block diagram illustrating configuration of a laser machining apparatus according to Embodiment 2-2.

Next description is made for Embodiment 2-2. FIG. 45 is a block diagram illustrating configuration of a laser machining apparatus according to Embodiment 2-2. In Embodiment 2-2, there are provided a computing means 92 which can change a value of an output signal 95 from the F/F control means 90 and a discriminating means 93.

In Embodiment 2-2, a value of the output signal 95 from the F/F control means 90 is controlled according to a value of an output signal 96 from the F/B control means 91 in its normal state. In the normal state, an error generated in the output signal 95 from the F/F control means 90 is corrected by the F/b control means 91.

If any error has not been generated in the output signal 95 from the F/F control means, a value of the output signal 96 from the F/B control means 91 is zero. For this reason, an error in the output signal 95 from the F/F control means 90 can be detected by checking a value of the output signal 96 from the F/B control means 91.

Figure 46:
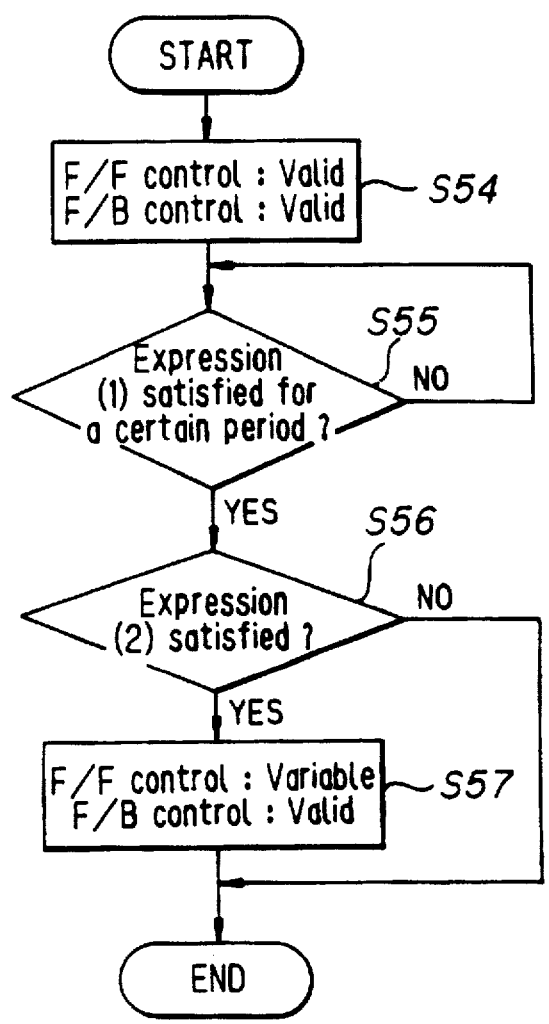
FIG. 46 is a flow chart illustrating a processing according to Embodiment 2-2.

Next description is made for operations thereof. FIG. 46 is a flow chart illustrating operations of the laser machining apparatus shown in FIG. 45. At first, in step S54, control using both the F/F control and F/B control is executed. In step S55, whether a value of the output signal 96 (Ier) from the F/B control means 91 is in the normal state (whether a change rate of the detected value is less than a specified value (=a) for a specified period of time) or not, namely, whether the expression (1A) described below is satisfied for a specified period of time, is checked.

$$\left| \frac{d\,Ier}{dt} \right| \leq a \tag{1A}$$

Then if it is determined that the above expression (1A) is satisfied, whether the absolute value is higher than a specified value (=b) in percentage against a value (=Wa) of the laser output command signal 97 or not, namely whether the following expression (2A) is satisfied in step S56 or not is checked.

$$\left| \frac{Ier}{Wa} \right| \geq b \tag{2A}$$

As a result, if it is determined that the above expression (2A) is satisfied, in step S57 a value of the output signal 95 from the F/F control means 90 is changed by the computing means 92 according to a command from the discriminating means 93.

With the features as described above, machining fault due to an estimation error in F/F control can be prevented.

[Embodiment 2-3]

Figure 47:
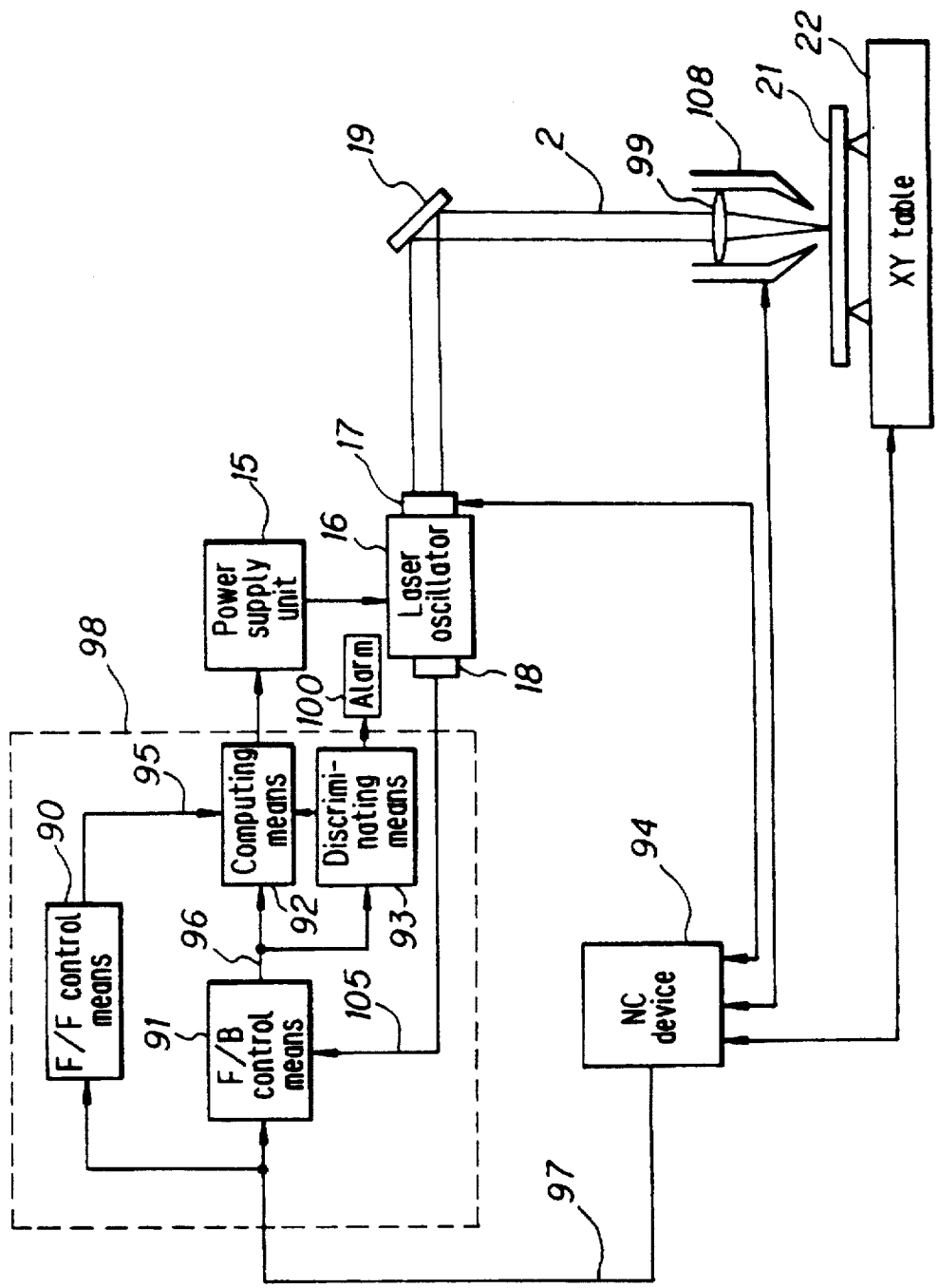
FIG. 47 is a block diagram illustrating configuration of a laser machining apparatus according to Embodiment 2-3.

Next description is made for Embodiment 2-3. FIG. 47 is a block diagram illustrating configuration of a laser machining apparatus according to Embodiment 2-3. The difference from Embodiment 2-2 shown in FIG. 45 is that there is provided an abnormality display means is 100.

Next description is made for operations thereof. In Embodiment 2-2, in a stage where an absolute value of the output signal 96 from the F/B control means 91 in its constant state reaches a value at which the output signal 95 from the F/F control means 90 is changed, namely in a stage indicated by the expression (3A) below, an alarm is displayed by an abnormality displaying means 100 at a specified site in the laser machining apparatus. The specific site includes, for instance, a display screen of the NC device 94, or the laser oscillator 16, or the XY table 22, where the operator can confirm the alarm.

$$\left| \frac{Ier}{Wa} \right| \leq c \, (c < b) \tag{3A}$$

With the operations described above, control making both the F/F control and feed back control valid can be executed continuously.

[Embodiment 2-4]

Figure 48:
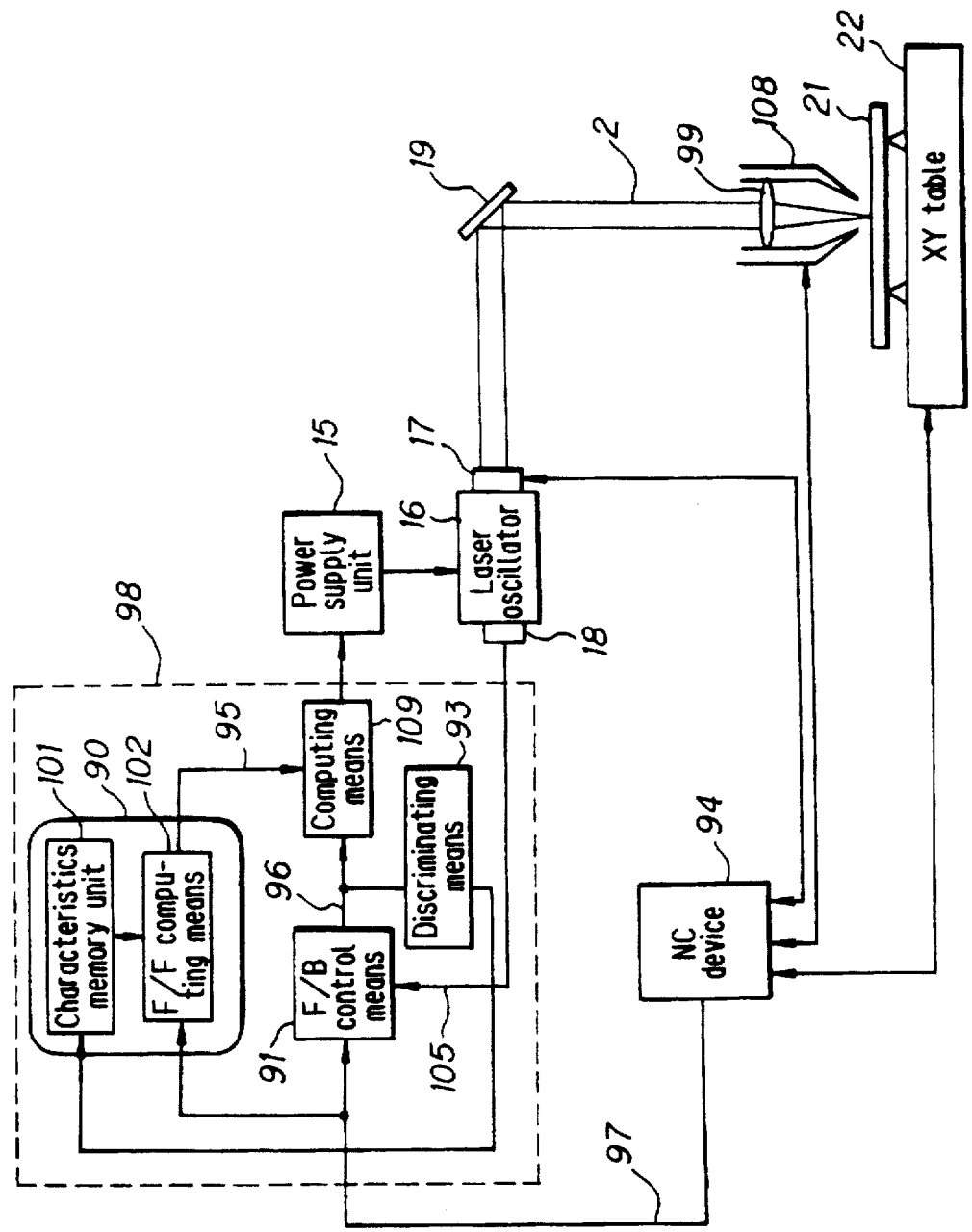
FIG. 48 is a block diagram illustrating configuration of a laser machining apparatus according to Embodiment 2-4.
Figure 64:
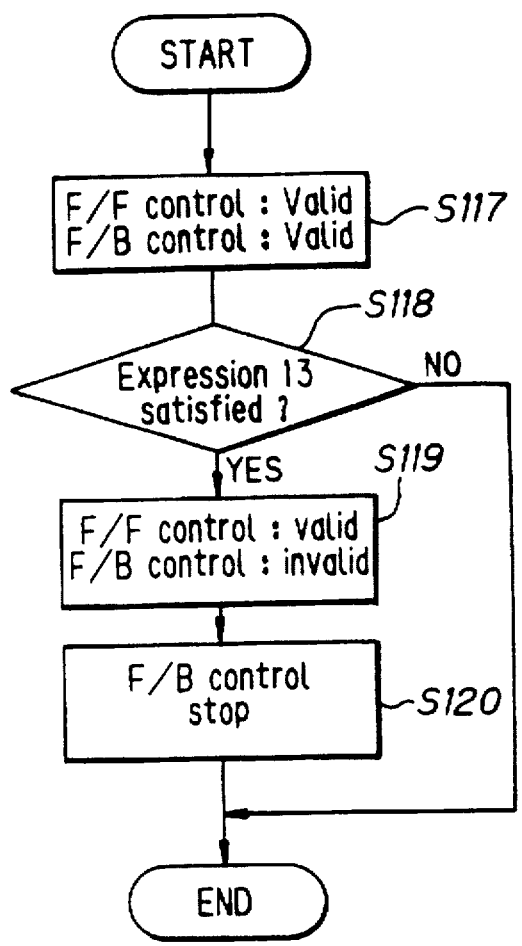
FIG. 64 is a flow chart illustrating a processing according to Embodiment 2-13.

Next description is made for Embodiment 2-4. FIG. 48 is a block diagram illustrating configuration of a laser machining apparatus according to Embodiment 2-4. The difference from configuration of the laser machining apparatus shown in FIG. 64 is that there is provided a discriminating means 93.

Figure 49:
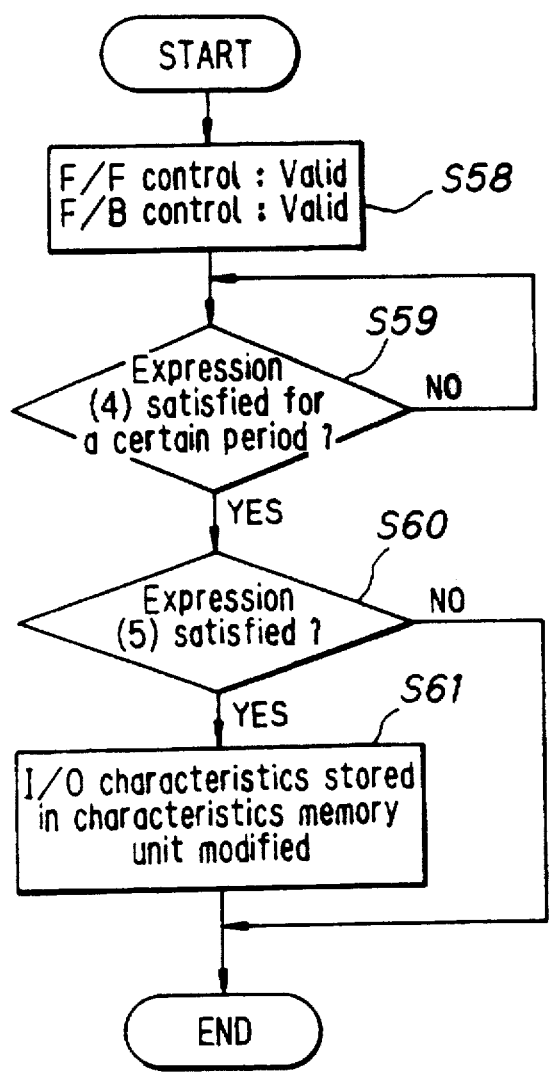
FIG. 49 is a flow chart illustrating a processing according to Embodiment 2-4.

Next description is made for operations thereof. FIG. 49 is a flow chart illustrating operations of the laser machining apparatus shown in FIG. 48. In step 58, control using both the F/F control and F/B control is executed, and whether a value of the output signal 96 from the F/B control means 91 indicates the normal state (a state where a percentage of change of a detected value is less than a specified value (=a) for a specified period of time) or not, namely whether the following expression (4A) is satisfied for a specified period of time in step S59 or not is checked.

$$\left| \frac{Ier}{Wa} \right| \geq c \, (c < b) \tag{4A}$$

As a result, if it is determined that the expression (4A) is satisfied for a specified period of time, then whether the absolute value is more than a specified value (=b) against a value of the laser output command signal 4 or not, namely whether the following expression (5A) is satisfied or not in step S60 is checked.

$$\left| \frac{Ier}{Wa} \right| \geq b \tag{5A}$$

As a result, if it is determined that the expression (5A) is satisfied, I/O characteristics is measured according to a command from the discriminating means 93, and the I/O characteristics stored in the characteristics storage device 101 is modified. It should be noted that the measurement is executed during a machining including piercing (penetrating a laser beam through a workpiece) or while processing is not being executed.

With the features as described above, control making both the F/F control and feed back control valid can be executed continuously.

[Embodiment 2-5]

Figure 50:
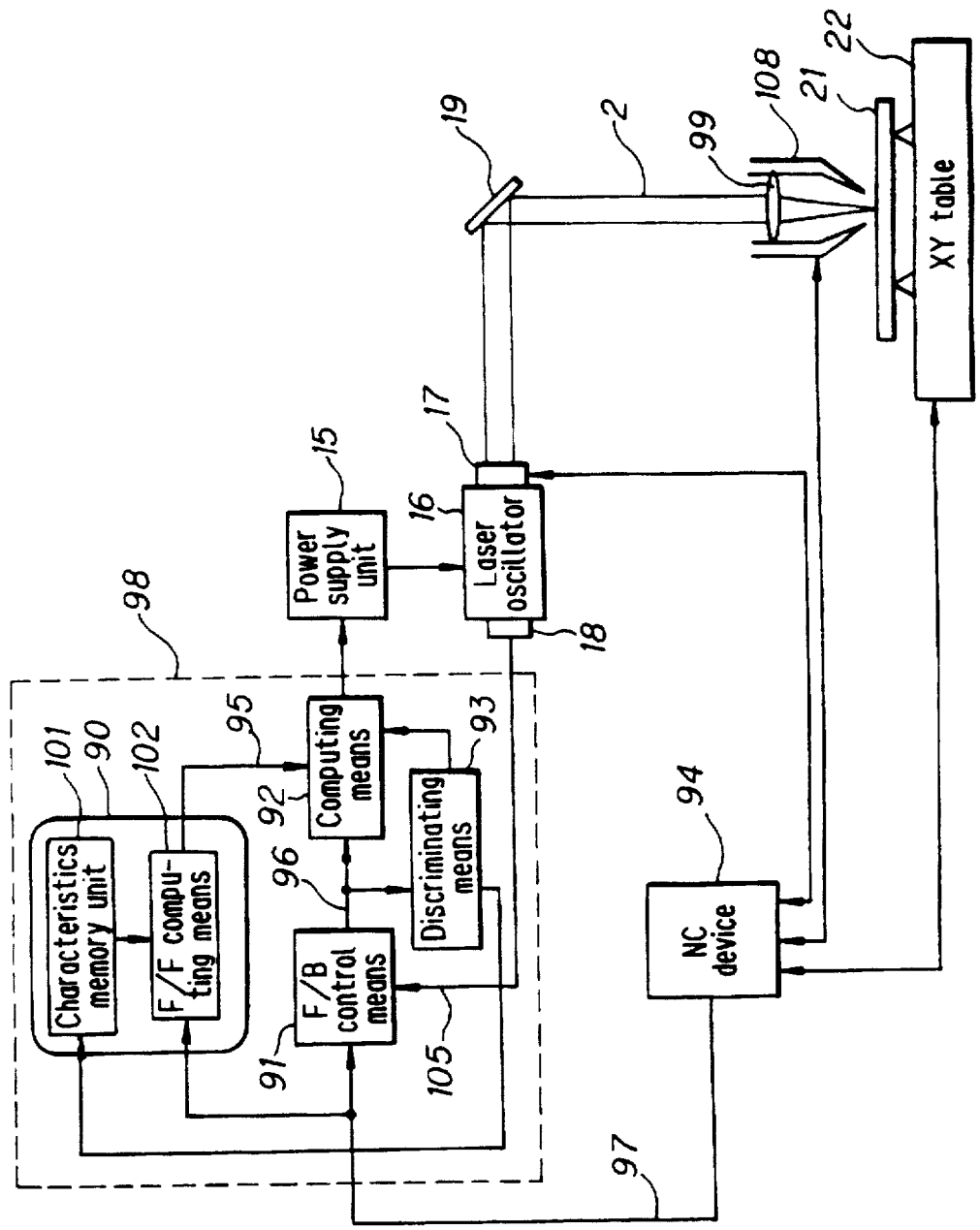
FIG. 50 is a block diagram illustrating configuration of a laser machining apparatus according to Embodiment 2-5.

Next description is made for Embodiment 2-5. FIG. 50 is a block diagram illustrating configuration of a laser machining apparatus according to Embodiment 2-5. The difference from the laser machining apparatus shown in FIG. 64 is that there are provided a computing means 92 for changing a value of the output signal 95 from the F/F control means 90 and a discriminating means 93.

Figure 51:
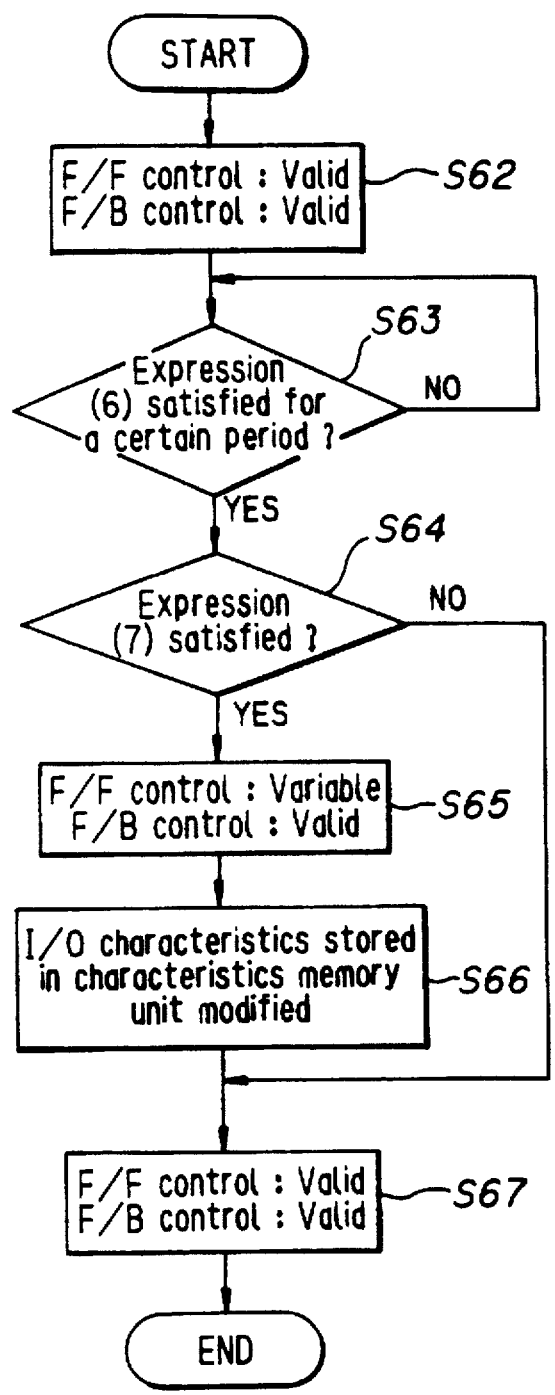
FIG. 51 is a flow chart illustrating a processing according to Embodiment 2-5.

Next description is made for operations thereof. FIG. 51 is a flow chart illustrating operations of the laser machining apparatus shown in FIG. 50. In step 62, control using both the F/F control and F/B control is executed, and whether a value of the output signal 96 from the F/B control means indicates the normal state (a state where a change rate in a detected value is less than a specified value (=a) for a specified period of time), namely, where the expression (6A) below is satisfied for a specified period of time or not in step S63 is checked.

$$\left|\frac{d\,Ier}{dt}\right| \leq a \quad (6A)$$

As a result, if it is determined that the expression (6A) is satisfied, then whether the absolute value is more than a specified percentage (=b) against a value (=Wa) of the laser output command signal 97 or not, namely, whether the following expression (7A) is satisfied or not in step S64 or not is checked.

$$\left|\frac{Ier}{Wa}\right| \geq b \quad (7A)$$

As a result, if it is determined that the expression (7A) above is satisfied, in step S65, a value of the output signal 95 from the F/F control means 90 is changed according to command from the discriminating means 93, and in step S66 simultaneously the I/O characteristics is measured and modification of the I/O characteristics stored in the characteristics memory unit 101 is started. When modification of the I/O characteristics stored in the characteristics memory unit 101 is complete, in step S67 the output signal 95 from the F/F control means 90 is again returned to the original value, and control making both the F/F control and F/B control valid is executed.

With the features as described above, machining fault can be prevented by checking an estimation error in the F/F control before the operation for modification is complete.

[Embodiment 2-6]

Figure 52:
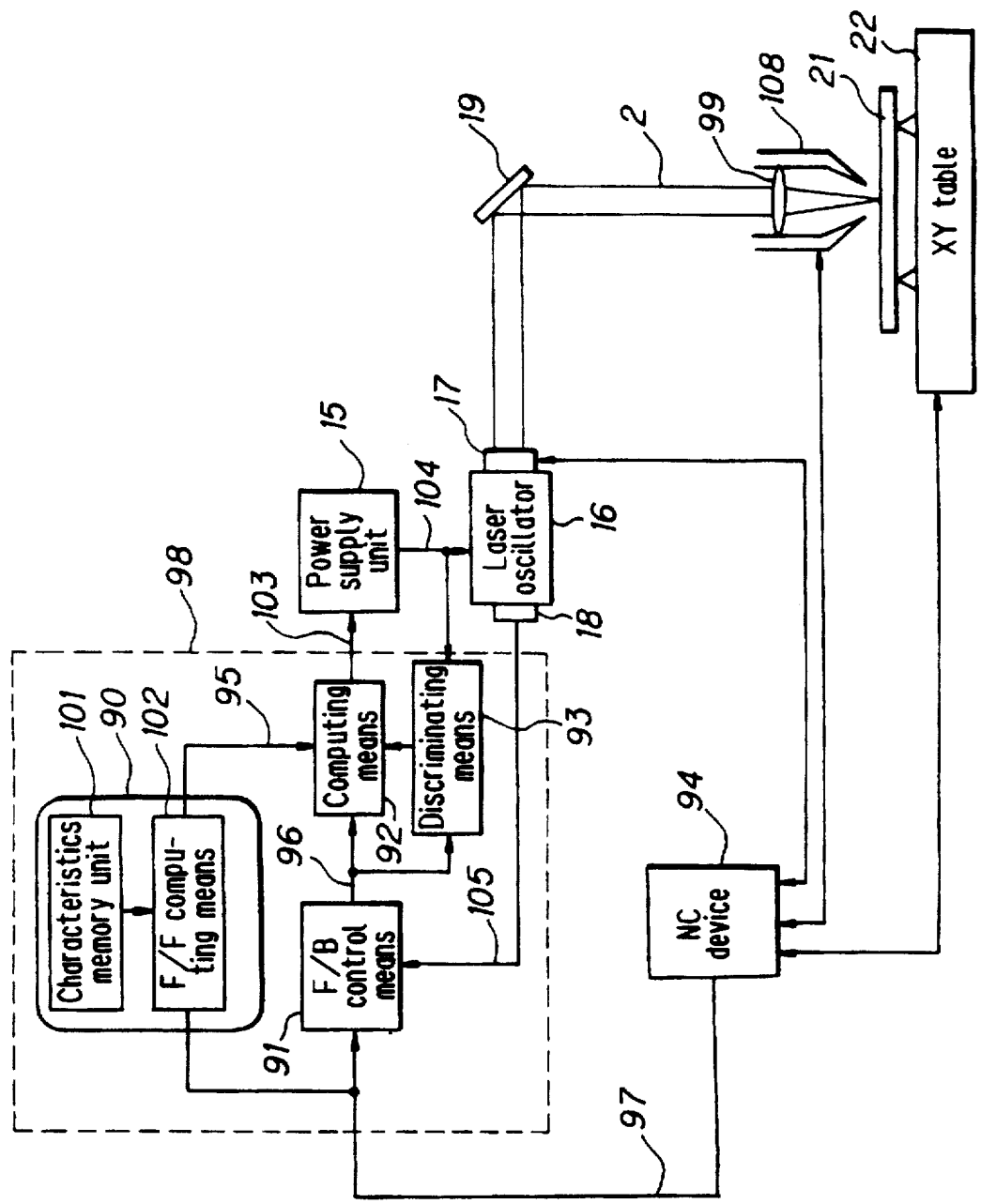
FIG. 52 is a block diagram illustrating configuration of a laser machining apparatus according to Embodiment 2-6.

Next description is made for embodiment 2-6. FIG. 52 is a block diagram illustrating configuration of a laser machining apparatus according to Embodiment 2-6. The difference from the laser machining apparatus shown in FIG. 64 is that there are provided a computing means 92 which can change a value of the output signal 95 from the F/F control means 90 and a discriminating means 93. For detecting a laser output and obtaining an overshoot rate or an undershoot rate, either a method using hardware or a method using software together with a microcomputer or the like may be used.

Overshoot or undershoot of a laser output is generated when an error is generated in the output signal 95 from the F/F control means 90, namely when the I/O characteristics stored in the characteristics memory unit 101 is different from the I/O characteristics of the actual oscillator 16, or when a time constant or a time delay for a filter in the F/B control means 91 is not optimal.

When an error is generated in the output signal 95 from the F/F control means 90, a value of the output signal 96 from the F/B control means 91 in its normal state becomes larger, and on the contrary, when an error is not generated, the value becomes zero or a small value. For this reason, when overshoot or undershoot in a laser output is generated, a determination can be made according to the value in the normal state of the output signal 96 from the F/B control means 91 as to whether the overshoot or undershoot was generated because a deviation was generated between the I/O characteristics stored in the characteristics memory unit 101 and the actual I/O characteristics of the laser oscillator 16 or because a time constant or a delay time for a filter in the F/B control means 91 is not optimal.

Figure 53:
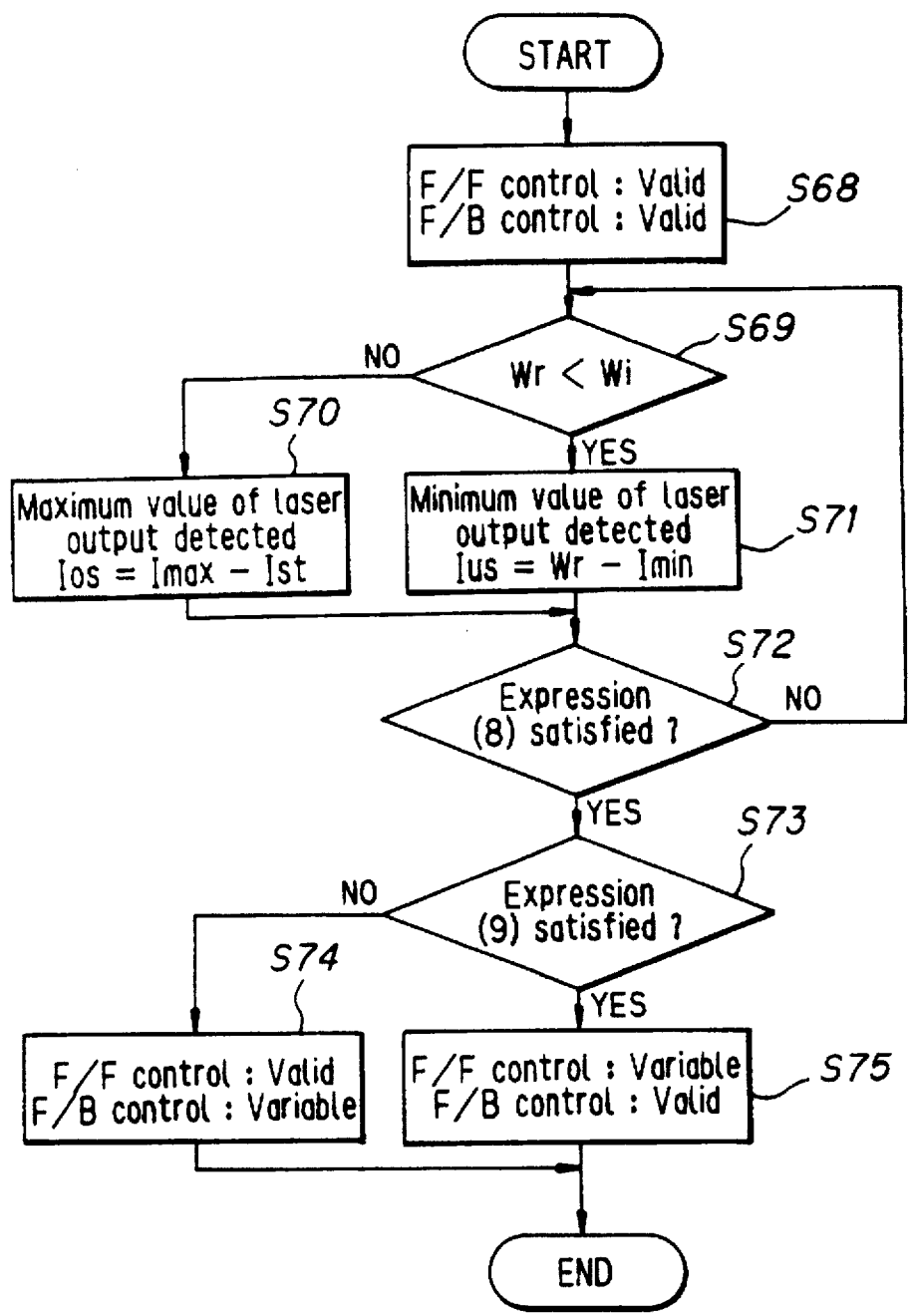
FIG. 53 is a flow chart illustrating a processing according to Embodiment 2-6.

Next description is made for operations thereof FIG. 53 is a flow chart illustrating operations of the laser machining apparatus shown in FIG. 52. Herein it is assumed that the overshoot rate or the undershoot rate described above is obtained by using software together with a microcomputer. For this reason, a detected value of laser output is converted to a digital signal by means of A/D conversion and is fetched into a microcomputer, and various types of digital processing are executed.

At first in step S68 control making both the F/F control and F/B control valid is executed, and then when a value of a laser output command signal 97 issued from the NC device 94 to the laser oscillator 16 changes in step S69, whether the command value after the change (Wr) is smaller than the value before the change (=Wi) is checked. Namely whether the following expression;

$$Wr<Wi$$

is satisfied or not is checked. If it is determined that Wr is not smaller than Wi, a maximum value (=Imax) of an output signal 104 from the power supply unit 15 is obtained, and the maximum value is stored in the characteristics memory unit 101.

Then a value (=1st) when a value of an output signal 104 from the power supply unit 15 is in the normal state (a state where a change rate of the output signal is less than specified value for a certain period of time) in the step S70 is stored, and a difference from the maximum value above is obtained. This difference is an overshoot value. Namely, $$Ios=Imax-Ist$$

is the overshoot rate.

In step S69 above, if it is determined that a value after change of a value of the laser output command signal 4 (=Wr) is smaller than a value before the change (=Wi), a minimum value (=Imin) of the output signal 104 from the power supply unit 15 is obtained, and the minimum value is stored in the characteristics memory unit 101.

Then in step S71, a value (=Ist) when a value of the output signal 104 from the power supply unit 15 is in the normal state (a change rate of the output signal is less than a specified value for a certain period of time) is stored, and a difference from the maximum value above is obtained. This difference is used as an undershoot rate. Namely, $$Ius=Ist-Imin$$

becomes an undershoot rate.

Whether a value of the overshoot rate or undershoot rate described above is higher than a rated percentage against a specified value (=Ist) of the output signal 104 from the power supply unit 15 or not, namely whether the expression (8A) below is satisfied or not in step S72 is checked.

$$\frac{Ios}{Ist} \geq d \text{ or } \frac{Ius}{Ist} \geq d \quad (8A)$$

If it is determined that the above expression (8A) is satisfied, then whether a value of an output signal 96 from the F/B control means 91 in its normal state (a state in which a change rate of a detected value is less than a specified value (=a) for a certain period of time) is more than a rated percentage (=b) against an output command value (=Wr) or not, namely, whether the following expression (9A) is satisfied or not in step 9 is checked. If it is determined that the above expression (9A) is satisfied, a value of the output signal 95 from the F/F control means 90 is changed according to a command from the discriminating means 93 in step S75.

$$\left|\frac{Ier}{Wa}\right| \geq b \quad (9A)$$

If it is determined that a value of a overshoot rate (=Ios) or under shoot rate (=Ius) is higher than a rated percentage against a value (=Ist) of an output signal from the power supply unit 15 and the above expression (8A) above is satisfied in step S23, and also that a value of the output signal 96 from said F/B control means 91 in its normal state (a state where a change rate of a detected value is less than a rated value (=a) for a certain period of time) is less than a rated percentage (=b) against an value (=Wr) of a laser output command signal, namely in the case indicated by the expression (10A) below, a value of the output signal 96 from the F/B control means 91 is changed according to a command from the discriminating means 93 in step S75.

$$\left| \frac{Ier}{Wa} \right| \leq b \tag{10A}$$

It should be noted that, although an overshoot rate or an undershoot rate of an output signal 104 from the power supply unit 15 is detected in this embodiment, the same effect can be obtained by checking an input signal 103 to the power supply unit 15 or an overshoot rate or an undershoot rate of an output signal 96 from the F/B control means 91.

With the features as described above, machining fault due to the fact that a filter for a feed back control means is not optimal can be prevented.

[Embodiment 2-7]

Figure 54:
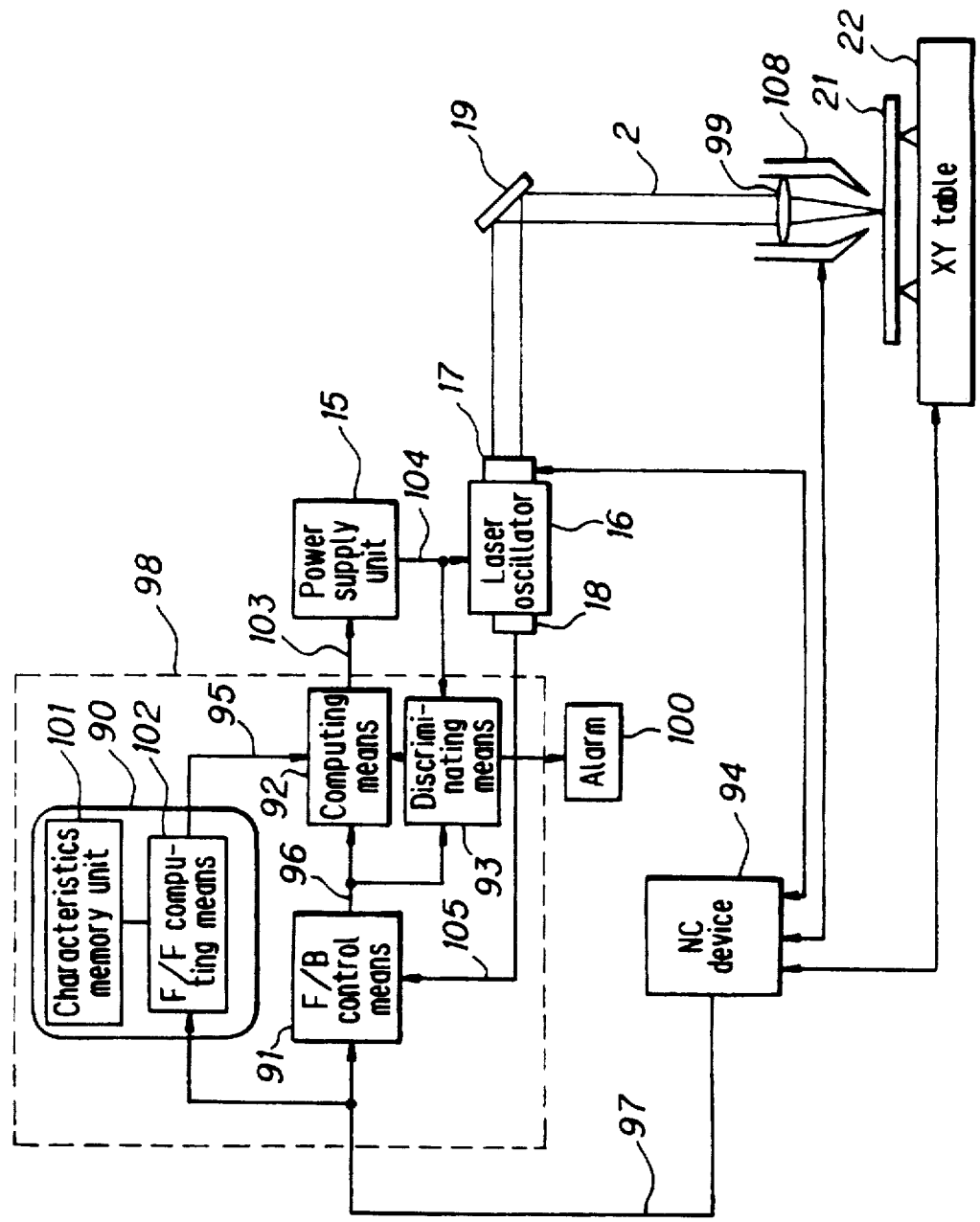
FIG. 54 is a block diagram illustrating configuration of a laser machining apparatus s according to Embodiment 2-7.

Next description is made for Embodiment 2-7. FIG. 54 is a block diagram illustrating configuration of a laser machining apparatus according to Embodiment 2-7. The difference from the laser machining apparatus according to Embodiment 2-6 above is that an abnormality displaying means 100 is provided therein.

In Embodiment 2-6 above, in a stage where a percentage of an overshoot rate or an undershoot rate against a specified value of an output signal 104 from the power supply unit 15 reaches a value at which a value of an output signal from the F/F control 90 or F/B control means 91 is changed, namely in the stage as indicated by the following expression (11A), an alarm is displayed by the abnormality displaying means 100 at a specific site in the laser machining apparatus. The specific site is the same as that in Embodiment 2-3.

$$\frac{Ios}{Ist} \geq d \text{ or } \frac{Ius}{Ist} \geq d \ (d' < d) \tag{11A}$$

With the features as described above, control making both F/F control and F/B control valid can be executed continuously.

[Embodiment 2-8]

Figure 55:
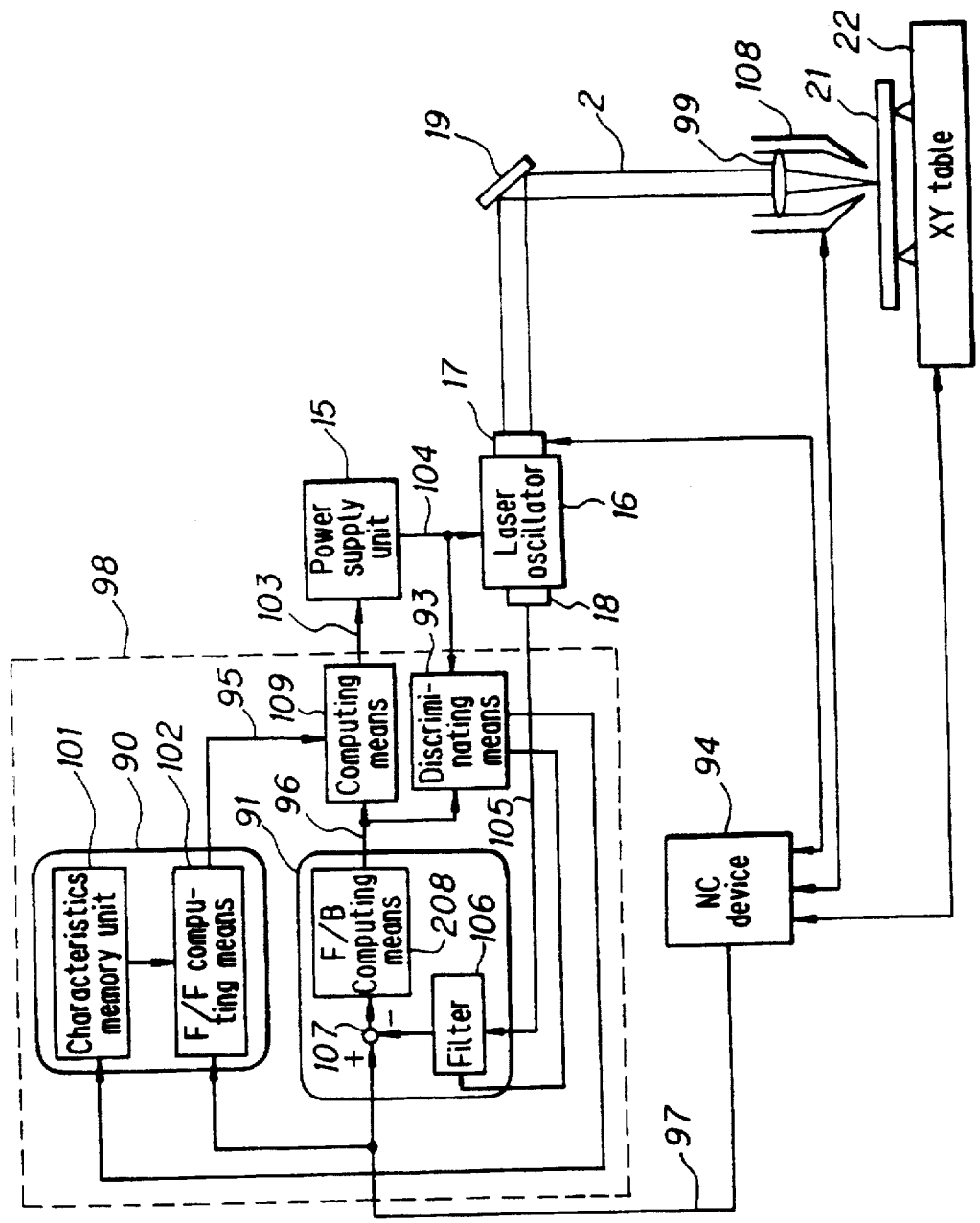
FIG. 55 is a block diagram illustrating configuration of a laser machining apparatus according to Embodiment 2-8.

Next description is made for Embodiment 2-8. FIG. 55 is a block diagram illustrating configuration of a laser machining apparatus according to Embodiment 2-8. The difference from the laser machining apparatus shown in FIG. 64 is that a discriminating means 93 is provided therein. Also as shown in this figure, the F/B control means 91 comprises a filter 106, a subtracter 107, and an F/B computing means 108.

Herein, to reduce an overshoot rate or an undershoot rate of a laser output, it is necessary to modify the I/O characteristics stored in the characteristics memory unit 101 in the F/F control means 90 or a time constant for the filter 106 for the F/B control means 91, or to modify a delay time in the filter 106.

Figure 56:
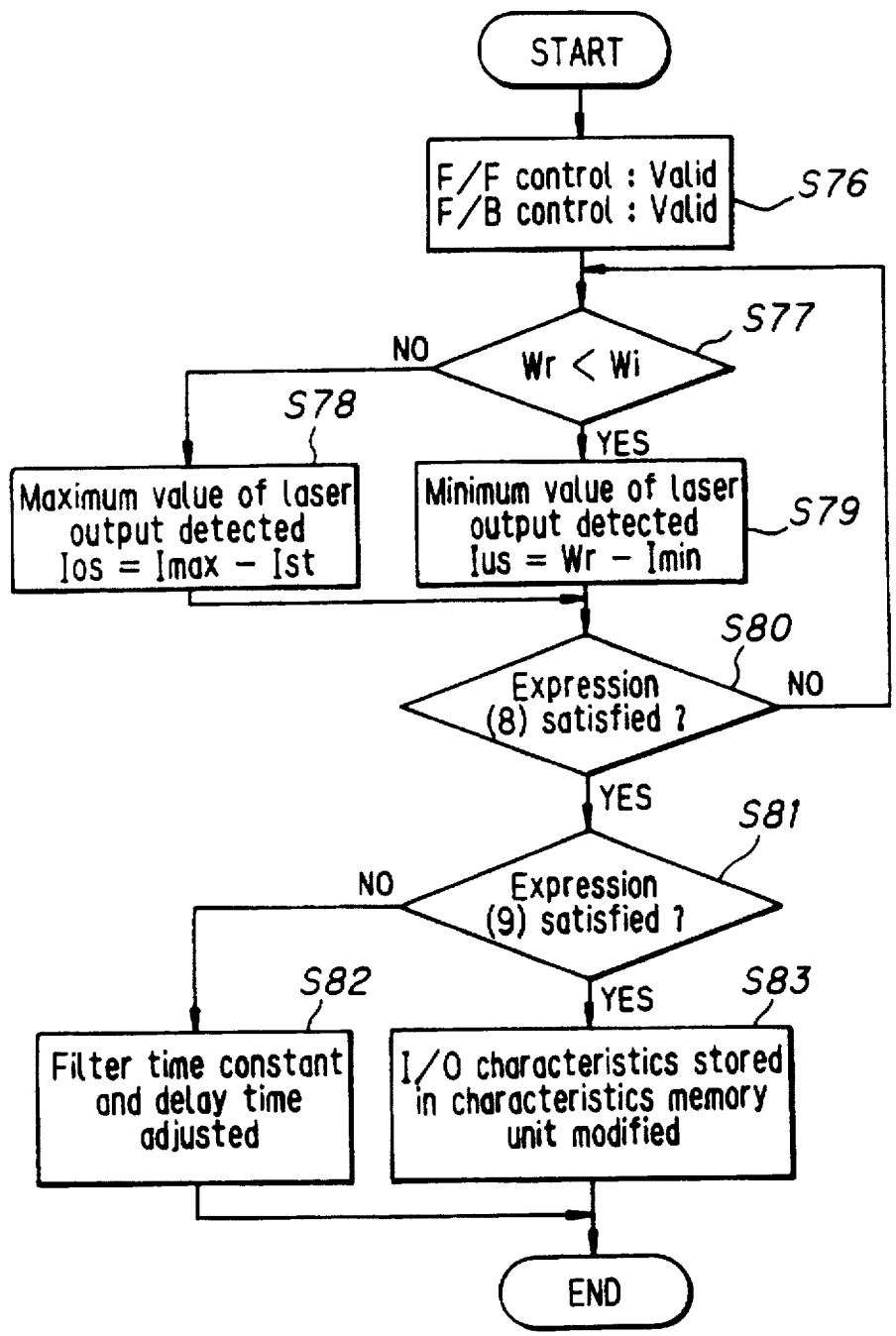
FIG. 56 is a flow chart illustrating a processing according to Embodiment 2-8 and Embodiment 2-9.

Next description is made for operations thereof. FIG. 56 is a flow chart illustrating operations of the laser machining apparatus shown in FIG. 55. It should be noted that, in this flow chart, the steps S76 to S79 are the same as steps S68 to S71 in the flow chart shown in FIG. 53 and description thereof is omitted herein.

Also a method of computing an overshoot rate or an undershoot rate of a laser output is the same as that in Embodiment 2-6 above. When it is determined that a value of the overshoot rate or undershoot rate is larger than a rated percentage against a value of an output signal from the power supply unit 15 in step S80 (as indicated by the expression (8A)) and also that a value of the output signal 95 from the F/F control means 90 in its normal state(a state where change rate of a detected value is less than a rated value for a certain period of time) in step S81 is higher than a rated percentage against the laser output command signal 4 (as indicated by the expression (9A)), the I/O characteristics is measured according to a command by the discriminating means 14 in step S83, and the I/O characteristics stored in the characteristics memory unit 101 is modified.

On the contrary, if it is determined that a value of the overshoot rate or undershoot rate above is higher than a rated percentage against a value of an output signal from the power supply unit 15 (as indicated by the expression (8A)) in step S80, and also that a value of the output signal 96 from the F/B control means 91 in the normal state (state where a change rate of a detected value is less than the rated percentage for a certain period of time) is less than a rated value against an output command value (as indicated by the expression (9A)), a modification of a time constant as well as of a delay time in the filter 106 for the F/B control means 91 is executed.

It should be noted that measurement of the I/O characteristics is executed during a machining process including piercing (penetrating a laser beam through a workpiece) or while machining is not being executed (while the shutter 17 of the laser oscillator 16 is closed).

With the features as described above, control making both the F/F control and feedback control valid can be executed continuously.

[Embodiment 2-9]

Next, a description is made for Embodiment 2-9. Configuration of the laser machining apparatus according to Embodiment 2-9 is the same as that in Embodiment 2-8 described above.

Figure 57:
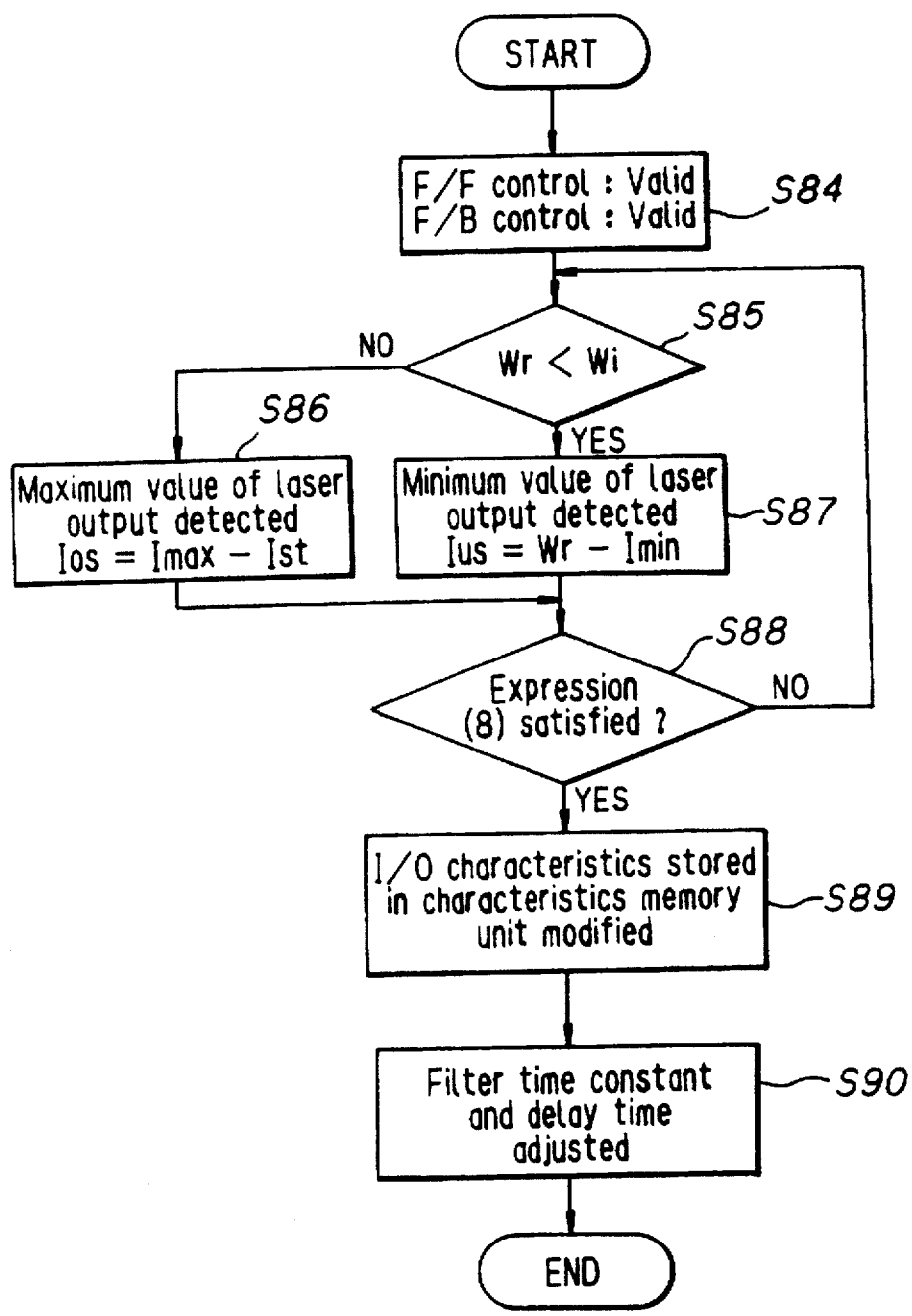
FIG. 57 is a flow chart illustrating a processing according to Embodiment 2-9.

Next, a description is made for operations thereof. FIG. 57 is a flow chart illustrating operations of the laser machining apparatus according to Embodiment 2-9. It should be noted that the steps S84 to S87 in this flow chart are the same as steps S76 to S79 in the flow chart shown in FIG. 56 and description thereof is omitted herein. Also a method of computing an overshoot rate or undershoot rate of a laser output is the same as that in Embodiment 2-6. When it is determined that a value of an overshoot rate or undershoot rate in step S88 is higher than a rated percentage against a value of the output signal 104 from the power supply unit 15, the I/O characteristics stored in the characteristics memory unit 101 is changed according to a command from the discriminating means 93 in step S89, and also a time constant and a delay time for the filter 106 for the F/B control means 91 are modified in step S90. The method of modifying is the same as that in Embodiment 2-8 above.

With the features described above, machining fault due to an estimation error in the F/F control means or machining fault due to the fact that a filter form the feed back means is not optimal before a correcting operation is complete can be prevented.

[Embodiment 2-10]

Figure 58:
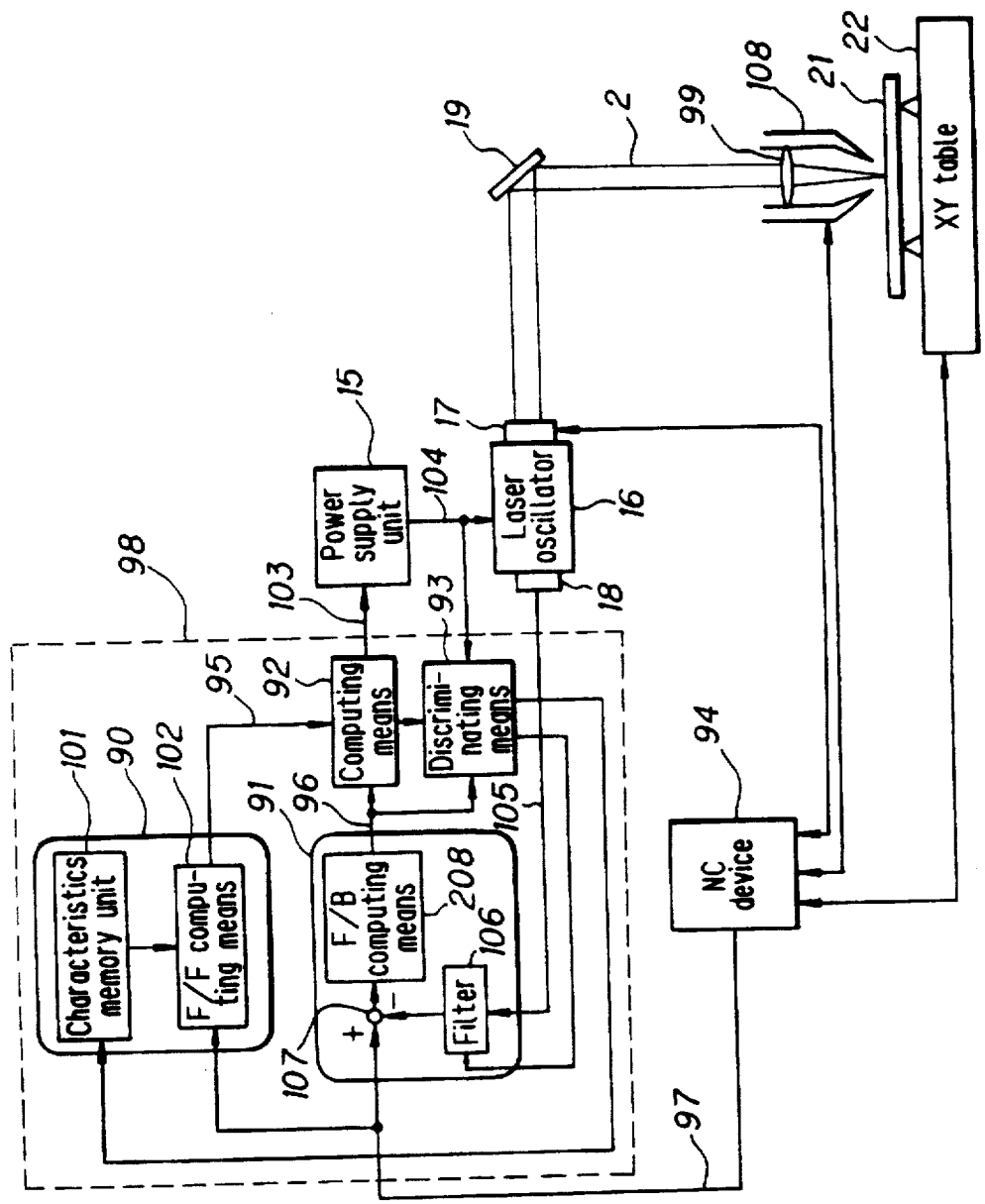
FIG. 58 is a block diagram illustrating configuration of a laser machining apparatus according to Embodiment 2-10.

Next description is made for Embodiment 2-10. Configuration of the laser machining apparatus according to Embodiment 2-10 is shown in FIG. 58. The difference from configuration of the laser machining apparatus shown in FIG. 64 is that the computing means 92 and discriminating means 93 for changing a value of the output signal 95 from the F/F control means 90 are provided therein.

Figure 59:
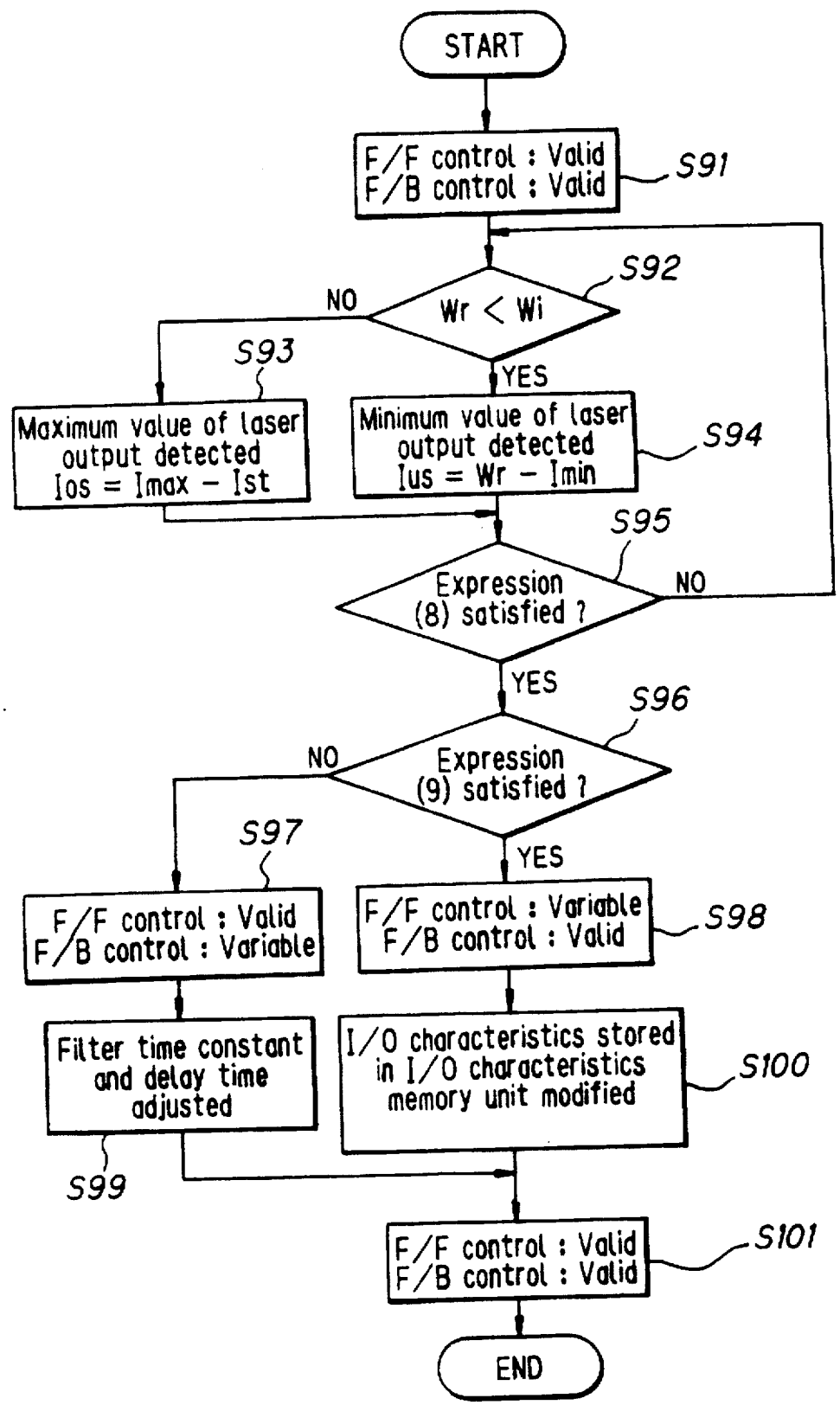
FIG. 59 is a flow chart illustrating a processing according to Embodiment 2-10.

Next description is made for operations thereof. FIG. 59 is a flow chart illustrating operations of the laser machining apparatus shown in FIG. 58. In this flow chart, the steps S91 to S94 are the same as the steps S84 to S87 shown in the flow chart shown in FIG. 57, and description thereof is omitted herein. A method of computing an overshoot rate or undershoot rate of a laser output is the same as that in Embodiment 2-6 described above. If it is determined that a value of an overshoot rate or an undershoot rate is higher than a rated percentage against a value of the output signal 104 from the power supply unit 15 (as indicated by the expression (8A)) in step S95, and also that a value of the output signal 96 from the F/B control means 91 in the normal state (a state where a change rate of a detected value is less than a rated value) is higher than a rated value (as indicated by the expression (9A)), a value of the output signal 95 from the F/F control means 90 is changed according to a command from the discriminating means 93 in step S98, and simultaneously modification of the I/O characteristics stored in the characteristics memory unit 101 is started. After modification of the I/O characteristics is finished, the output signal 95 from the F/F control means 90 is made valid in step S101, and control making both the F/F control and F/B control valid is executed.

On the contrary, when it is determined that a value of an overshoot rate or an undershoot rate is higher than a rated percentage against a value of the output signal 104 from the power supply unit 15 (as indicated by the expression (8A)) and also that a value of an output signal from the F/B control means 91 in its normal state (a state where a change rate of a detected value is less than a rated value) is less than a rated value (as indicated by the expression (9A)), a value of the output signal 96 from the F/B control means 91 is changed according to a command from the discriminating means 14 in step S97, and simultaneously modification of a time constant and a delay time for a filter is started in step S99. When modification of a time constant and a delay time for a filter is complete, an output signal from the F/B control means 91 is made valid in step S101, and control making both the F/F control and F/B control valid is executed.

[Embodiment 2-11]

Next description is made for Embodiment 2-11. General configuration of the laser machining apparatus is the same as that in Embodiment 2-1.

Figure 60:
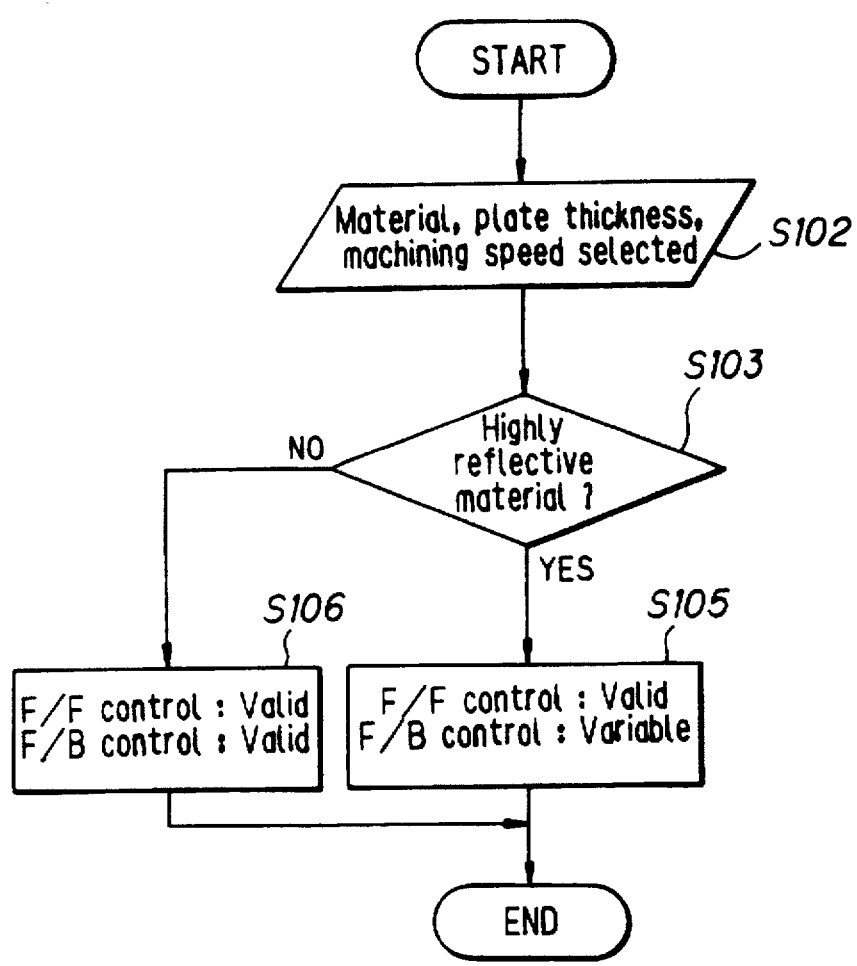
FIG. 60 is a flow chart illustrating a processing according to Embodiment 2-11.

Next description is made for operations thereof with reference to the flow chart shown in FIG. 60. In step S102, before execution of machining with a laser machining apparatus, an operator selects and inputs such data as material, a plate thickness, a machining speed, and a machining form into the NC unit 94. The NC unit 94 selects optimal machining conditions and laser machining is executed. Data of highly reflective materials each well reflecting a laser beam are previously registered in the NC unit 94, whether any of these material is specified in the NC unit 34 by the operator or not, namely whether the material is highly reflective one or not is checked in step S103, and if it is determined in step S103 that the material is highly reflective one, the output signal 96 from the F/B control means 91 is changed according to a command from the discriminating means 93 in step S105. On the contrary, if it is determined that the material specified by an operator is not a highly reflective one registered in the NC unit 94 previously, control making both the F/F control and F/B control valid is executed in step S104.

With the features as described above, decreases of a laser output or machining fault due to a reflected light from a highly reflective material can be prevented.

[Embodiment 2-12]

Figure 61:
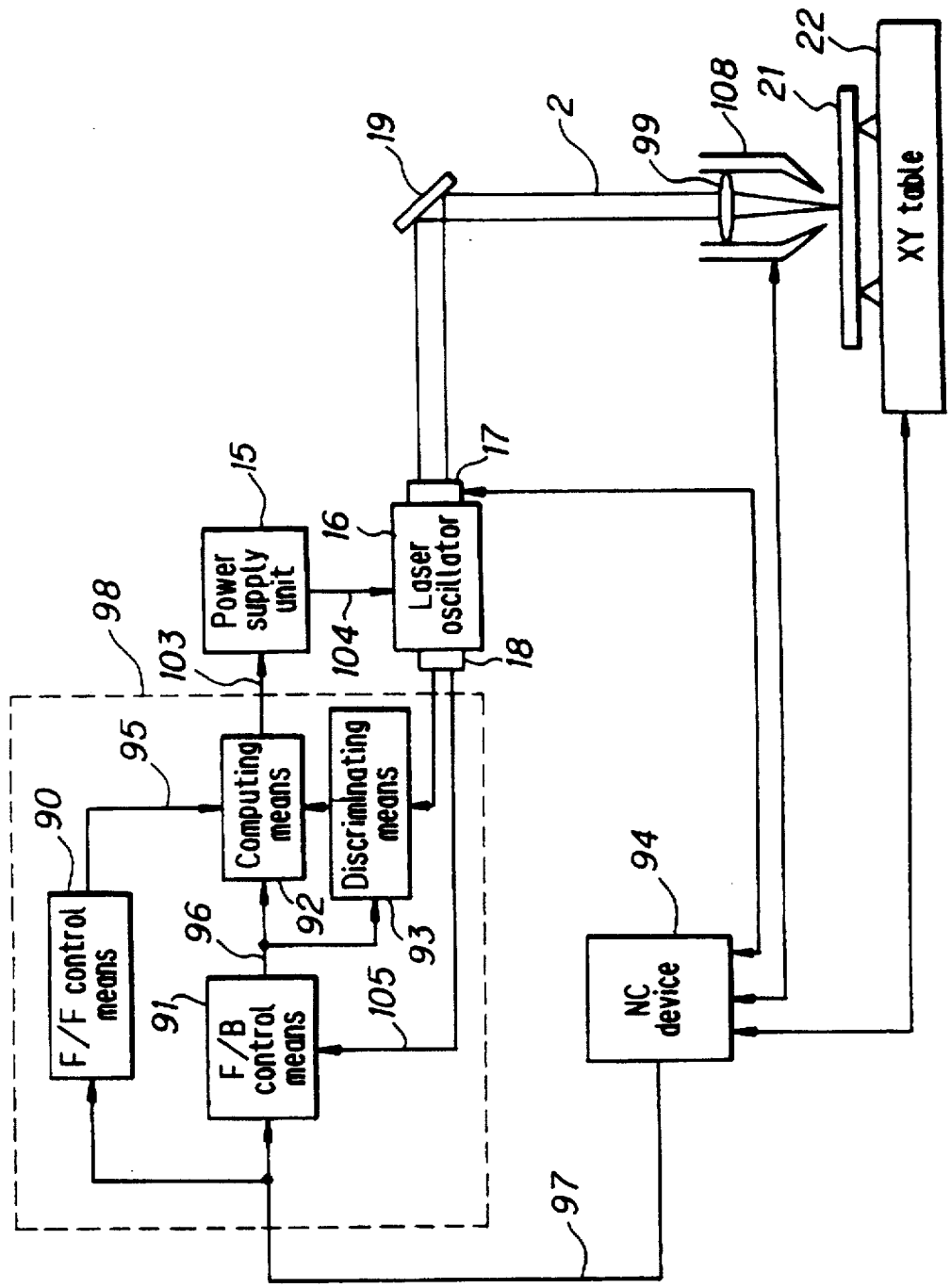
FIG. 61 is a block diagram illustrating configuration of a laser machining apparatus according to Embodiment 2-12.

Next description is made for Embodiment 2-12. FIG. 61 is a block diagram illustrating configuration of the laser machining apparatus according to the Embodiment 2-12. The difference from the laser machining apparatus shown in FIG. 64 is that the computing means 92 and the discriminating means 93 are provided. In Embodiment 2-11 described above, data of highly reflective materials is previously registered in the NC unit 94, and an output signal from the F/B control means 91 is changed when any of these registered materials is selected, but in this embodiment the processing sequence up to immediately after start of machining is the same as that in Embodiment 2-11 above, but a reflected light from a workpiece is measured immediately after start of machining, and an output signal from the F/B control means 91 is changed according to the intensity, thus correction of an output by the F/B control being enabled.

Figure 62:
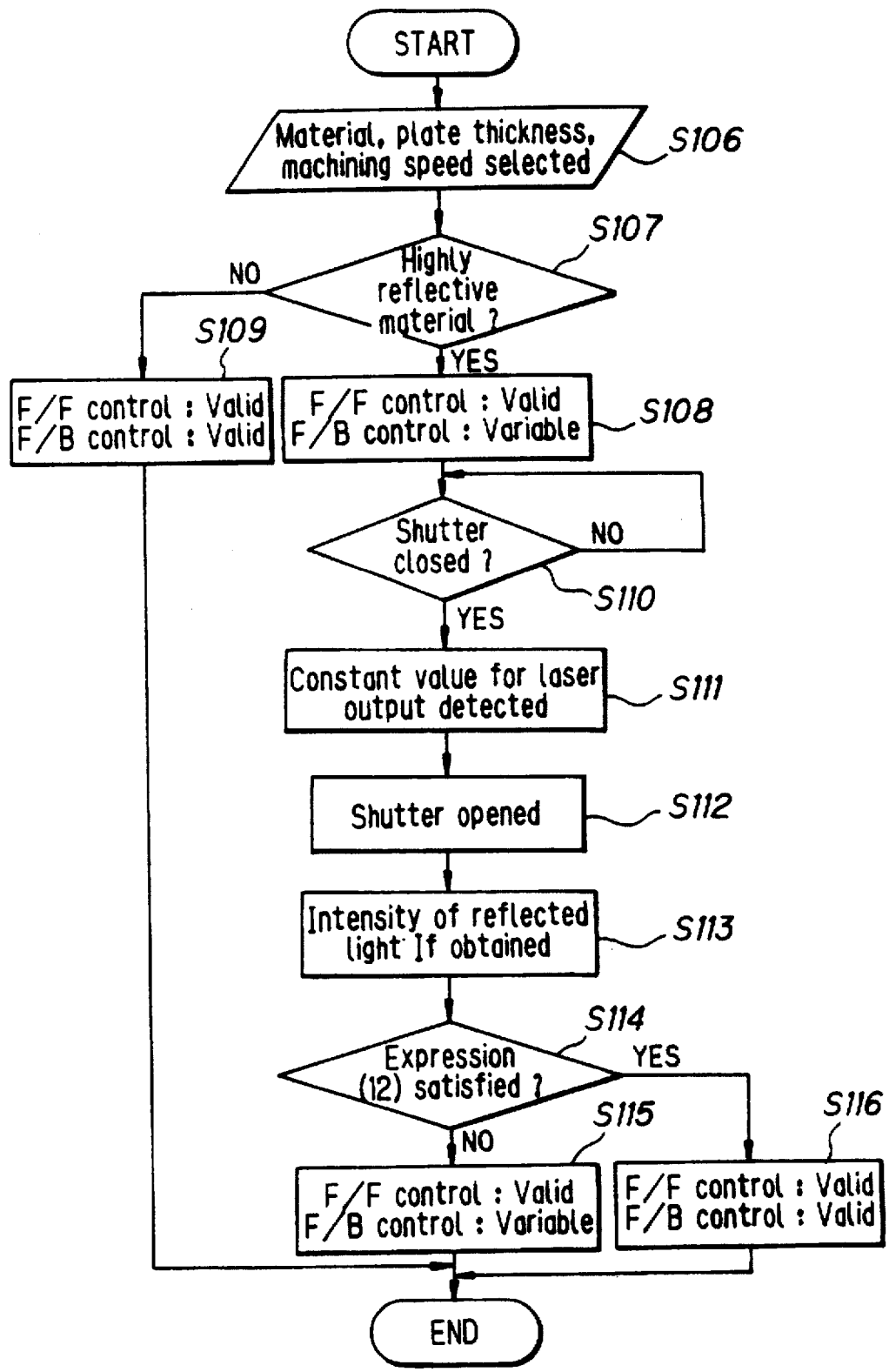
FIG. 62 is a flow chart illustrating a processing according to Embodiment 2-12.

Next description is made for operations thereof with reference to the flow chart shown in FIG. 62. In step S106, before execution of machining with a laser machining apparatus, an operator selects and inputs such data as material, a plate thickness, a machining speed, and a machining form into the NC unit 94. The NC unit 94 selects optimal machining conditions and laser machining is executed. Data of highly reflective materials each well reflecting a laser beam are previously registered in the NC unit 94, whether any of these material is specified in the NC unit 34 by the operator or not, namely, whether the material is highly reflective one or not is checked in step S107, and if it is determined in step S108 that the material is highly reflective one, the output signal 96 from the F/B control means 91 is changed according to a command from the discriminating means 14 in step S108. On the contrary, if it is determined that the material specified by an operator is not a highly reflective one registered in the NC unit 94 previously, control making both the F/F control and F/B control valid is executed in step S109.

After the step S108 above is executed, whether the shutter 17 of laser oscillator 16 before start of machining is closed or not is checked in step S110, and if it is determined that the shutter 17 is closed, a laser beam is outputted in the same laser oscillation form (continuous wave or pulse) as and according to a pulse frequency, a duty ratio, and a value of the laser output command signal 97 as those just after start of machining in step S111, and a value of an output signal 105 from the power sensor 18 established to a constant level (=Ic) is stored. If a microcomputer is used, the value of this output signal is fetched into the microcomputer by means of A/D conversion and stored in a memory unit. Then, by opening the shutter 17 in step S112 (a state where the shutter 17 has been opened and a laser beam 2 has reached the workpiece 21), in step S113 an output signal (=Id) from the power sensor 18 under the same conditions as those described above including a laser oscillation output from (continuous wave or pulse), a pulse frequency, a duty ratio, and a laser output command value is fetched through A/D conversion into a microcomputer, and the value in the normal state is compared to a value of the output signal 105 from the power sensor 18 before start of the machining to obtain a difference. The difference, namely an intensity of the reflected light (=If) is obtained through the following expression;

$$If = Ic - Id$$

Then, whether the difference is more than a rated percentage (=e) against the output command value (=Wr) or not, namely whether the following expression (12A) is satisfied or not is checked in step S115, and if it is determined that the expression (12A) is satisfied, in step S115 machining is continued under the state (when an output signal from the F/B control means 91 is changed while an output signal from the F/F control means 90 is valid). On the other hand, if it is determined that the difference is less than a rated percentage against the output command value, in step S116 an intensity of the reflected light is small, so that an output signal from the F/B control means 91 is made valid and also a correction of output by the F/B control is also made valid.

$$\frac{If}{Wr} \geq e \quad (12A)$$

[Embodiment 2-13]

Figure 63:
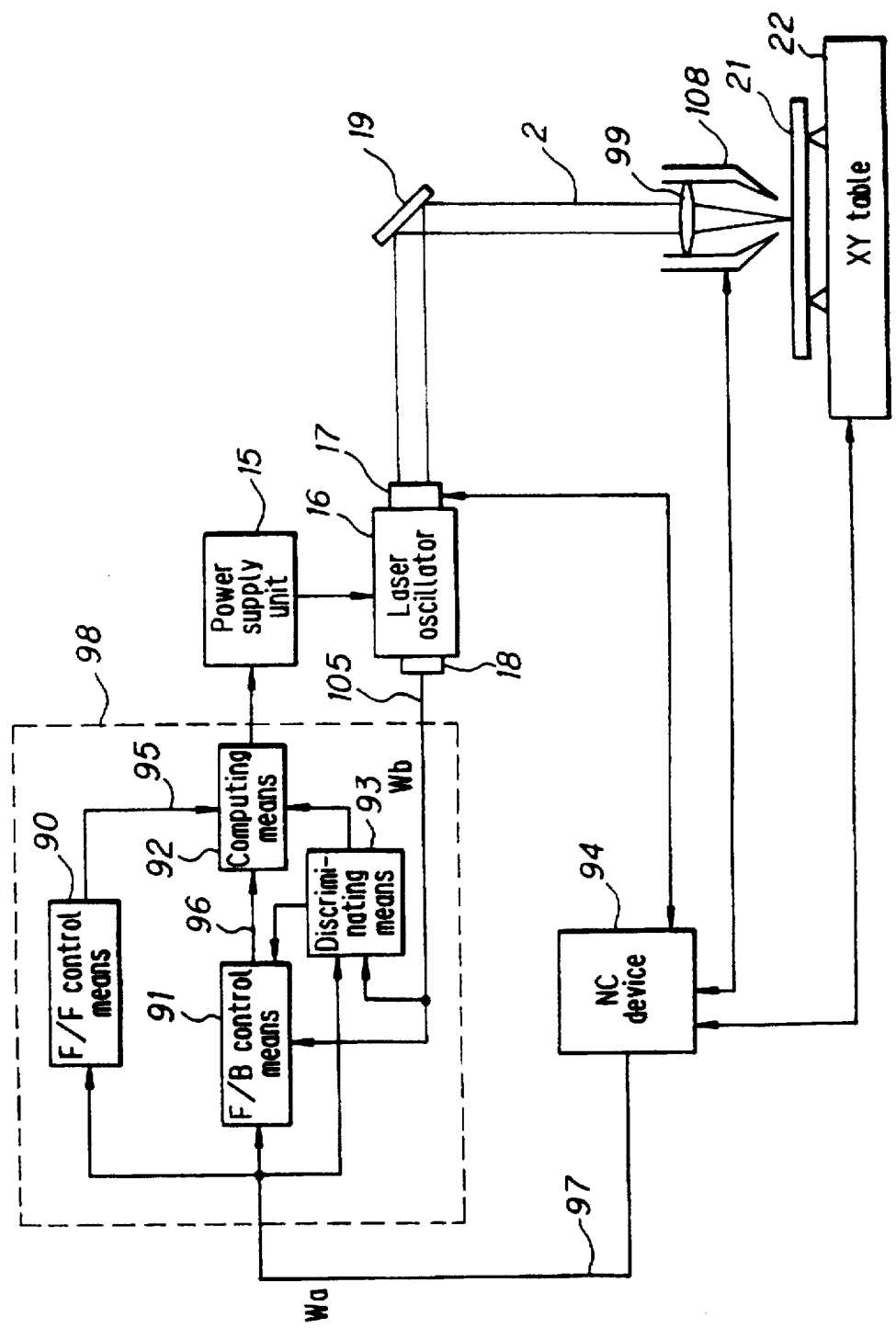
FIG. 63 is a block diagram illustrating configuration of a laser machining apparatus according to Embodiment 2-13 of the present invention.
Figure 68:
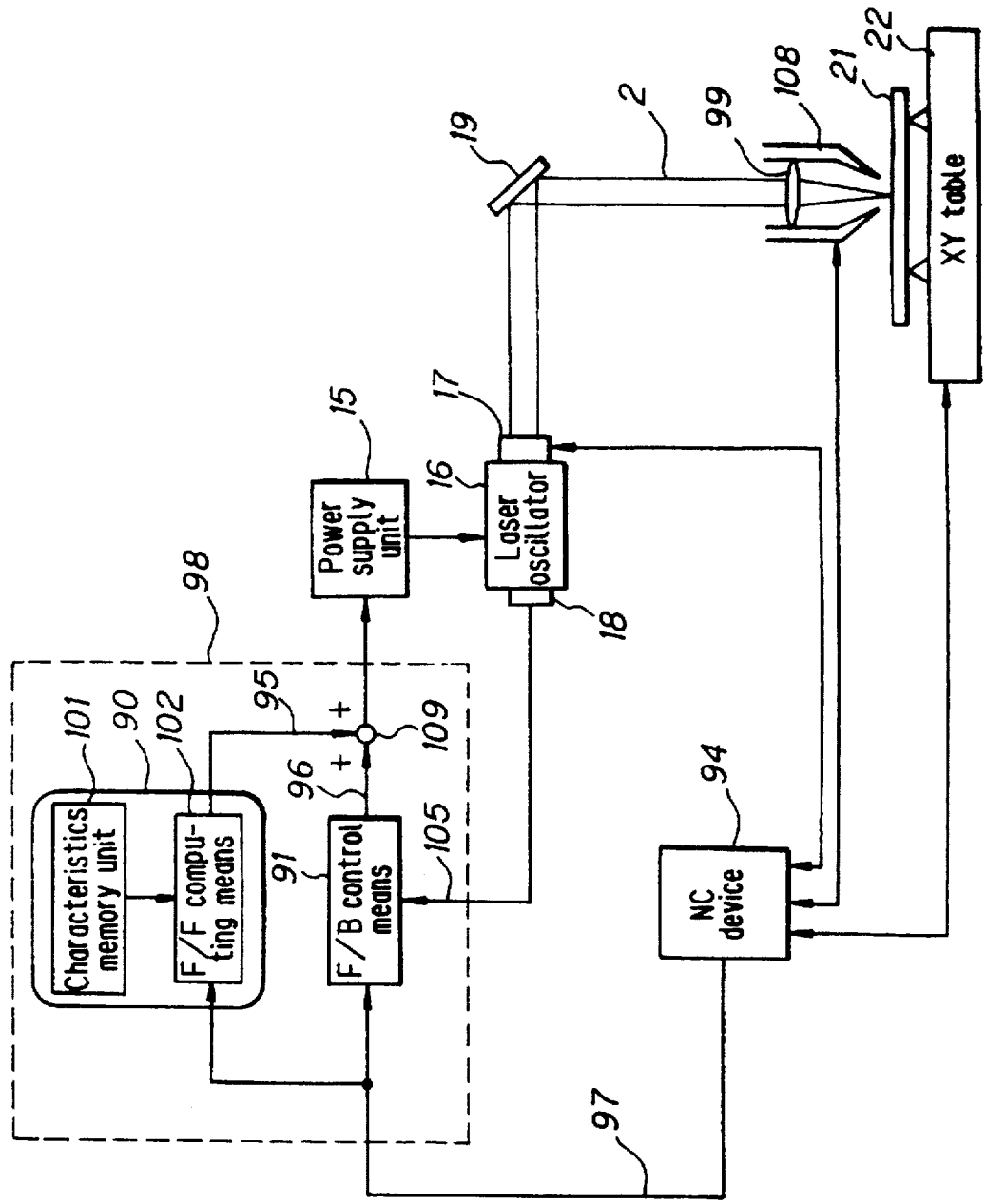
FIG. 68 is a block diagram illustrating general configuration of a conventional type of laser machining apparatus relating to Embodiment 2.
Figure 69:
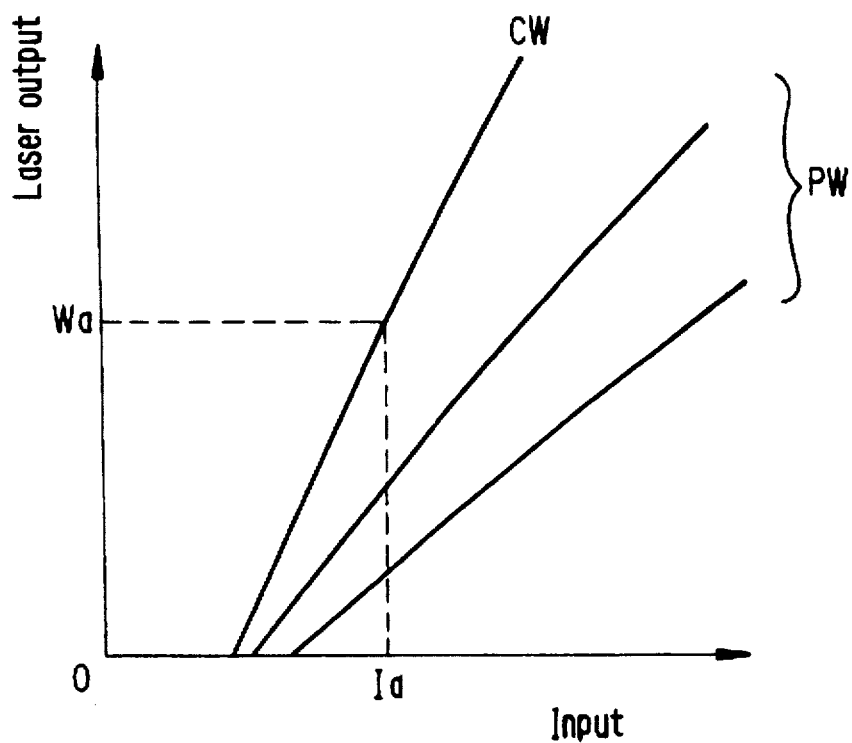
FIG. 69 is a graph showing the I/O characteristics of a laser oscillator in a conventional type of laser machining apparatus relating to Embodiment 2.

Detailed description is made hereinafter for embodiments of the laser machining apparatus as well as of control methods for the same according to the present invention with reference to the related drawings. At first, description is made for Embodiment 2-13 of the present invention. Configuration of the laser machining apparatus according to Embodiment 2-13 is shown in FIG. 63. Difference of this configuration from that of the conventional type of apparatus shown in FIG. 68 is that there are provided a computing means 92 which can change a value of an output signal 96 from the F/B control means 91 and a determining means 14 which receives an output from a power sensor 18 as well as an output from an NC device 94 to execute specified determination processing and outputs a result of determination to the feedback control means 91 and to the computing means 92.

In this embodiment, a value of an output signal 96 from the F/B control means 91 is controlled according to an output instruction value 97 from the NC device 94 and a value of an output signal 105 from the power sensor 18 which is a laser output detector. In a case where there is a function for limiting an electric current outside the output control means 98, for instance, in an output section of the power supply source 15, if an electric current supplied to the laser oscillator 16 is limited by this function, a constant difference is generated between an output instruction value 97 and an output signal 105 from the power sensor 18. According to this constant difference between the output instruction value 97 and the output signal 105 from the power sensor 18, an enabled state of the external limiting function is detected, and a value of the output instruction signal 96 from the F/B control means 91 is made invalid.

Next, a description is made for operations thereof. FIG. 64 is a flow chart illustrating operations in this embodiment, and at first in control using both a F/F control and a F/B control (S117), determination is made as to whether or not a value of difference between the output instruction value 97 (=Wa) and an output signal 105 (=Wb) from the power sensor 18 is more than a specified value (=α) for a certain period of time (S118), namely whether the following expression (13A) is satisfied or not.

$$\left| \frac{Wa - Wb}{Wa} \right| \geq \alpha \quad (13A)$$

As a result, if it is determined that the above expression (13A) is satisfied, a value of is the output signal 96 from the F/B control means 91 is made invalid by the computing means 92 according to an instruction from the determining means 93 (S119), and then operations of the F/B control means 91 are stopped (S120). On the contrary, in step S118, if the expression (13A) is not satisfied, the operation sequence is terminated.

[Embodiment 2-14]

Figure 65:
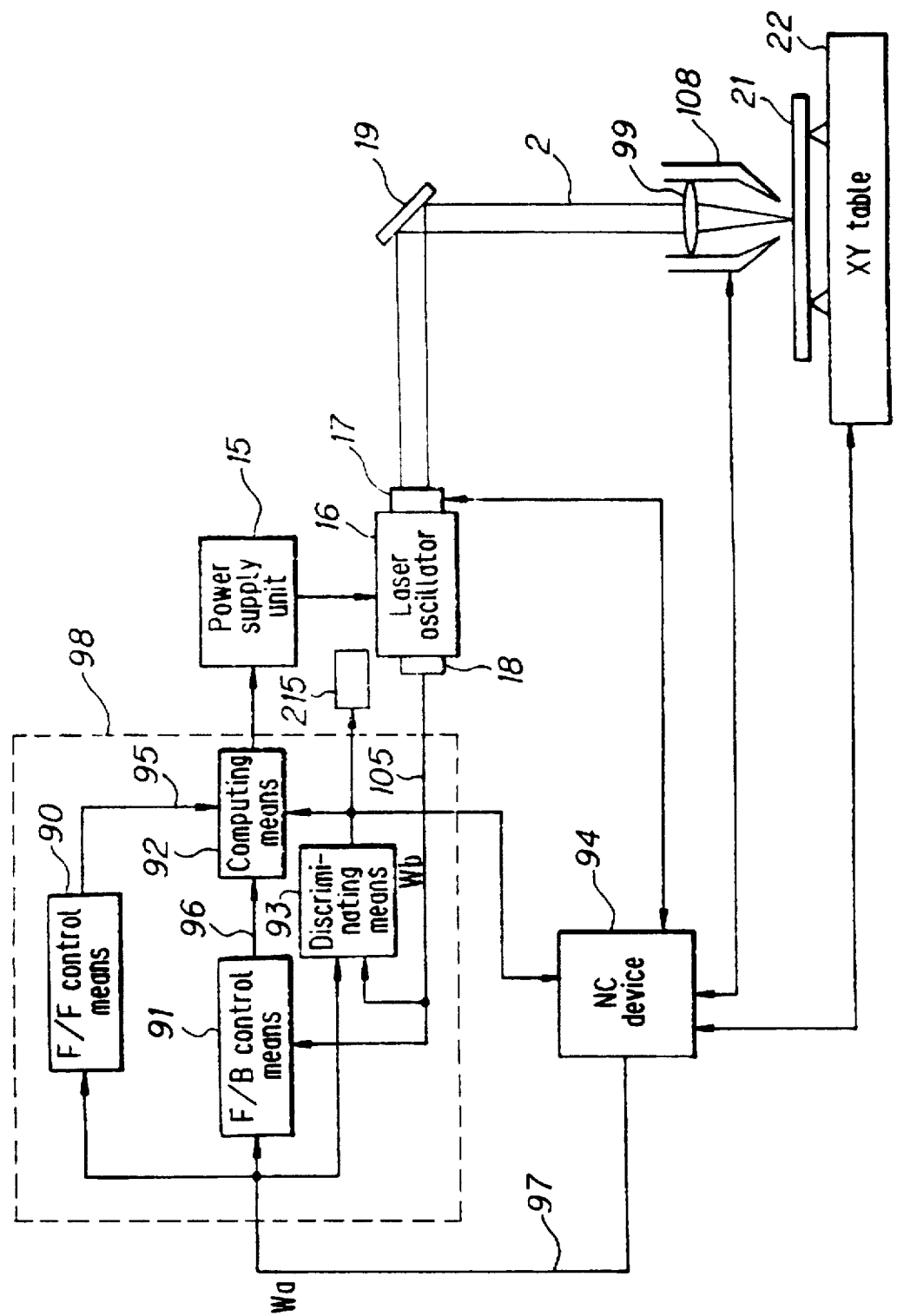
FIG. 65 is a block diagram illustrating configuration of a laser machining apparatus according to Embodiment 2-14 of the present invention.

Next, a description is made for Embodiment 2-14 of the present invention. Configuration of the laser machining apparatus according to Embodiment 2-14 is shown in FIG. 65. Difference of the configuration from that of the conventional type of apparatus shown in FIG. 68 is that there are provided the determining means 93 and the abnormal state display means 215.

In this embodiment, an alarm indicator is lit and/or control is stopped according to the output instruction value 97 and an output signal 105 from the power sensor 18. When any abnormality occurs in the laser oscillator 17, if, for instance, a mirror constituting the laser oscillator is broken, laser power remarkably drops, and a value provided by the power sensor 18 becomes almost zero. An abnormal state in the laser oscillator 16 is detected according to a value of difference between a value of the output signal 105 from this power sensor 18, namely the output instruction value 97 herein and the output signal 105 from the power sensor 18, and an alarm is lit by the abnormal state display means 215, and/or control thereof is stopped.

Figure 66:
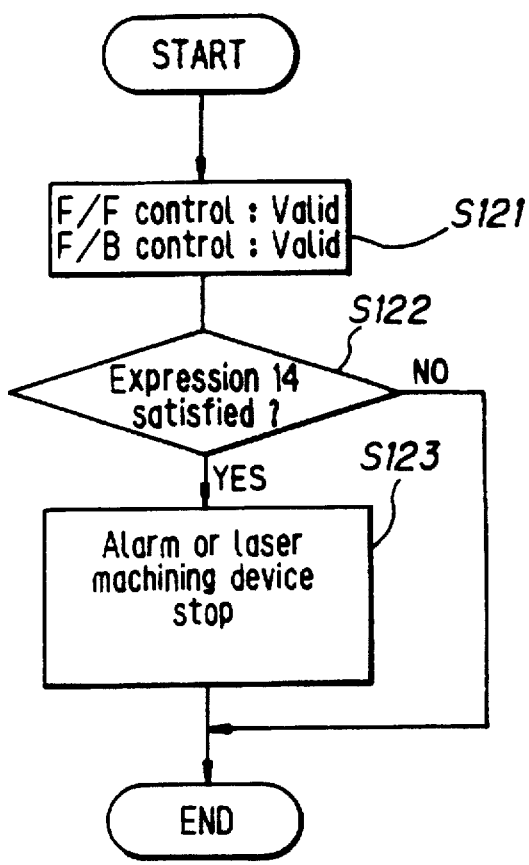
FIG. 66 is a flow chart of processing according to Embodiment 2-14.
Figure 67:
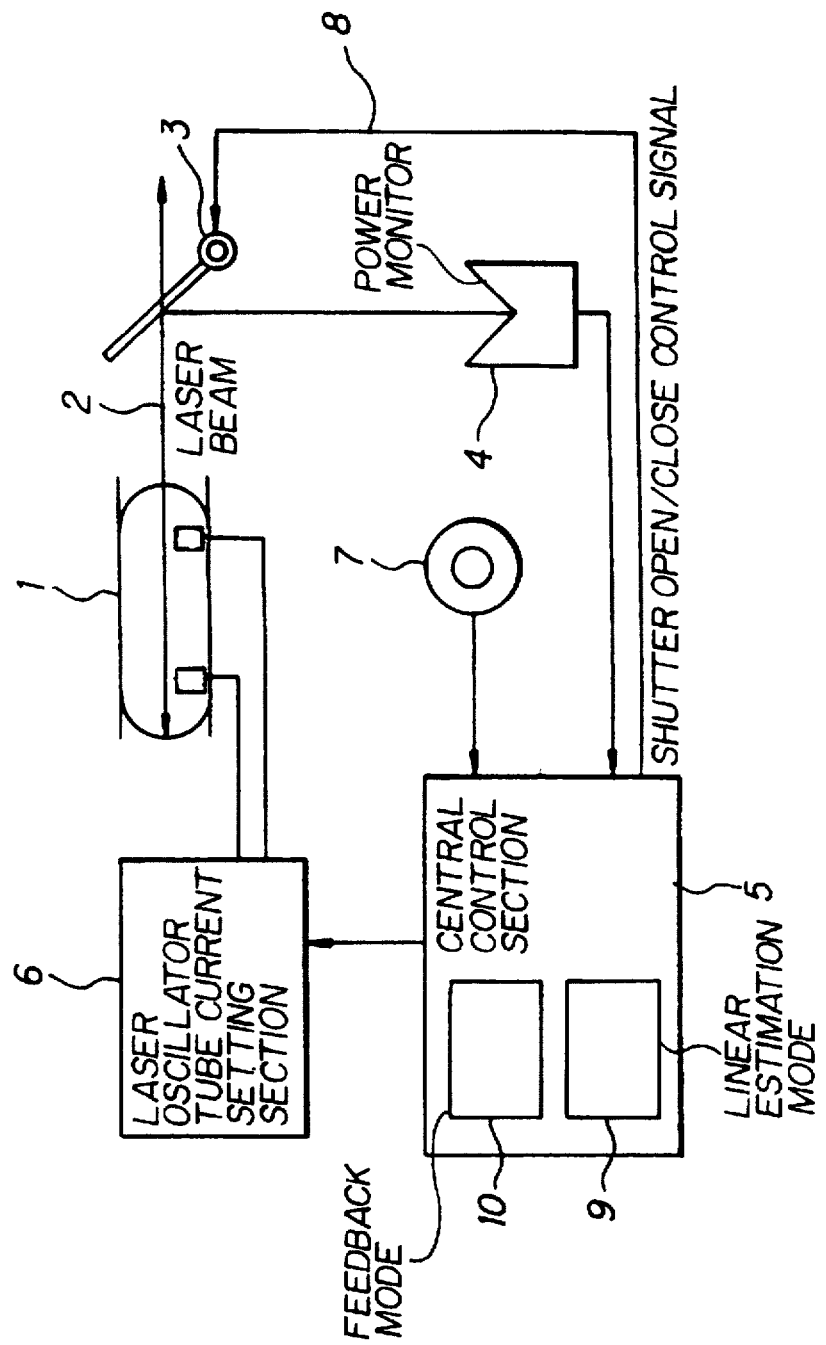
FIG. 67 is a block diagram illustrating configuration of a conventional type of laser power control apparatus relating to Embodiment 1.

Next, a description is made for operations thereof. FIG. 66 is a flow chart illustrating operations in this embodiment, and at first in control using both a F/F control and a F/B control (S121), determination is made as to whether or not a value of difference between the output instruction value 97 (=Wa) and the output signal 105 (=Wb) from the power sensor 18 is more than a specified value (=β) for a certain period of time (S122), namely whether the following expression (14A) is satisfied or not.

$$\left| \frac{Wa - Wb}{Wa} \right| \geq \beta \quad (14A)$$

As a result, if the above expression (14A) is satisfied, a particular section of the laser machining apparatus in the abnormal state display means 215 is indicated by generating an alarm there, and/or control is stopped. The particular section above may be any of a display screen of the NC device 94, the laser oscillator 16, or the XY table 22 on the condition that the section can visually be confirmed by an operator. On the contrary, in step 122, if it is determined that the above expression (14A) is not satisfied, the operation sequence is terminated.

As described above, in the laser machining apparatus according to the present invention, when a command value setting means sets at least one of a frequency or a duty ratio of a laser oscillator and a power, an input for the power supply unit is computed using a laser oscillator characteristics function describing characteristics of a laser oscillator having at least one of a frequency or a duty ratio as a parameter, so that an accurate input to a power supply unit can be obtained even in pulse mode.

In another laser machining apparatus according to the present invention, when a command value setting means sets at least one of a frequency or a duty ratio of a laser oscillator and a power, a first operation rate is computed from a power command value from the command value setting means and a power measurement value measured by a power sensor in the F/B control means. Also, a second operation rate is computed using outputs from a laser oscillator characteristics function describing means having at least one of a frequency or a duty ratio as a parameter as well as from the command setting means in the F/F control means. Furthermore, an input to the power supply unit are computed from the first operation rate and the second operation rate, so that an accurate input to a power supply unit can be obtained eve in pulse mode and at the same time a laser machining apparatus not having any constant power output error can be obtained.

In another laser machining apparatus according to the present invention, as an error in a feed forward control means is corrected by a feed forward correcting means, an accurate input to a power supply unit can always be obtained.

In another laser machining apparatus according to the present invention, as an error in a feed forward control means is corrected by a feed forward correcting means, an accurate input to a power supply unit can always be obtained.

In another laser machining apparatus according to the present invention, whether operation of the feed forward correcting means for correcting the feed forward control means is enabled or not is controlled by the correcting operation control means, so that control for a correcting operation can freely be selected.

In another laser machining apparatus according to the present invention, a command for a correcting operation is controlled according to the light reflected from a workpiece by the correcting operation control means, so that an accurate input to a power supply unit can be obtained even in a case where a quantity of light reflected from a workpiece is large.

In another laser machining apparatus according to the present invention, a command for a correcting operation is controlled according to an output from the F/B control means by the correcting operation control means, so that effect by reflected light can be reduced as much as possible, unnecessary correcting operations can be suppressed, and an accurate input to a power supply unit can be obtained.

In another laser machining apparatus according to the present invention, a command for a correcting operation is controlled at a certain time interval by the correcting operation control means, so that an accurate input to a power supply unit can be obtained even if characteristics of a gas changes.

In another laser machining apparatus according to the present invention, a command for a correcting operation is controlled by the correcting operation control means using a quantity of consumed energy in a laser oscillator, so that an accurate input to a power supply unit can be obtained even if characteristics of a gas changes.

In another laser machining apparatus according to the present invention, a command for a correcting operation is controlled by the correcting operation control means using a gas density or a gas temperature in the laser oscillator, so that an accurate input to a power supply unit can be obtained even if characteristics of a gas changes.

In another laser machining apparatus according to the present invention, a command for a correcting operation is controlled by the correcting operation control means using NC, so that an accurate input to a power supply unit can be obtained even if characteristics of a gas changes.

In another laser machining apparatus according to the present invention, a command for a correcting operation is controlled by the correcting operation control means according to material of a workpiece, so that an accurate input to a power supply can be obtained even if a workpiece is made of highly reflective material.

In another laser machining apparatus according to the present invention, a command for a correcting operation is controlled by the correcting operation control means immediately after gas exchange in the laser oscillator, so that an accurate input to a power supply unit can be obtained even immediately after gas exchange.

In another laser machining apparatus according to the present invention, a command for a correcting operation is controlled by the correcting operation control means just after power is turned ON, so that an accurate input to a power supply unit can be obtained even immediately after power supply is turned ON.

In another laser machining apparatus according to the present invention, whether correction by the feed forward correcting means is executed correctly or not is checked by an abnormality checking means, so that malfunction of the feed forward correcting means or an abnormal state in a laser oscillator can be detected.

In another laser machining apparatus according to the present invention, when the abnormality checking means determines that the state is abnormal, a command for exchange of gas in the laser oscillator is issued, so that a timing for gas exchange can easily and accurately be obtained.

In another laser machining apparatus according to the present invention, the state detected by the correcting operation control means or the abnormality checking means is displayed, so that generation of abnormal state can easily and timely be detected.

In another laser machining apparatus according to the present invention, an input to a power supply unit for a laser oscillator is computed using a laser oscillator characteristics function described by a first function describing means for converting, of discharged energy quantities received by a gas in a laser oscillator, an energy quantity approximate to energy contributing to a laser power to a current value at least at a oscillation limit of laser output, and a second function describing means for describing a relation between similarity in each frequency and duty ratio and a laser power, so that characteristics of a laser oscillator can be described with a small volume of data and an input computing for obtaining a desired laser power can easily be executed.

In another laser machining apparatus according to the present invention, an input to a power supply unit for a laser oscillator is computed using a laser oscillator characteristics function described by a first function describing means for converting, of discharged energy quantities received by a gas in a laser oscillator, an energy quantity approximate to energy contributing to a laser power to a current value at least at a oscillation limit of laser output, a characteristics correcting function describing means for correcting the similarity described above, and a second function describing means for describing a relation between the corrected similarity and a laser power, so that characteristics of a laser oscillator can be described with a small volume of data and also input computing for obtaining a desired laser power can easily be executed.

In another laser machining apparatus according to the present invention, feed forward correction is executed by adjusting a parameter indicating a current at an oscillation limit of laser output, so that modification of the laser oscillation characteristics can be executed very easily even if deterioration of a gas or change in gas temperature occurs, and power control can be carried out under good conditions.

In another laser machining apparatus according to the present invention, machining conditions under which an estimation error becomes larger during F/F control are previously registered in an NC unit, and an output signal from the F/F control means is changed according to a command from a discriminating means when these machining conditions are selected, so that machining fault due to an estimation error in F/F control can be prevented.

In another laser machining apparatus according to the present invention, by changing an output signal from an F/F control means according to a command from a discriminating means, machining fault due to an estimation error in F/F control can be prevented.

In another laser machining apparatus according to the present invention, an estimated error in F/F control is detected according to a value of an output from the F/B control means, and if it is determined that the value is higher than the specified value, an output signal from the F/F control means is changed, so that it is possible to prevent all workpieces from being affected by machining fault due to an estimation error in F/F control.

In another laser machining apparatus according to the present invention, in a stage before an output signal from an F/F control means is changed, an alarm is displayed to indicate to an operator that an estimation error has been generated in the F/F control, so that the operator can modify the I/O characteristics stored in a memory unit in the F/F control means and control making both the F/F control and F/B control valid can be executed continuously.

In the method of controlling a laser machining apparatus according to the present invention, when a value of an output signal from the F/B control means exceeds a specified value, an output signal from the F/F control means is changed, so that it is possible to prevent all workpieces from being affected by machining fault due to an estimation error in F/F control.

In another laser machining apparatus according to the present invention, an estimation error in F/F control is detected according to a value of an output signal from an F/B control means, and the I/O characteristics stored in a memory unit in the F/F control unit is modified when a value of an output signal from the F/B control means exceeds a specified value, so that the I/O characteristics stored in the memory unit in the F/F control means can be modified even when an operator is not present at the site, for instance, at night, and control making both the F/F control and F/B control valid can be executed continuously.

In another laser machining apparatus according to the present invention, an estimation error in F/F control is detected according to a value of an output signal from an F/B control means, the I/O characteristics stored in a memory unit in an F/F control means is modified when a value of an output signal from an F/B control means exceeds a specified value, and an output signal from the F/F control means is changed until this operation for correction is complete, so that control making both the F/F control and F/B control valid can be executed continuously, and also machining fault due to an estimation error in F/F control before the correcting operation is complete can be prevented.

In other method of controlling a laser machining apparatus according to the present invention, when a value of an output signal from an F/B control exceeds a specified value, the I/O characteristics stored in a memory unit in an F/F control means can be modified, so that, even when an operator is not present at the site, for instance, at night, the I/O characteristics stored in a memory unit in an F/F control means can be modified and control making both the F/F control and F/B control valid can be executed continuously.

In another laser machining apparatus according to the present invention, when a rate of overshoot or undershoot of a laser output exceeds a specified value, a determination is made according to a value of an output signal from F/B control means as to whether the overshoot or undershoot occurred because of an estimation error in an F/F control means or because a filter for the F/F control means is not optimal, and if it is determined that the overshoot or undershoot occurred due to an estimation error in the F/F control means, an output signal from the F/F control means is changed to raise a percentage of an output signal from the F/F control means, and on the other hand if it is determined that the overshoot or undershoot occurred because a filter for the F/F control means is not optimal, an output signal from the F/B control means is changed to raise a percentage of an output signal from the F/F control, so that it is possible to prevent machining fault due to the fact that a filter for the F/F control means is not optimal can be prevented.

In another laser machining apparatus according to the present invention, an alarm is displayed, before an output signal from an F/F control means is changed, to indicate to an operator that a filter for the F/F control means is not optimal, so that the operator can modify a filter for the F/B control means and control making both F/F control and F/B control valid can be executed continuously.

In the method of controlling a laser machining apparatus according to the present invention, when a value of overshoot or undershoot of a laser output exceeds a specified value, whether the overshoot or undershoot occurred due to an estimation error in the F/F control means or because a filter for the F/F control means is not optimal is checked according to a value of an output signal from F/B control means, and it is determined that the overshoot or undershoot occurred due to an estimation error in the F/F control means, an output signal from the F/F control means is changed to raise a ratio of an output signal from the F/F control means, and if it is determined that the overshoot or undershoot occurred because a filter for the F/F control means is not optimal, an output signal from the F/B control means is changed to raise a ratio of an output signal from the F/F control, so that machining fault due to the fact that a filter for the F/F control means is not optimal can be prevented.

In another laser machining apparatus according to the present invention, when a value of overshoot or undershoot of a laser output exceeds a specified value, whether the overshoot or undershoot occurred due to an estimation error in the F/F control means or because a filter for the F/F control means is not optimal is checked according to a value of an output signal from the F/B control means, and if it is determined that the overshoot or undershoot occurred due to an estimation error in the F/F control means, the I/O characteristics stored in a memory unit in the F/F control means is automatically modified, and if it is determined that the overshoot or undershoot occurred because a filter for the F/F control means is not optimal, a filter for the F/B control means is automatically modified, so that the I/O characteristics stored in a memory unit in the F/F control and a filter for the F/B control means can automatically be modified even when an operator is not present at the site, for instance, at night and control making both F/F control and F/B control valid can be executed continuously.

In another laser machining apparatus according to the present invention, when a rate of overshoot or undershoot of a laser output exceeds a specified value, a determination is made according to a value of an output signal from F/B control means as to whether the overshoot or undershoot occurred because of an estimation error in an F/F control means or because a filter for the F/F control means is not optimal, and if it is determined that the overshoot or undershoot occurred because of an estimation error in the F/F control means, the I/O characteristics stored in a memory unit in the F/F control means is automatically modified, and an output signal from the F/F control means is changed before this correcting operation is complete. On the other hand, if it is determined that the overshoot or undershoot occurred because a filter for the F/F control means is not optimal, a filter for the F/B control means is automatically modified, and an output signal from the F/B control means is changed until this operation for modification is complete. By making a ratio of F/F control or F/B control smaller until the modifying operation is complete, control making both the F/F control and F/B control valid can be executed continuously, and also machining fault due an estimation error in the F/F control means as well as to the fact that a filter for the F/B control means is not optimal can be prevented while the modifying operation is being executed.

In other method of controlling a laser machining apparatus according to the present invention, when overshoot or undershoot of a laser output exceeds a specified value, whether the overshoot or undershoot occurred because of an estimation error in an F/F control means or because a filter for the F/F control means is not optimal is checked according to a value of an output signal from an F/B control means, and if it is determined that the overshoot or undershoot occurred because of an estimation error in the F/F control means, the I/O characteristics stored in a memory unit in the F/F control means is automatically modified, and on the other hand if it is determined that the overshoot or undershoot occurred because a filter for the F/F control means is not optimal, a filter for the F/B control means is automatically modified, so that the I/O characteristics stored in a memory unit in the F/F control means as well as a filter for the F/B control can be modified even when an operator is not present at the site, for instance, at night, and control making both the F/F control and F/B control valid can be executed continuously.

In another laser machining apparatus according to the present invention, by modifying the I/O characteristics stored in an F/F control means or a filter for an F/B control means when a shutter of a laser oscillator is closed, measurement can be executed without being affected by machining, so that measurement can safely and accurately be executed.

In another laser machining apparatus according to the present invention, an operation for modifying I/O characteristics stored in an F/F control means or a filter for an F/B control means during an operation for piecing a laser beam through a workpiece in the initial stage of machining is executed, so that a time required for machining can be shortened without arranging any specific time for the modifying operation.

In another laser machining apparatus according to the present invention, data on materials of workpieces made of highly reflective materials are previously registered in a memory unit in the NC unit above, and when any of the registered material is selected during machining, an output signal from an F/B control is changed, so that drop of a laser output due to a reflected light from highly reflective material or result ant machining fault can be prevented.

In another laser machining apparatus according to the present invention, data on materials of workpieces made of highly reflective materials are previously registered in a memory unit in the NC unit above, and when any of the registered material is selected during machining, an output signal from an F/B control is changed, so that drop of a laser output due to a reflected light from highly reflective material or result ant machining fault can be prevented.

In another laser machining apparatus according to the present invention, a reflected light from a workpiece is measured when machining is started, and when a value of the reflected light is higher than a specified value, an output signal from an F/B control means is changed, so that drop of a laser output due to reflected light from a highly reflective material or resultant machining fault can be prevented.

In other method of controlling a laser machining apparatus according to the present invention, a reflected light from a workpiece is measured when machining is started, and if a value for the reflected light is higher than a specified value, an output signal from the F/Bcontrol means is changed, so that drop of a laser output due to reflected light from a highly reflective material or resultant machining fault can be prevented.

In another laser machining apparatus according to the present invention detects an operation of a limiting function provided outside an output control means according to a value of an output signal from an instruction output means and also to a value of an output signal from an output detecting means, stops the F/B control and makes an output signal for the F/B control invalid when a value of difference between an output signal from the instruction output means and an output signal from the output detecting means exceeds a specified value, so that malfunctions in the F/B control can be prevented.

In other control method for the laser machining apparatus according to the present invention, when a value of difference between an output signal from the instruction output means and an output signal from the output detecting means exceeds a specified value, the F/B control is stopped and an output signal for the F/B control is made invalid, so that malfunctions in the F/B control can be prevented.

In another laser machining apparatus according to the present invention detects an abnormal state in the laser oscillator according to a value of an output signal from the instruction output means as well as to a value of an output signal from the output detecting means, outputs an alarm and/or stops control when a value of difference between an output signal from the instruction output means and an output signal from the output detecting means exceeds a specified value, so that it is possible to prevent an abnormal state in the laser oscillator from being more aggravated.

Also in other control method for the laser machining apparatus according to the present invention, when a value of difference between an output signal from the instruction output means and an output signal from the output detecting means exceeds a specified value, an alarm is provided, and/or control is stopped, so that it is possible to prevent an abnormal state in the laser oscillator from being aggravated.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A laser machining apparatus comprising:

a laser oscillator;

a power supply unit for supplying excitation power to said laser oscillator, said power supply unit controlling, in response to a control input, at least one of: a frequency of said laser oscillator, a duty ratio of said laser oscillator, and a power output of said laser oscillator;

a command value setting unit for outputting a command value including said power output of said laser oscillator and at least one of: said frequency of said laser oscillator and said duty ratio of said laser oscillator;

a power sensor for measuring said power output of said laser oscillator to provide a power measurement value;

a feedback control unit for computing a first operation rate from a power command value set in said command value setting unit and said power measurement value;

a feed forward control unit comprising a laser oscillator characteristics describing unit that describes a laser oscillator characteristics function having, as a parameter, at least one of said frequency and said duty ratio, said feed forward control unit computing a second operation rate in response to said command value and said laser oscillator characteristics function; and a computing unit for computing said control input based on said first operation rate and said second operation rate, wherein said feed forward control unit comprises:
- a first function describing unit for providing a description, for quantities of energy which a gas in said laser oscillator receives for electric discharge, of a quantity of energy contributing to a laser power using at least a current value at an oscillation limit of a laser output as a parameter, and
- a second function describing unit for providing a description of a relation between an approximate value for each frequency or for each duty ratio and a laser power; and wherein said laser oscillator characteristics function is based on said description provided by said first function describing unit and by said description provided by second function describing unit.

2. A laser machining apparatus according to claim 1, wherein said feed forward control unit comprises a feed forward correcting unit for adjusting a parameter indicating a current at an oscillation limit of a laser output.

3. A laser machining apparatus comprising:

a laser oscillator;

a power supply unit for supplying excitation power to said laser oscillator, said power supply unit controlling, in response to a control input, at least one of: a frequency of said laser oscillator, a duty ratio of said laser oscillator, and a power output of said laser oscillator;

a command value setting unit for outputting a command value including said power output of said laser oscillator and at least one of: said frequency of said laser oscillator and said duty ratio of said laser oscillator;

a power sensor for measuring said power output of said laser oscillator to provide a power measurement value;

a feedback control unit for computing a first operation rate from a power command value set in said command value setting unit and said power measurement value;

a feed forward control unit comprising a laser oscillator characteristics describing unit that describes a laser oscillator characteristics function having, as a parameter, at least one of said frequency and said duty ratio, said feed forward control unit computing a second operation rate in response to said command value and said laser oscillator characteristics function; and a computing unit for computing said control input based on said first operation rate and said second operation rate, wherein said feed forward control unit comprises:
- a first function describing unit for providing a description, for quantities of energy which a gas in said laser oscillator receives for electric discharge, of a quantity of energy contributing to a laser power using at least a current value at an oscillation limit of a laser output as a parameter,
- a second function describing unit for providing a description of a relation between an approximate value for each frequency or for each duty ratio and a laser power, and
- a characteristics correcting function describing unit for providing a correction for said approximate value; and wherein said laser oscillator characteristics function is based on said description provided by said first function describing unit, on said description provided by said second function describing unit, and on said correction provided by said characteristics correcting function describing unit.

4. A laser machining apparatus according to claim 3, wherein said feed forward control unit comprises a feed forward correcting unit for adjusting a parameter indicating a current at an oscillation limit of a laser output.

* * * * *